US012443989B2

(12) United States Patent
Broder

(10) Patent No.: US 12,443,989 B2
(45) Date of Patent: Oct. 14, 2025

(54) ELECTRONIC PLATFORM FOR MANAGING INVESTMENT PRODUCTS

(71) Applicant: iCapital Services LLC, New York, NY (US)

(72) Inventor: Jason Broder, New York, NY (US)

(73) Assignee: iCapital Services LLC, New York, NY (US)

( * ) Notice: Subject to any disclaimer, the term of this patent is extended or adjusted under 35 U.S.C. 154(b) by 1454 days.

(21) Appl. No.: 14/726,075

(22) Filed: May 29, 2015

(65) Prior Publication Data

US 2015/0348192 A1 Dec. 3, 2015

Related U.S. Application Data

(60) Provisional application No. 62/005,869, filed on May 30, 2014.

(51) Int. Cl.
*G06Q 40/04* (2012.01)
*G06Q 40/06* (2012.01)

(52) U.S. Cl.
CPC ............ *G06Q 40/04* (2013.01); *G06Q 40/06* (2013.01)

(58) Field of Classification Search
CPC ........ G06Q 40/00; G06Q 40/06; G06Q 40/02; G06F 21/31
USPC ......................................................... 705/36
See application file for complete search history.

(56) References Cited

U.S. PATENT DOCUMENTS

| 6,062,862 A  | * | 5/2000  | Koskinen ............... G06Q 40/00 |
|              |   |         | 434/118                            |
| 6,233,566 B1 | * | 5/2001  | Levine .................... G06Q 40/02 |
|              |   |         | 705/36 R                           |
| 6,609,198 B1 | * | 8/2003  | Wood .................. G06F 21/6209 |
|              |   |         | 726/8                              |
| 7,953,663 B1 | * | 5/2011  | LeKachman ........ G06Q 20/108 |
|              |   |         | 705/42                             |
| 7,996,296 B2 |   | 8/2011  | Lange                              |
| 9,805,403 B2 | * | 10/2017 | Gudmundsson ... G06Q 30/0609 |
| 2002/0147670 A1 |   | 10/2002 | Lange                           |
| 2003/0232318 A1 | * | 12/2003 | Altenhofen .............. G09B 5/00 |
|              |   |         | 434/362                            |
| 2007/0055609 A1 |   | 3/2007  | Whitehurst et al.               |
| 2008/0021794 A1 | * | 1/2008  | Vega .................... G06Q 50/188 |
|              |   |         | 705/26.4                           |
| 2010/0070430 A1 | * | 3/2010  | Favvas ................... G06Q 40/02 |
|              |   |         | 705/36 R                           |
| 2011/0264473 A1 |   | 10/2011 | Abreu et al.                    |

(Continued)

OTHER PUBLICATIONS

Credit Suisse; My Solutions Customized Structured Products and Options; Zurich, Switzerland; 2014; 8 pages.

(Continued)

*Primary Examiner* — Clifford B Madamba

(57) ABSTRACT

Example embodiments of the present invention are directed to an integrated system and methods performed thereon for identifying customized structured investment products, certifying users to use and sell such customized structured products, selling and trading such customized structured products, and monitoring the performance of the customized structured products. The customized structured products are built from real time market data, client specific data, and/or performance metrics of other customized structured products.

9 Claims, 48 Drawing Sheets

(56) References Cited

U.S. PATENT DOCUMENTS

| | | | | |
|---|---|---|---|---|
| 2011/0270778 | A1* | 11/2011 | Mondal | G06Q 50/01 |
| | | | | 705/36 R |
| 2011/0302105 | A1* | 12/2011 | Yakubov | G06Q 40/00 |
| | | | | 705/36 R |
| 2012/0259797 | A1* | 10/2012 | Sarkany | G06Q 40/06 |
| | | | | 705/36 R |
| 2013/0144807 | A1* | 6/2013 | Packles | G06Q 40/06 |
| | | | | 705/36 R |
| 2013/0166475 | A1 | 6/2013 | Packles et al. | |
| 2013/0173494 | A1* | 7/2013 | Tayeb | G06Q 40/04 |
| | | | | 705/37 |
| 2014/0019326 | A1* | 1/2014 | Greene | G06Q 40/04 |
| | | | | 705/37 |

OTHER PUBLICATIONS

Credit Suisse; "Structured Products Enhance your investment opportunities"; Zurich, Switzerland; 2011; 59 pages.

Credit Suisse; Press Release: "Credit Suisse Adopts SSPA Terminology for Structured Products"; Zurich, Switzerland; Dec. 16, 2010; 1 page.

Der Finanzprodukt Blog; "Structured Products Plattform My Solution erhalt Award"; downloaded from http://http://www.finanzprodukt.ch/strukturierte-produkte/structured-products-plattform-my-solution-erhalt-award/; Nov. 15, 2013; 5 pages.

Vontobel deritrade®, https://www.youtube.com/watch?v=OrtTmc-mEjE, published on Oct. 29, 2013.

International Search Report and Written Opinion of the International Searching Authority dated Aug. 26, 2015, in connection with International Application No. PCT/US15/33307, 3 pages.

* cited by examiner

1800

ELECTRONIC PLATFORM FOR MANAGING INVESTMENT PRODUCTS

RELATED APPLICATIONS

This application claims priority to U.S. Provisional Patent Application No. 62/005,869, filed on May 30, 2014, entitled "Integrated Electronic platform for Learning, Building, Sharing and Trading Financial Products," which is hereby incorporated by reference in its entirety.

TECHNICAL FIELD

This application is related to electronic platforms, and, more specifically, to systems, methods, and devices for managing investment products, including customizable structured products requiring real time certification, education, market factors and market builders.

BACKGROUND

An array of financial products is available in the financial marketplace for investment. One set of examples of financial products that are available to investors are structured products. Structured products offer investors potential returns tied to the performance of underlying derivatives such as indices, a basket of securities, a single security, options, commodities, foreign currencies, etc. Structured product offerings have defined levels of risk, return and maturity and are often used as a portfolio diversification strategy to include exposure to desired asset classes without direct investment on those asset classes. Consider a structured product in the form of a structured note with a notional face value of $1,000 and a maturity of 3 years that is linked to the performance of the Dow Jones U.S. Select REIT (Real Estate Investment Trust) index. The structured note combines two components: a zero coupon bond and a derivative component (e.g., a call option on the index). Most of the principal is put in the zero coupon bond, which is designed to give a return equal to the initial investment (i.e., $1000) at maturity. The rest of the money is put in the derivative component (e.g., a call option on the S&P 500 index). At maturity, the investor receives the principal ($1,000) regardless of whether the underlying index moves up or down. Moreover, if the value of the underlying index rises during the period of time between the issue and the maturity, the investor typically receives an additional return. For example, if the value of the underlying index rises 40% during the period, the investor can receive 40% of $1000, or $400, assuming a 100% participation rate. Besides providing the benefits of capital protection and potential income, structured products can also provide the benefit of portfolio diversification. For example, instead of buying a portfolio of commercial real estates, which can be difficult to find or even expensive to do, the investor can buy the example structured product linked to the REIT index to get exposure to the commercial real estate market.

While the benefits of structured products are clear, many investors as well as financial advisors typically shy away from structured products because of a lack of understanding of how the structured products work, a lack of liquidity and a lack of transparency in how these products are priced, among other reasons.

SUMMARY

Example embodiments of the present invention are directed to an integrated system for and methods performed thereon for identifying customized structured investment products, certifying users to use and sell such customized structured products, selling and trading such customized structured products, and monitoring the performance of the customized structured products. The customized structured products are built from real time market data, client specific data, and/or performance metrics of other customized structured products.

In an example embodiment of the present invention an electronic platform residing at one or more servers that communicate with client devices associated with one or more users of the electronic platform, comprises: a product generation system that generates tradable investment products in response to product request information received from a user of the electronic platform; a product education system that provides online courses associated with the tradable investment products to the user of the electronic platform; and a product exchange system that establishes an information exchange environment between the user of the electronic platform and other users of the electronic platform.

In other example embodiments of the present invention the electronic platform may include one or more of the following features. The product generation system generates builds tradable investment products for the user after the user of the electronic platform has completed at least one online course associated with the tradable investment products provided by the product education system. The product education system provides online courses associated with the tradable investment products to the user of the electronic platform after determining the user of the electronic platform is not certified to trade investment products generated by the product generation system. The product generation system builds investment products using a decision tree analysis of information provided by the user the of the electronic system, the information including: information associated with a user's investment criteria, information associated with a user's risk tolerance, information associated with a user's investment horizon, information associated with a user's desired investment market, information associated with a user's level of investment protection, and information associated with real-time or near real-time conditions of the investment market. The product education system provides at least one online course to the user of the electronic platform that includes a first course section that presents information to the user based on investment products of interest to the user and capable of being generated by the product generation system and a second course section that presents a quiz to the user that is based on the information presented to the user. The product exchange system that establishes a social network service between the user of the electronic platform and other users of the electronic platform, the social network service facilitating a sharing of information between users that includes information identifying one or more investment products generated for the user by the product generation system. The product exchange system that establishes a product trading marketplace between the user of the electronic platform and other users of the electronic platform, the product trading marketplace facilitating a trading of generated investment products between users of the electronic platform.

In yet another example embodiment of the present invention, a method performed by an electronic platform of generating a tradable investment product comprises: receiving input from a user via a product generation interface of the electronic platform, the input including a selection of one or more investment product categories of interest to the user;

before generating an investment product for the user that is based on the selected one or more investment product categories of interest to the user; launching an online seminar via an education interface of the electronic platform for the user; and upon receiving an indication that the user has completed the online seminar via the education interface provided by the electronic platform, generating one or more investment products within the selected one or more invest product categories via the product generation interface of the electronic platform.

Example embodiments of the present invention include one or more of the following features. After generating one or more investment products within the selected one or more invest product categories via the product generation interface of the electronic platform, establishing, via an information exchange interface provided by the electronic platform, a social network service between the user of the electronic platform and other users of the electronic platform, the social network service facilitating a sharing of information between users that includes information identifying one or more investment products generated for the user by the product generation system. After generating one or more investment products within the selected one or more invest product categories via the product generation interface of the electronic platform, establishing, via an information exchange interface provided by the electronic platform, a product trading marketplace between the user of the electronic platform and other users of the electronic platform, the product trading marketplace facilitating a trading of generated investment products between users of the electronic platform.

In still another example embodiment of the present invention a non-transitory computer-readable medium whose contents, when executed by an electronic platform provided by one or more servers, cause the electronic platform to perform operations for providing a computing environment for trading structured investment products, comprises: generating tradable investment products in response to product request information received from a user of the electronic platform; providing online courses associated with the tradable investment products to the user of the electronic platform based on credentials assigned to the user of the electronic platform; and establishing information exchange events between the user of the electronic platform and other users of the electronic platform that are associated with tradable investment products generated for the user of the electronic platform.

In yet a further example embodiment a method performed by an electronic platform residing at one or more servers that communicate with client devices associated with one or more users of the electronic platform, comprises: receiving a request from a user to trade an investment product; identifying a training module associated with a certification program provided by the electronic platform and associated with trading the investment product via the electronic platform; presenting the training module to the user; determining whether the user has completed the training module; when the determining indicates that the user has completed the training module, identifying a test corresponding to the training module; presenting the test to the user; determining whether the user has passed the test; when the determining indicates that the user has passed the test, certifying the user to trade the investment product.

And in another example embodiment of the present invention, a method, performed by an electronic platform residing at one or more servers that communicate with client devices associated with one or more users of the electronic platform, of selecting a structured investment product for a user of the electronic platform, comprises: receiving, via a graphical user interface provided by the electronic platform, information from a user, the information including; information associated with a user's investment criteria; information associated with a user's risk tolerance; information associated with a user's investment horizon; information associated with a user's desired investment market; or information associated with a user's level of investment protection; and then determining real-time or near real-time conditions of the investment market; and selecting one or more structured investment products based on the information received from the user and based on the real-time or near real-time conditions of the investment market.

Still another example embodiment of the present invention is directed to a method, performed by an electronic platform residing at one or more servers that communicate with client devices associated with one or more users of the electronic platform, of presenting a tradable structured investment product to a user of the electronic platform, comprising: receiving, via an interface provided by the electronic platform, a request from the user of the electronic platform to perform a trade associated with a structured investment product; decomposing the structured investment product into two or more priced components of the structured investment product; generating pricing tables for each of the two or more priced components of the structured investment product; pre-fetching, from pricing servers located on an information exchange network that includes the electronic platform, pricing information for the two or more priced components based on a variety of different deal terms; receiving, via the interface provided by the electronic platform, input from the user of the electronic platform that identifies a set of deal terms to be applied to the two or more priced components when performing the trade of the structured investment product; interpolating the pricing tables based on the set of deal terms associated with the two or more priced components and provided by the user of the electronic platform; determining a price for the structured investment product that is based on the interpolated pricing tables for the two or more priced components; and presenting, via the interface of the electronic platform, information identifying the structured investment product and information identifying the determined price for the structured investment product.

A further still example embodiment of the present invention is directed to a method, performed by an electronic platform residing at one or more servers that communicate with client devices associated with one or more users of the electronic platform, of presenting information associated with a structured investment product that is available for trading via the electronic platform, the method comprising: receiving, via an interface provided by the electronic platform, a selection of a structured investment product generated by the electronic platform; performing a backtesting analysis for the selected structured investment product, the analysis include a comparison of a theoretical performance of the selected structured investment product to theoretical performances of other structured investment products generated by the electronic platform; and presenting, via the interface provided by the electronic platform, a result of the performed analysis.

And in yet another example embodiment of the present invention, a method of managing a certification program for a financial product, comprises: receiving a request from a user to complete the certification program for the financial product; identifying a training module associated with the certification program; presenting the training module to the user; determining whether the user has completed the training module; and when the determining indicates that the user has completed the training module, identifying a test corresponding to the training module; presenting the test to the user; determining whether the user has passed the test; when the determining indicates that the user has passed the test, certifying the user on the financial product; and informing the user that the user has completed the certification program and is permitted to trade the financial product; and when the determining indicates that the user has failed the test, informing the user that the user is not permitted to trade the financial product.

Further example embodiments of the present invention may include one or more of the following features. The training module includes videos or articles for the user's review. The determining indicates that the user has not completed the training module, informing the user of the user's current progress in completing the training module. The certification program is administered online and accessible through a web interface. The user is a financial advisor. The financial product is a leveled asset, a growth product, or an income product. The method further comprises informing a manager of the user of completion of the certification program for the financial product.

In even an even further example embodiment a system for managing trading requests, comprises: at least a processor and memory, cooperating to function as: a receiving component configured to receive a request from a user to trade a financial product; a determining component configured to determine whether the request is to be approved based on a certification status of the user on the financial product; an approving component configured to, when the determining component determines that the request is to be approved, approve the request and inform the user that the trade will be processed; and a disapproving component configured to, when the determining component determines that the request is not to be approved, deny the request and inform the user that the user needs to complete a certification program for the financial product.

Further example embodiments of the present invention may include one or more of the following features. The approving component is further configured to process the trade after approving the request. The system further comprises a maintaining component configured to maintain certification status information in a database, wherein the determining component obtains the certification status of the user on the financial product from the database and determines whether the request is to be approved in accordance with the obtained certification status. The system further comprises a presenting component configured to present the certification status of the user on the financial product to a second user; and an accepting component configured to accept an approval or denial from the second user of the request based on the presented certification status, wherein the determination component determines whether the request is to be approved in accordance with the acceptance or denial of the request. The first user is a financial advisor, and the second user is a manager of the first user.

Another example embodiment of the present invention is directed to a computer-readable storage medium whose contents are capable of causing a computer device with a processor and memory to perform a method of implementing a management dashboard for presenting training and certification metrics associated with a plurality of users for trading on financial products, the method comprising: including a first section in the management dashboard which displays a list of the plurality of users and a summary of training and certification metrics associated with each user; including a second section in the management dashboard which displays a list of requests by at least some of the users for trading financial products and allows a manager of the at least some of the users to approve or deny each of the requests; and including a third section in the management dashboard which displays a list of recent training or certification activities performed by any of the plurality of users. The first section allows the manager to select a user from the plurality of users and obtain details of training and certification metrics associated with the selected user. The listing displayed by the third section includes, for each activity, descriptions of a nature, a status, and a name of the user performing the activity.

And another example embodiment of the present invention is directed a method for evaluating a request to trade on a financial product, comprising: receiving the request to trade on the financial product, the request being submitted by a user via a web-based interface accessed using a client device; determining whether the user is certified for the financial product; when the user is certified for the financial product, automatically approving the request for processing; when the user is not certified for the financial product, automatically rejecting the request and requesting the user to get certified for the financial product by consuming relevant training content and taking a test based on the consumed training content; and providing an indication of the approval or rejection of the request to the user via the web-based interface. The financial product is a structured investment product or an over-the-counter derivative product. The method further comprises providing the indication of the approval or rejection of the request for display on a management dashboard accessible to an administrator user. The method further comprises monitoring consumption of each item of the relevant training content by the user; and providing information from the monitoring for display on a management dashboard accessible to an administrator user. The method further comprises determining, based on the monitoring, that the user has consumed all items of the relevant training content; in response to the determining, presenting the test including a set of questions to the user and receiving responses to the set of questions from the user; and determining whether to certify the user for the financial product based on the received responses.

In still a further example embodiment of the present invention, a method of enabling a user to identify financial products of interest based on a plurality of financial product classifications, each associated with one or more financial product classes: receiving a request from a user to find a financial product; obtaining a current list of financial products; initializing a moving list of financial products to the current list; repeating the following steps until a threshold condition is satisfied: selecting one of the financial product classifications that has not been considered; determining whether the financial products on the moving list belong to at least the predetermined number of financial product classes associated with the one financial product classification; and when the determining result indicates that the financial products belong to at least a predetermined number of financial product classes, presenting to the user a question corresponding to the one financial product classification and a plurality of answers corresponding to the at least the predetermined number of financial product classes; receiving a choice of one of the answers from the user corresponding to one of the financial product classes; and removing from the moving list financial products that do not belong to the one financial product class; and displaying the moving list of financial products to the user.

Example embodiment of the present invention may include one or more of the following features. The method further comprises obtaining current pricing data associated with the financial products on the moving list; and before the presenting, customizing one or more financial products on the moving list based on the current pricing data. The threshold condition indicates that the number of financial products on the moving list is smaller than a specific number or that the number of financial product classes to which the financial products on the moving list belong is smaller than the predetermined number. The selecting is performed randomly. The selecting is performed based on a predetermined order for the plurality of financial product classifications. The selecting is performed based on how evenly the financial products on the moving list are distributed into the financial product classes associated with each financial product classification that has not been selected. The plurality of financial classifications are based on one or more of an investment objective, a level of investment risk tolerance, an investment horizon, an equity market preference, a yearly investment return, a level of downside protection, and an overall investment return. The method further comprises displaying a backtesting feature and a future scenario analysis feature to the user that can be applied to each of the financial products on the moving list. The current list of financial products includes a structured product.

In another example embodiment of the present invention, a system for enabling a user to identify financial products of interest based on a plurality of financial product classifications, each associated with one or more financial product classes: a processor and memory, cooperating to function as: a receiving unit configured to receive a request from a user to find a financial product; an obtaining unit configured to obtain a current list of financial products; an initializing unit configured to initialize a moving list of financial products to the current list; a repeating unit configured to repeatedly invoke the following units until a threshold condition is satisfied: a selecting unit configured to select one of the financial product classifications that has not been considered; a determining configured to determine whether the financial products on the moving list belong to at least a predetermined number of financial product classes associated with the one financial product classification; a presenting unit configured to, when the determining result indicates that the financial products belong to at least the predetermined number of financial product classes, present to the user a question corresponding to the one financial product classification and a plurality of answers corresponding to the at least the predetermined number of financial product classes; a receiving unit configured to receive a choice of one of the answers from the user corresponding to one of the financial product classes; and a removing unit configured to remove from the moving list financial products that do not belong to the one financial product class; and a displaying unit configured to display the moving list of financial products to the user.

Further example embodiments may include one or more of the following features. A second obtaining unit configured to obtain current pricing data associated with the financial products on the moving list; and a customizing unit configured to, before the displaying unit displays the moving list, customize one or more financial products on the moving list based on the current pricing data. The threshold condition indicates that the number of financial products on the moving list is smaller than a specific number or that the number of financial product classes to which the financial products on the moving list belong is smaller than the predetermined number. The selecting unit randomly select one of the financial product classifications. The selecting unit selects one of the financial product classifications based on a predetermined order for the plurality of financial product classifications. The selecting unit selects one of the financial product classifications based on how evenly the financial products on the moving list are distributed into the financial product classes associated with each financial product classification that has not been selected. The plurality of financial classifications are based on one or more of an investment objective, a level of investment risk tolerance, an investment horizon, an equity market preference, a yearly investment return, a level of downside protection, and an overall investment return. Displaying the moving list includes displaying a backtesting feature and a future scenario analysis feature that can be applied to each of the financial products on the moving list. The current list of financial products includes a structured product.

And in still another example embodiment of the present invention, a computer-readable storage medium whose contents are capable of causing a computer device with a processor and memory to perform a method of enabling a user to identify financial products of interest based on a plurality of financial product classifications, each associated with one or more financial product classes, the method comprising: receiving a request from a user to find a financial product; obtaining a current list of financial products; initializing a moving list of financial products to the current list; repeating the following steps until a threshold condition is satisfied: selecting one of the financial product classifications that has not been considered; determining whether the financial products on the moving list belong to at least a predetermined number of financial product classes associated with the one financial product classification; when the determining result indicates that the financial products belong to at least the predetermined number of financial product classes, presenting to the user a question corresponding to the one financial product classification and a plurality of answers corresponding to the at least the predetermined number of financial product classes; receiving a choice of one of the answers from the user corresponding to one of the financial product classes; and removing from the moving list financial products that do not belong to the one financial product class; and displaying the moving list of financial products to the user.

BRIEF DESCRIPTION OF THE DRAWINGS

Various embodiments of the electronic platform ("electronic platform"), including product education systems, product generation systems, and product exchange systems, are disclosed in the following detailed description and accompanying drawings.

DETAILED DESCRIPTION

Overview

Figure 1A:
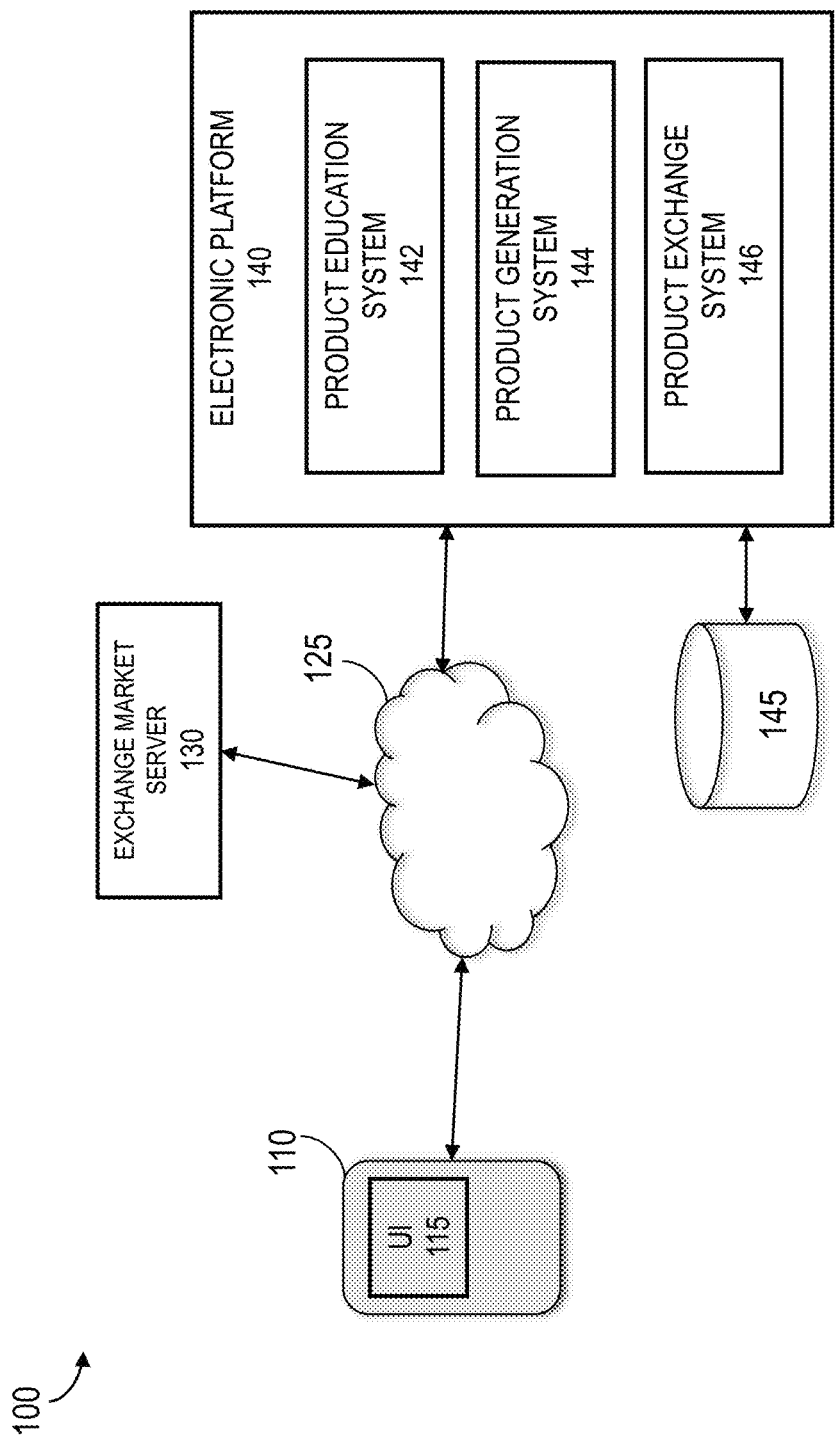
FIG. 1A is a block diagram illustrating a suitable computing environment that includes the electronic platform.

Systems and methods for managing tradable investment products, such as structured products and other tradable assets having multiple components, are described. In some embodiments, an electronic platform, such as an online computing environment is provided by one or more servers to one or more client devices, such as client devices associated with users seeking to utilize the electronic platform to trade (e.g., buy or sell) investment products, generate new or customized investment products, access information, tutorials, seminars, and/or online courses associated with investment products, share information associated with investment products, and so on. Investment products, as used herein, may include structured products, such as over the counter (OTC) derivative products, packaged products (e.g., retail financial trades, annuities, investment trusts), and so on.

In some embodiments, the electronic platform enables certification-based trading of investment products. The electronic platform provides financial advisors education and training materials on various investment products, tracks their progress through the materials, and certifies users (e.g. financial advisors) upon completion of the requisite courses to authorize the users to trade approved investment products via the electronic platform. In some cases, a management dashboard user interface provides various tools for tracking the financial advisors' certification for various investment products. For example, a manager or a supervisor can approve pending orders based on the financial advisors' certifications for the financial products directly from the dashboard.

Typically, financial advisors rely on questionnaires, brochures, catalogs and other prepared materials to choose structured products that meet the needs of their clients. However, such prepared materials quickly become out of date as a trading market moves. As a result, investment decisions may be made based on information that is out of date. The electronic platform, in some embodiments, implements a product selection method that uses a decision tree to select questions from a template based on prior user responses and updates the questions using real time pricing information and other information relating to current market conditions. A user may traverse the decision tree, answering questions about his or her client's investment needs to discover products best suited to those needs. In some embodiments, the user may select a product and graphically interact with the inputs of the selected product to receive information about how each input affects the overall (expected) payout of the product. In some embodiments, the user may customize and save specific products for their individual clients.

In some embodiments, the electronic platform enables users to build investment products. For example, users may configure inputs and solve for different variables in real-time using locally pre-calculated data, to build investment products. In some embodiments, the electronic platform may utilize pre-fetching algorithms for pricing representative variations of a requested structured product, and interpolate those prices for different variations of the product requested by the user. In some embodiments, the electronic platform may automatically price investment products for which a user has set a target price, and notify the user when that target price is reached or when a similar product is offered.

In some embodiments, the electronic platform may perform real-time analysis on custom or pre-built structured products, pre- and post-trade. For example, in some embodiments, the electronic platform provides tools for performing scenario analysis and backtesting of custom or off-the-shelf investment products using real-time pricing data.

In some embodiments, the electronic platform enables crowdsourcing of investment products. For example, a user may place a custom investment product (generated by the platform) in an investment queue, and the electronic platform facilitates the reception of crowd sourced feedback and/or analysis from other users of the platform. In addition, custom built products placed in an investment queue may be part of a marketplace provided by the electronic platform, such that other users interested in the custom investment product may commit a notional towards the investment product. Once a minimum notional for the custom investment product is met, an issuer of the electronic product may issue the custom investment product to the users who committed the notionals.

In some embodiments the electronic platform provides a multi-issuer investment product marketplace. The marketplace may be used to buy or sell custom and/or off-the-shelf investment products issued by one or more issuers. The marketplace for investment products may be equipped with various social networking tools to display real-time buy/sell activities of users, trending investment products, tools for liking and sharing custom and off-the-shell investment products, and so on. In some embodiments, the electronic platform provides a secondary market place for selling investment products. The electronic platform may also allow users perform various trading processes, such as automatically querying and receiving RFQs from multiple issuers, filling in the associated parameters, send to trading firms, and so on.

Various embodiments of the electronic platform will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Suitable Computing Environment

FIG. 1A is a block diagram illustrating a suitable computing environment 100 that includes the electronic platform. As described herein, a user, via a browser or mobile application 115 running on a client device 110, may access an electronic platform 140 to access its various integrated functionality. The user, as described herein, may be a financial advisor or a professional who provides financial advice to individuals, such as clients of the user. In some embodiments, the electronic platform 140 may be accessible to administrators and/or various parties in the financial services industry, such as financial advisors, brokers and dealers, investment product issuers, security depositories, and so on.

The user may employ the client device 110 to connect to the electronic platform 140 via a network 125, such as a wireless network. Aspects, embodiments, and implementations of the electronic platform 140 will be described in the general context of computer-executable instructions, such as routines executed by a general-purpose computer, a personal computer, a server, or other computing systems. The integrated electronic platform 140 may also be embodied in a special-purpose computer or data processor that is specifically programmed, configured, or constructed to perform one or more of the computer-executable instructions explained in detail herein.

The electronic platform 140, in some embodiments, includes a product education system 142, a product generation system 144, and a product exchange system 146, and may include one or more local databases 145, which store data and other information associated with the management of tradable investment products, such as information utilized by the systems and methods described herein.

In some embodiments, the product education system 142, the product generation system 144, and/or the product exchange system 146 may access, retrieve, and/or otherwise receive information from an exchange market server 130 over the network 125, such as information that identifies or provides current or predicted market conditions for various investment products and/or components of investment products.

In some embodiments, the different systems of the electronic platform 140 may be integrated and/or exchange information between systems. For example, the product generation system 144 may be configured and/or programmed to generate tradable investment products in response to product request information received from a user of the electronic platform 140, the product education system 142 may be configured and/or programmed to provide online courses associated with the generated tradable investment products to the user of the electronic platform 140, and the product exchange system 146 may be configured and/or programmed to establish an information exchange environment between the user of the electronic platform 140 and other users of the electronic platform 140.

For example, in some embodiments, the product generation system 144 may build tradable investment products for the user after the user of the electronic platform 140 has completed at least one online course associated with the tradable investment products provided by the product education system 142. Following the example, the product education system 142 may provide online courses associated with tradable investment products to the user of the electronic platform 140 after determining the user of the electronic platform 140 is not certified to trade investment products generated by the product generation system 144.

As another example, the product exchange system 146 may establish a social network service between the user of the electronic platform 140 and other users of the electronic platform to facilitate a sharing of information between users that includes information identifying one or more investment products generated for the user by the product generation system 142 and/or may establish a product trading marketplace between the user of the electronic platform 140 and other users of the electronic platform 140 to facilitate a trading of generated investment products between users of the electronic platform 140.

Figure 1B:
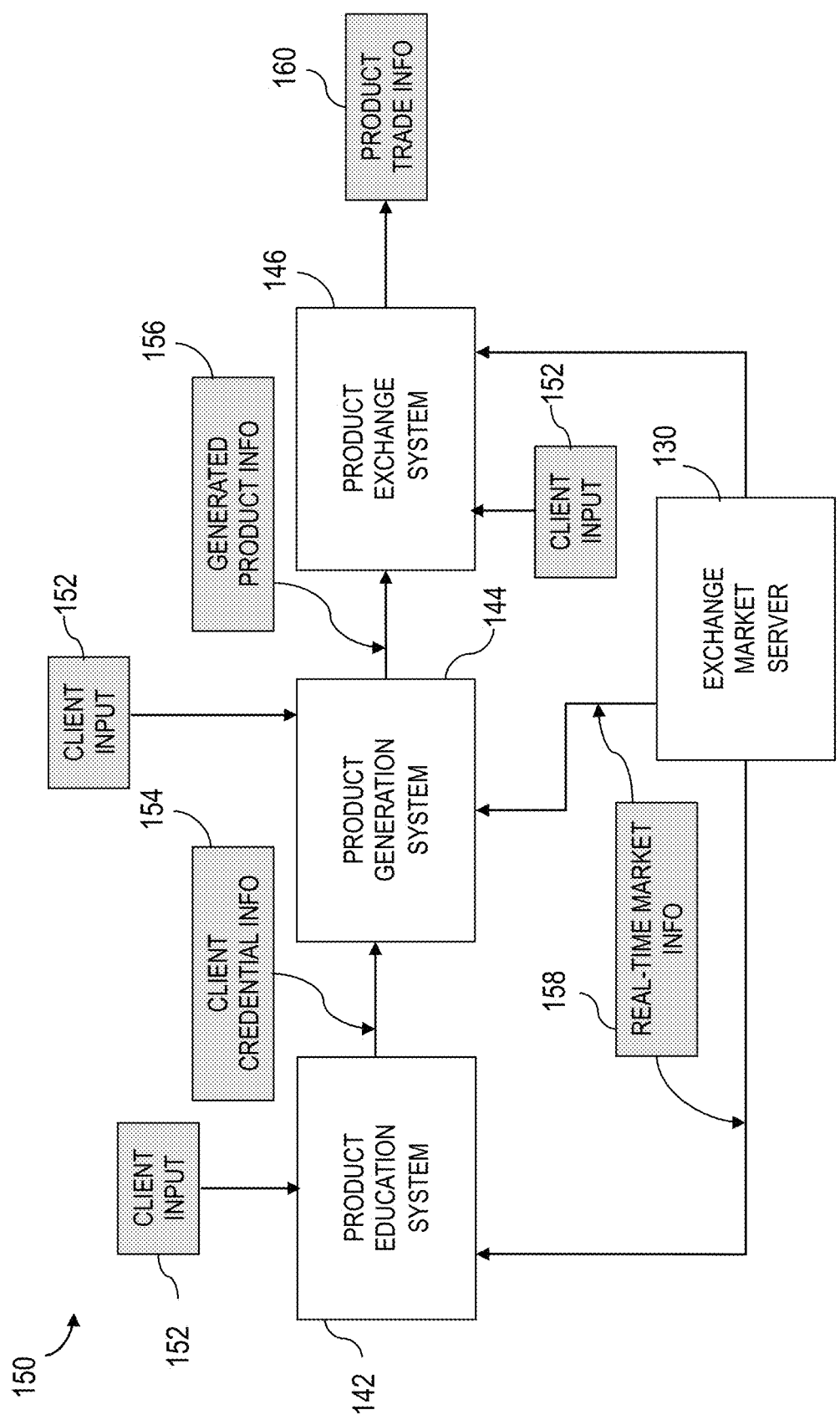
FIG. 1B is a data flow diagram illustrating an exchange of data between various components of the electronic platform.

Thus, the various systems of the electronic platform 140 may utilize information from one another when determining whether to provide certain functionality to a user of the electronic platform 140. FIG. 1B is a data flow diagram 150 illustrating an exchange of data between various components of the electronic platform 140.

As shown in FIG. 1B, the product education system 142 may receive client input 152 from the client device 110, such as user input, and generate client credential information 154 for the user that provided the input. For example, the product education system 152 may receive client input 152 indicating a selection of an online course for a specific investment product, provide a first course section that presents information to the user based about the specific investment products, provide a second course section that presents a quiz to the user that is based on the information presented to the user and/or based on real-time market information 158 provided by the exchange market server 130, and assign the user with a credential to trade the specific investment product on the electronic platform 140 in response to a successful taking of the presented quiz by the user.

The product generation system 144 may receive or access the client credential information 154, and build or generate investment products on behalf of the user. For example, the product generation system 144 may utilize the real-time market information 158 provided by the exchange market server 130 and/or client input 152 provided by the user, and select and/or build investment products for the user.

The product exchange system 146 may receive generated product information 156 that provides information about investment products generated and/or selected for the user, and generate product trade information for the generated investment products. For example, the product exchange system 146 may utilize the real-time market information 158 provided by the exchange market server 130 and/or client input 152 provided by the user, and generate product trade information to be provided to marketplaces established by the electronic platform and/or to be analyzed by the electronic platform, to be reviewed (e.g., crowdsourced) by other users of the electronic platform 140, and so on.

The electronic platform, therefore, may perform operations for providing a computing environment for trading structured investment products, including generating tradable investment products in response to product request information received from a user of the electronic platform 140, providing online courses associated with the tradable investment products to the user of the electronic platform 140 based on credentials assigned to the user of the electronic platform 140, and establishing information exchange events between the user of the electronic platform 140 and other users of the electronic platform 140 that are associated with tradable investment products generated for the user of the electronic platform 140.

Thus, the various systems of the electronic platform 140 may exchange information between one another in order to provide users with customized investment products that are based on real-time or current trading market conditions, up-to-date educational information associated with the investment products, and exchange environments that facilitate trading of the investment products, among other benefits.

Examples of the Product Education System

As described herein, in some embodiments, the electronic platform 140 includes the product education system 142, which provides tools and resources for certifying users (e.g., financial advisors) on investment products, and enables certification-based trading of investment products via the electronic platform 140. The product education system 142 may monitor information relating to each user's training activities and certifications earned on investment products. The product education system 142 may automatically approve or deny a trade request submitted by a user based on credentials assigned to the user, and/or may generate and send a trade request, along with information indicating the user's certification progress on an investment product associated with the trade request, to a manager or supervisor for approval. The manager or supervisor may then accept or reject the trade request based on the certification progress and/or other information.

The product education system 142 may track each user's certification progress, including the training items consumed, quizzes passed/failed and so on. Such tracking may enable a manager or supervisor to simply select a user's name from a management dashboard to see which investment products the user has or has not received certifications, and/or may enable the manager to view progress at the group level. For example, the manager may view how many users in his or her group have started, not started and/or completed their certifications for each product type directly from the management dashboard. In this manner, the manager may readily obtain an overview of the certification progress of users from the management dashboard.

The product education system 142 may also manage a user's ability to trade an investment product, such as by managing trading that is dependent on the user's certification progress on the investment product. For example, the product education system 142 may deny a user to trade an investment product via the electronic platform 140, unless the user has earned a certification on the investment product. Thus, the product education system 142 may enable the electronic platform 140 to facilitate orders for trades that are submitted by qualified financial advisers who have the required training and expertise on such investment products, which can range from commonly traded products (such as bonds) to complex structured investment products (such as buffered notes).

Figure 2:
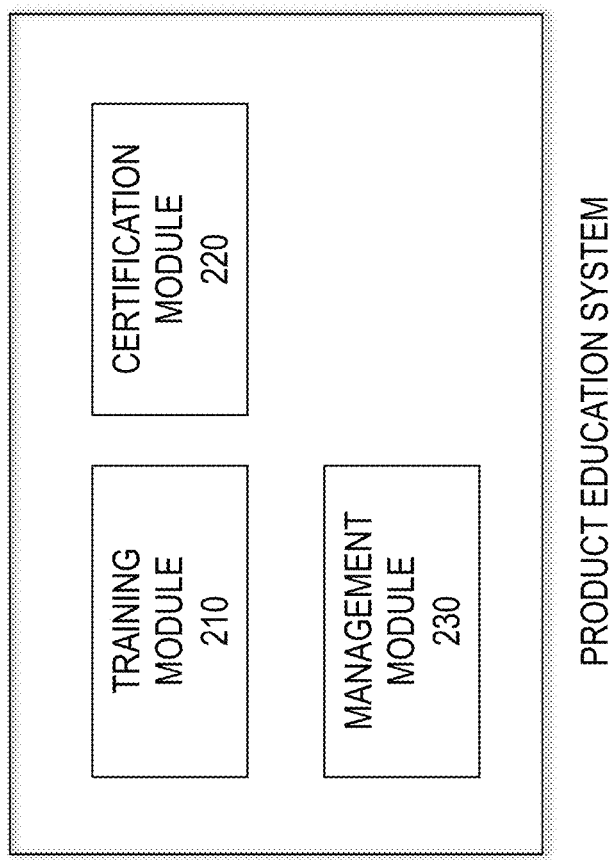
FIG. 2 is a block diagram illustrating components of a product education system.

FIG. 2 is a block diagram illustrating components of the product education system 142. The product education system 142 may include one or more modules and/or components to perform one or more operations of the product education system 142. The modules may be hardware, software, or a combination of hardware and software, and may be executed by one or more processors. For example, the product education system 142 may include a training module 210, a certification module 220, and a management module 230.

In some embodiments, the training module 210 is configured and/or programmed to provide users, such as financial advisors, with education and training materials on various investment products, and track progress made by each user in consuming those materials. For example, the training module 210 may provide various certification tracks, each of which may include a set of education and training materials (e.g., videos, articles, and so on) for consumption.

In some embodiments, the certification module 220 is configured and/or programmed to assess the user's knowledge on the consumed education and training materials by presenting a quiz including a collection of questions (e.g., multiple choice questions). Based on the user's responses to the questions, and one or more rules, the certification module 220 may certify a user to trade an investment product. For example, when a user answers 90% of the questions in a quiz associated with a certification track (e.g., general training, buffered notes, and jump notes), the certification module 220 may certify the user for the certification track.

In some embodiments, the management module 230 is configured and/or programmed to provide various tools for tracking or reviewing certification status or progress for all or a group of users, and approve pending orders of investment products placed by users based on the certification status of the users on the investment products.

Figure 3:
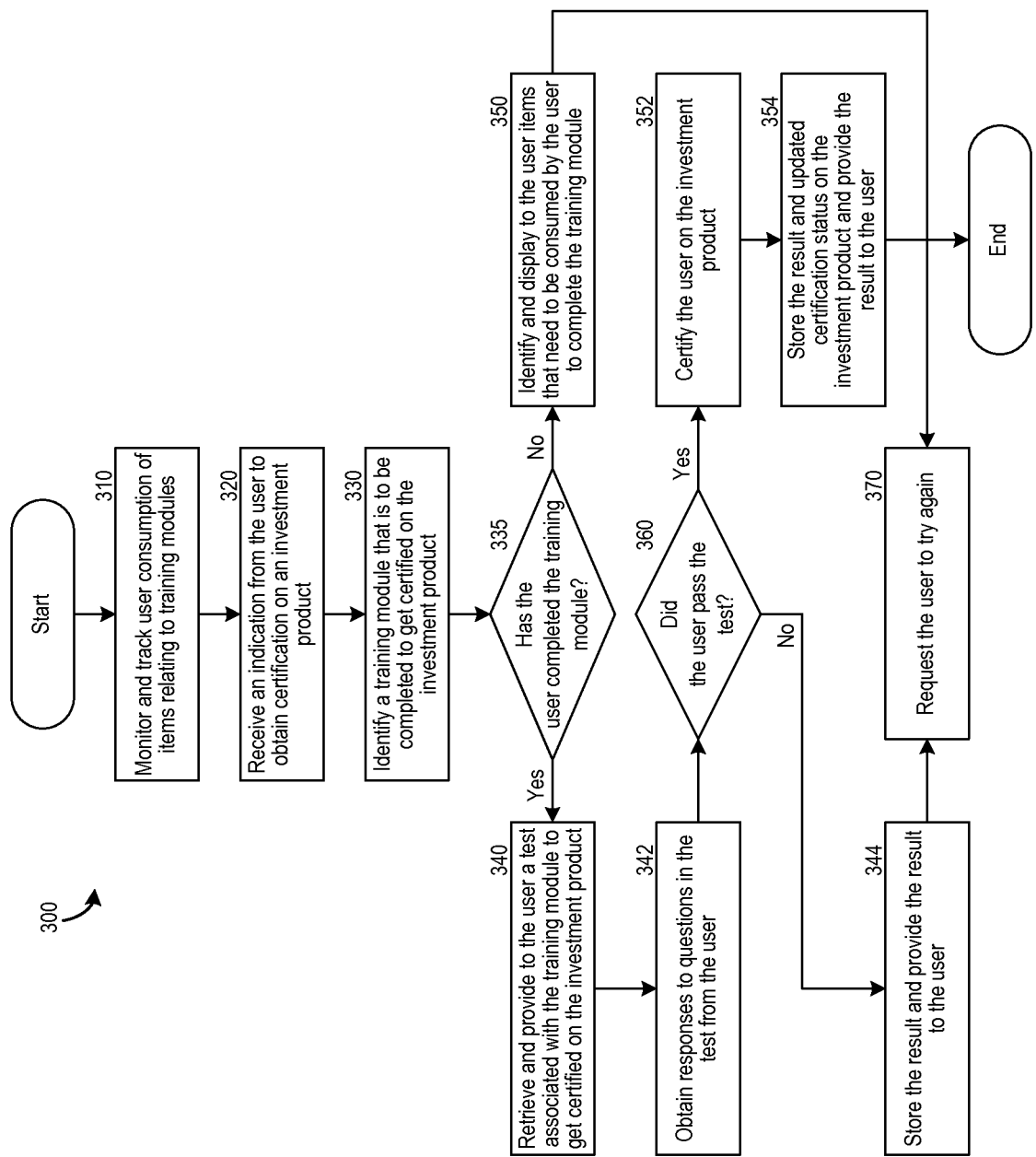
FIG. 3 is a flow diagram illustrating a method for certifying a user of the electronic platform to trade certain investment products provided by the electronic platform.

As described herein, the product education system 142 may perform various operations, processes, and methods when credentialing users and/or determining whether user are to trade investment products via the electronic platform 140. FIG. 3 is a flow diagram illustrating a method 300 for certifying a user of the electronic platform to trade certain investment products provided by the electronic platform. The method 300 may be performed by the product education system 142 and, accordingly, is described herein merely by way of reference thereto. It will be appreciated that the method 300 may be performed on any suitable hardware.

In operation 310, the product education system 142 monitors and tracks a user's progress in completing items related to a training module. In operation 320, the product education system 142 receives an indication from a user to obtain certification on an investment product (e.g., a jump note). In operation 330, the product education system 142 identifies the training module for the investment product selected or identified by the user, which may include videos, articles, and so on, to be completed by the user to receive certification on the investment product.

In operation 335, the product education system 142 determines whether the user has completed the training module. When the user has not completed the training module, the product education system 142, at operation 350, identifies a list of items of the training module that remain to be reviewed, and displays the list to the user.

When the user has completed the training module, the product education system 142, at operation 340, presents the user with a test based on the completed training module (which the user should pass in order to receive certification for the investment product). For example, the training module may include a first course section that presents information to the user based on investment products of interest to the user and capable of being generated by the product generation system 144; and a second course section that presents a quiz to the user that is based on the information presented to the user.

In operation 342, the product education system 142 receives the user's answers to the questions in the test, and reviews the user's answers to the test. In operation 360, the product education system 142 determines whether the user passes the test. When the product education system 142 determines the user has not passed the test (e.g., has not provided a sufficient number of correct answers), the product education system 142, in operation 344, stores the test result and presents it to the user, and, in operation 370, requests the user to review the training module and retake the test, or another test based on the training module.

When the product education system 142, in operation 360, determines the user has passed the test (e.g., has provided a sufficient number of correct answers), the product education system 142, in operation 352, grants certification to the user and, in operation 354, stores the test result and presents it to the user.

Figure 4:
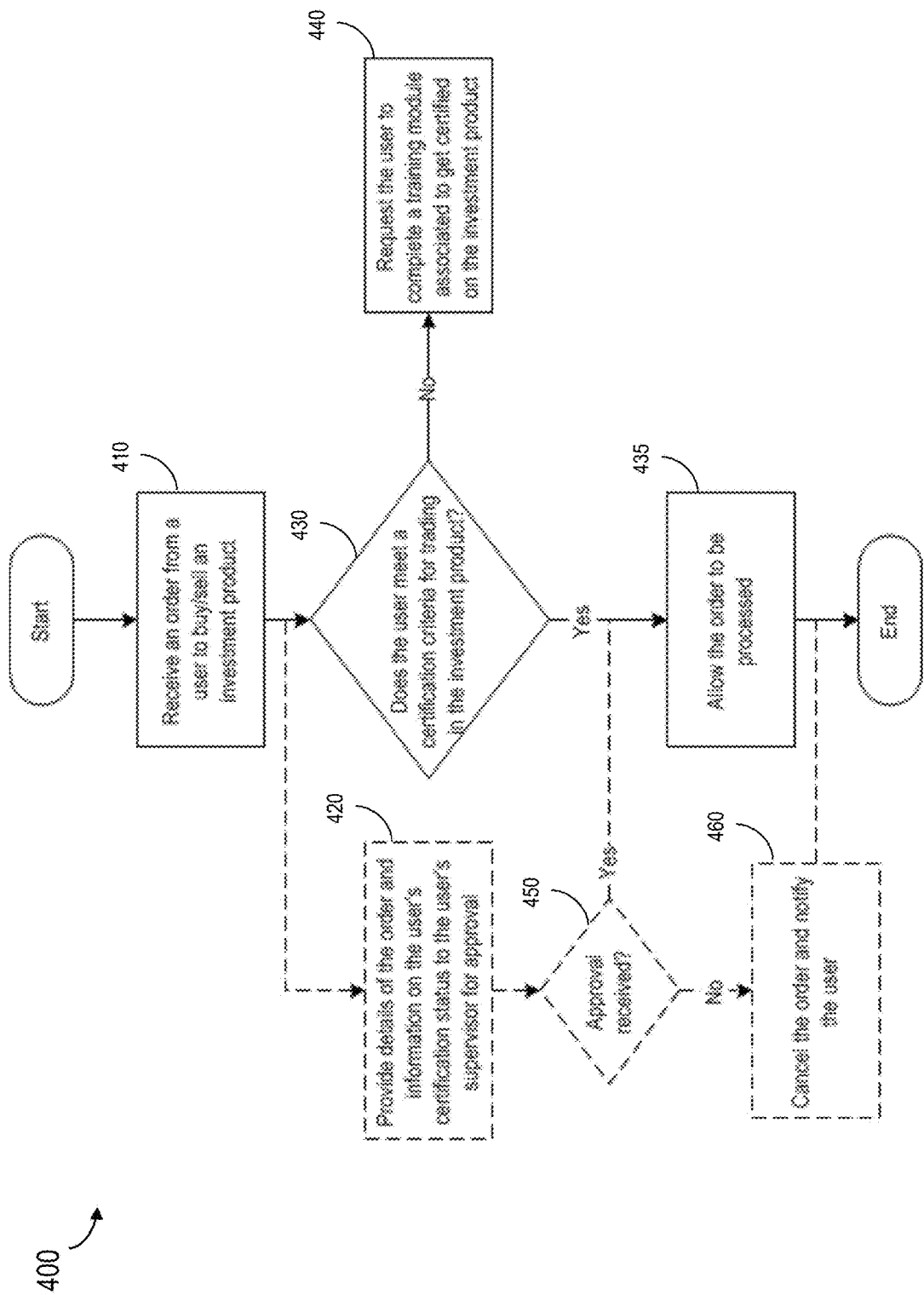
FIG. 4 is a flow diagram illustrating a method for performing a trade of an investment product based on credentials attributed to a user of the electronic platform.

FIG. 4 is a flow diagram illustrating a method 400 for performing a trade of an investment product based on credentials attributed to a user of the electronic platform. The method 400 may be performed by the product education system 142 and, accordingly, is described herein merely by way of reference thereto. It will be appreciated that the method 400 may be performed on any suitable hardware.

In operation 410, the product education system 142 receives a request from a user, such as a financial advisor, to process a trade on an investment product (e.g., a jump note). In operation 430, the product education system 142 determines whether the user meets a certification criterion for the investment product.

When the user does not meet a certification criterion (e.g., was not certified to trade the product), the product education system 142, in operation 440, denies the user's request and informs the user of the need to receive a certification on the investment product by completing necessary training modules. When the user does meet a certification criterion, the product education system 142, in operation 435, approves the request and processes the trade on the investment product.

Alternatively, after receiving, in operation 410, the request to trade an investment product, the product education system 142, in operation 420, displays information about the user's request and certification status to a manager, who may then make a decision as to whether to approve or disapprove the request.

In operation 450, the product education system 142 determines whether the manager approves or disapproves the request based on a response from the manager. When the request is not approved, the product education system 142, in operation 460, notifies the user that the order cannot be processed. When the request is approved, the product education system 142, in operation 435, allows the trade to be processed.

As described herein, the product education system 142 may provide, present, display, and/or cause to be displayed various different graphical user interfaces to a user of the client device 110 in order to facilitate the reception of input from the user and present information (e.g., training or other educational information) to the user, among other things.

Figure 5A:
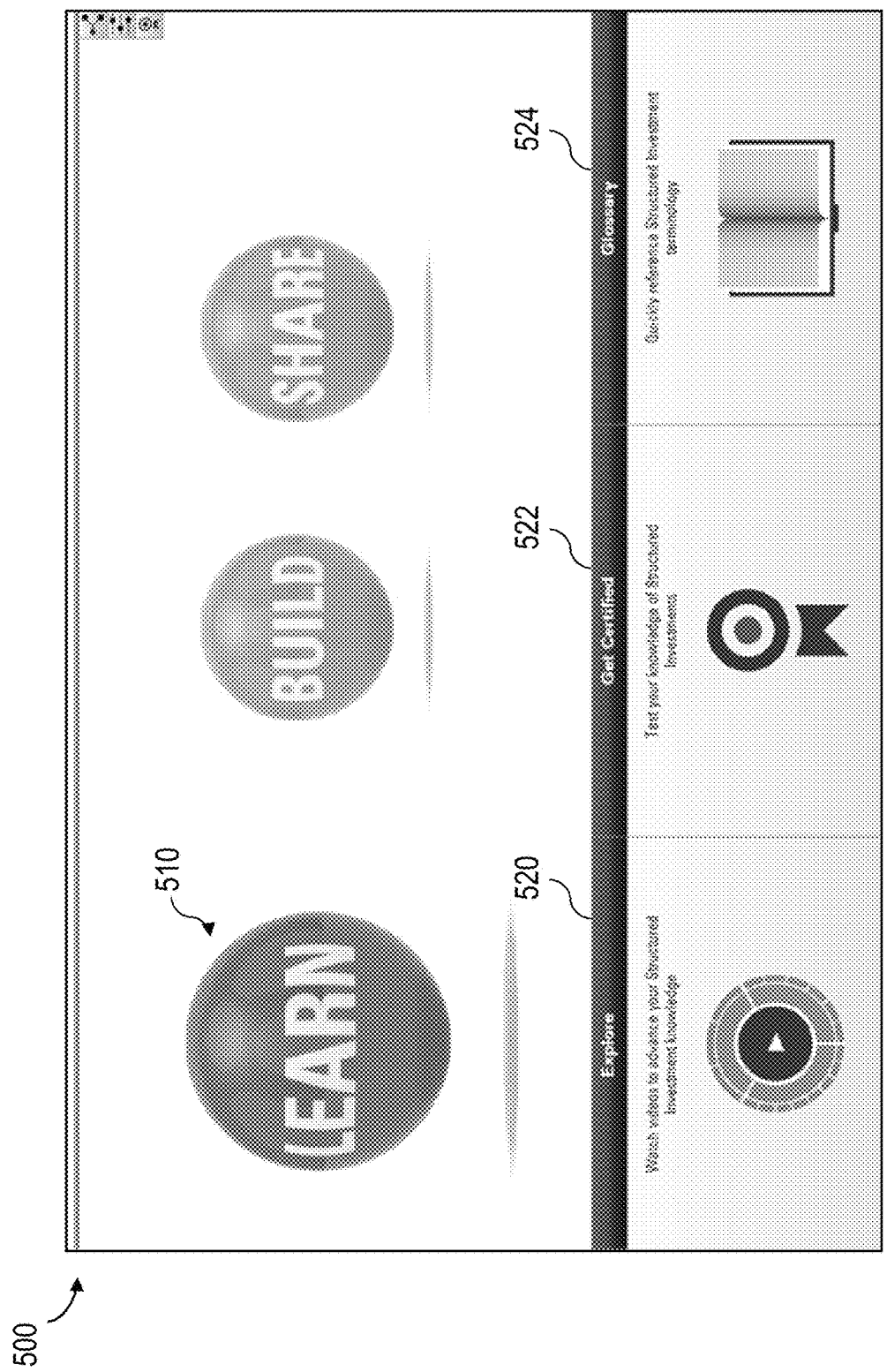
FIGS. 5A-5F are display diagrams illustrating example user interfaces provided by the product education system.

FIG. 5A depicts a user interface 500 that displays different functions provided by the electronic platform 140, including a "learn" function, represented by display element 510, that is associated with functionality provided by the product education system 142. Upon receiving a user selection of display element 510, the user interface 500 presents various user-selectable display elements, each associated with different functions provided by the product education system 142. For example, the user interface 500 displays an "explore" display element 520 that is associated with the electronic platform 140 presenting education information to the user about various investment products, a "get certified" display element 522 that is associated with the electronic platform 140 presenting online courses or seminars for various investment products tradable over the electronic platform 140, and "glossary" display element 524 that is associated with the electronic platform 140 presenting reference information.

Figure 5B:
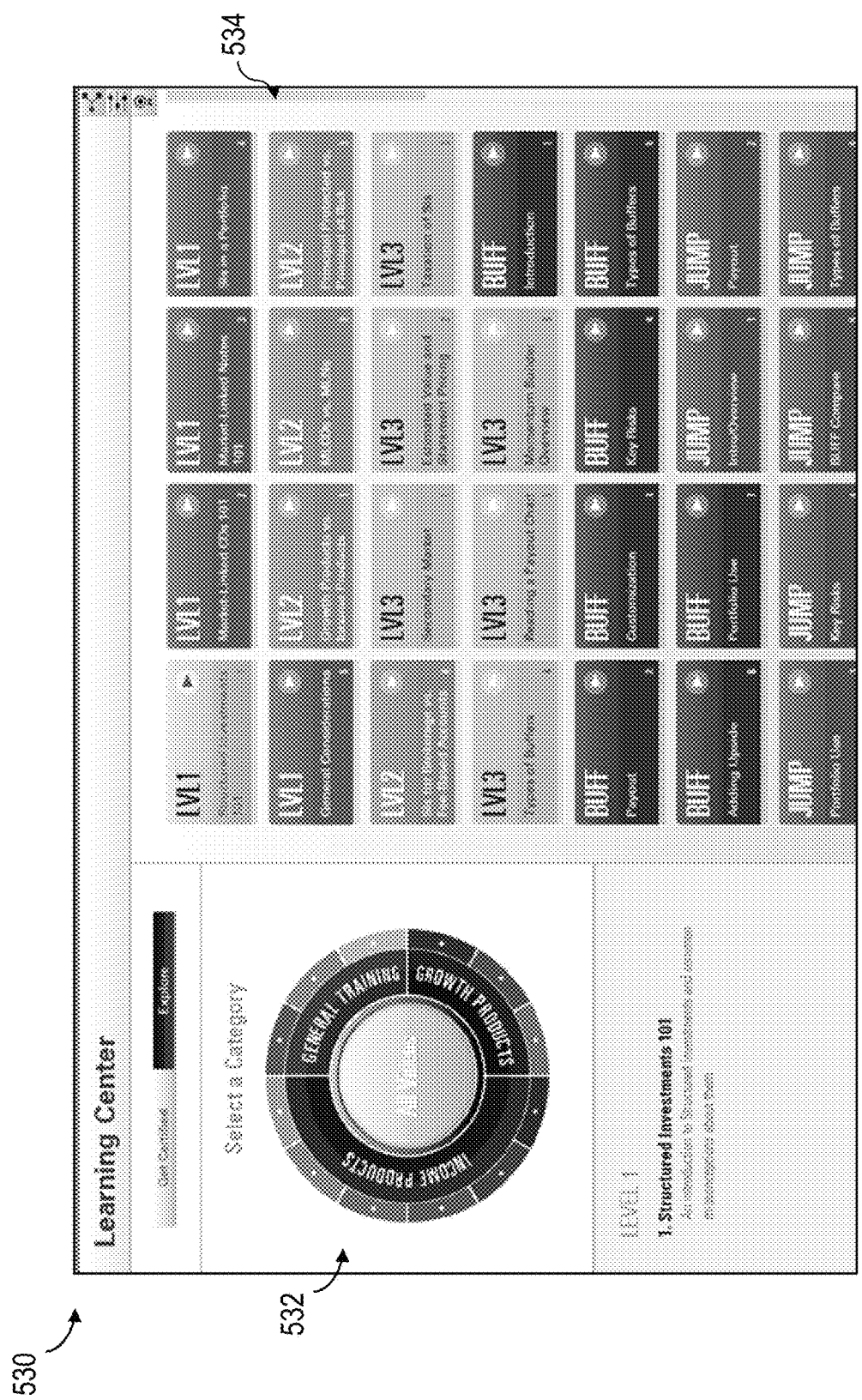

FIG. 5B depicts a user interface 530 that presents information associated with the "Explore" functions provided by the electronic platform 140. For example, the user interface 530 presents different user-selectable information categories 532 and various user-selectable training videos 534 for various certification tracks, such as levels and product types (e.g., buffer notes, jump notes, level 1, level 2 and level 3), among other tracks.

Figure 5C:
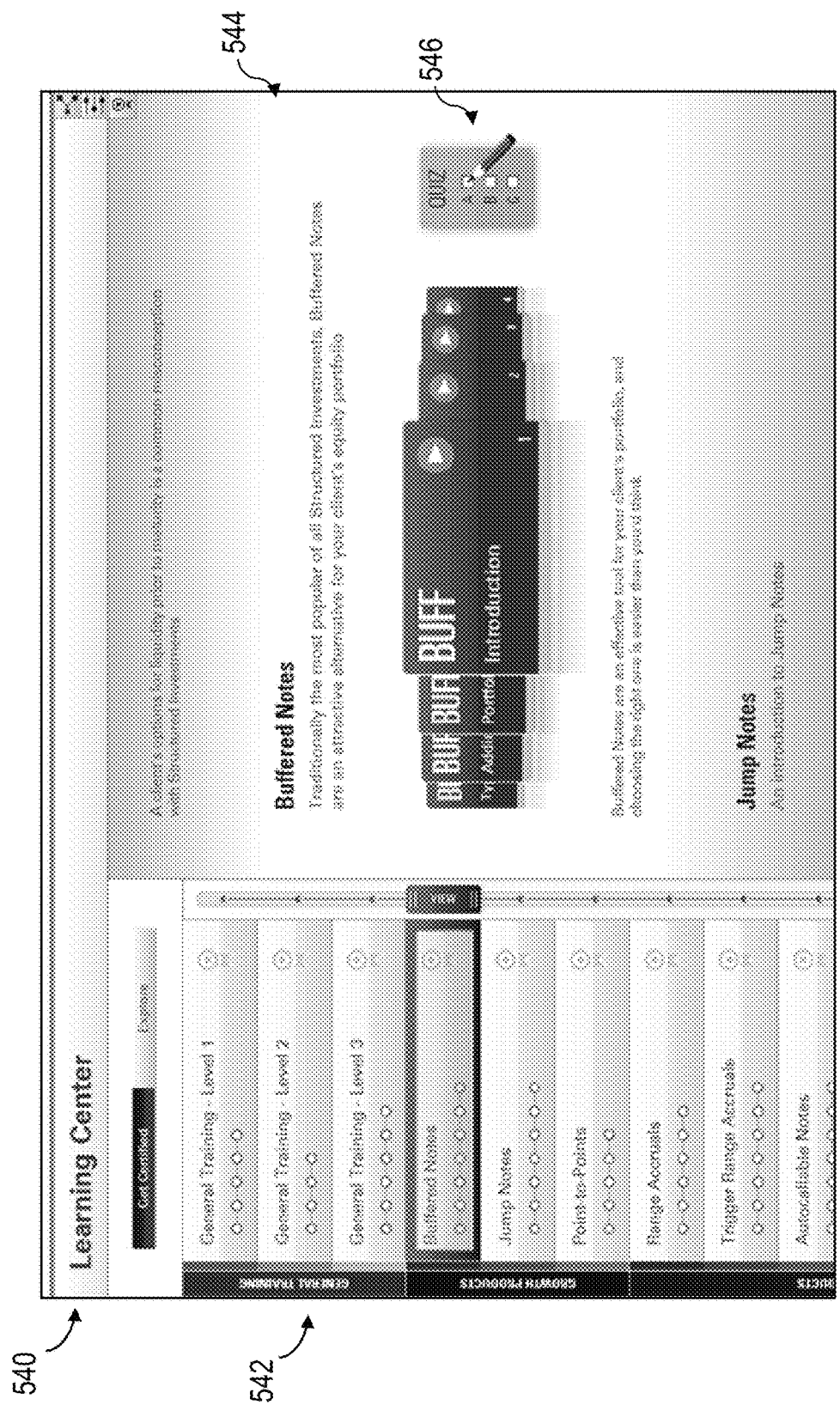

FIG. 5C depicts a user interface 540 that presents information associated with the "Get Certified" functions provided by the electronic platform 140. For example, the user interface 540 presents different user-selectable certification categories 542, such as "General Training," "Income Products," and "Growth Products," as well as certification tracks (e.g., training levels, specific types of products). The user may select any of the categories and certification tracks to see training contents (e.g., videos, notes, articles) necessary for that level of certification. The user interface 540 displays information 544 about a selected certification track ("buffered notes"), as well as a user-selectable display element 546, which, when selected, prompts the electronic platform to present a quiz or test associated with the selected certification track.

Figure 5D:
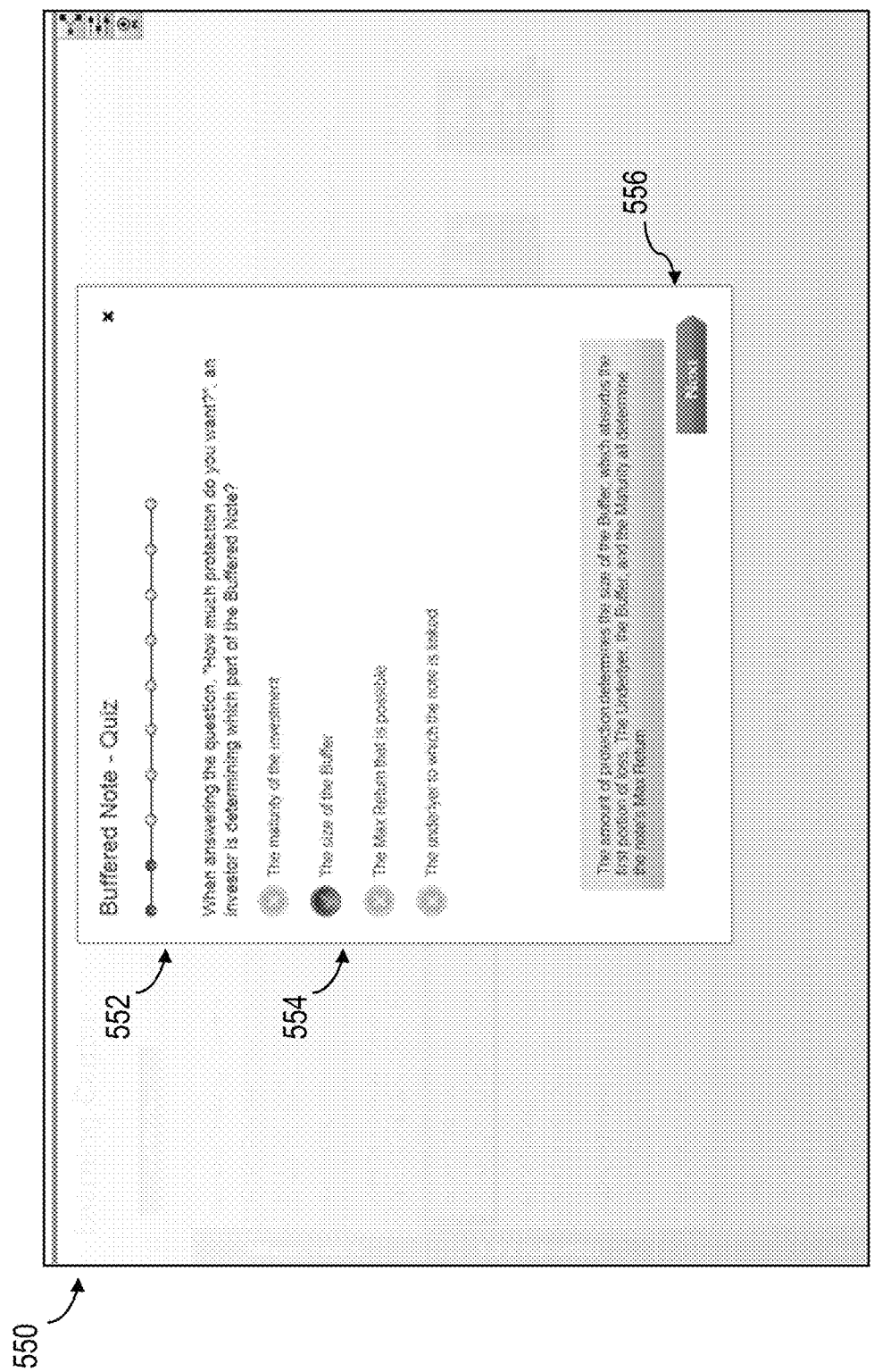

FIG. 5D depicts a user interface 550 that presents an example quiz associated with a selected certification track, including a question portion 552, a user-selectable answer portion 554, and an answer submittal portion. As described herein, once the user reviews all the relevant training contents for the chosen track, the user is presented with a quiz, or collection of questions, to get certified for the track. The certification questions may be a multiple-choice type questions, and may include a text area for the question text, a collection of radio buttons for possible answers, and a button that, when clicked, submits the selected answer.

Figure 5E:
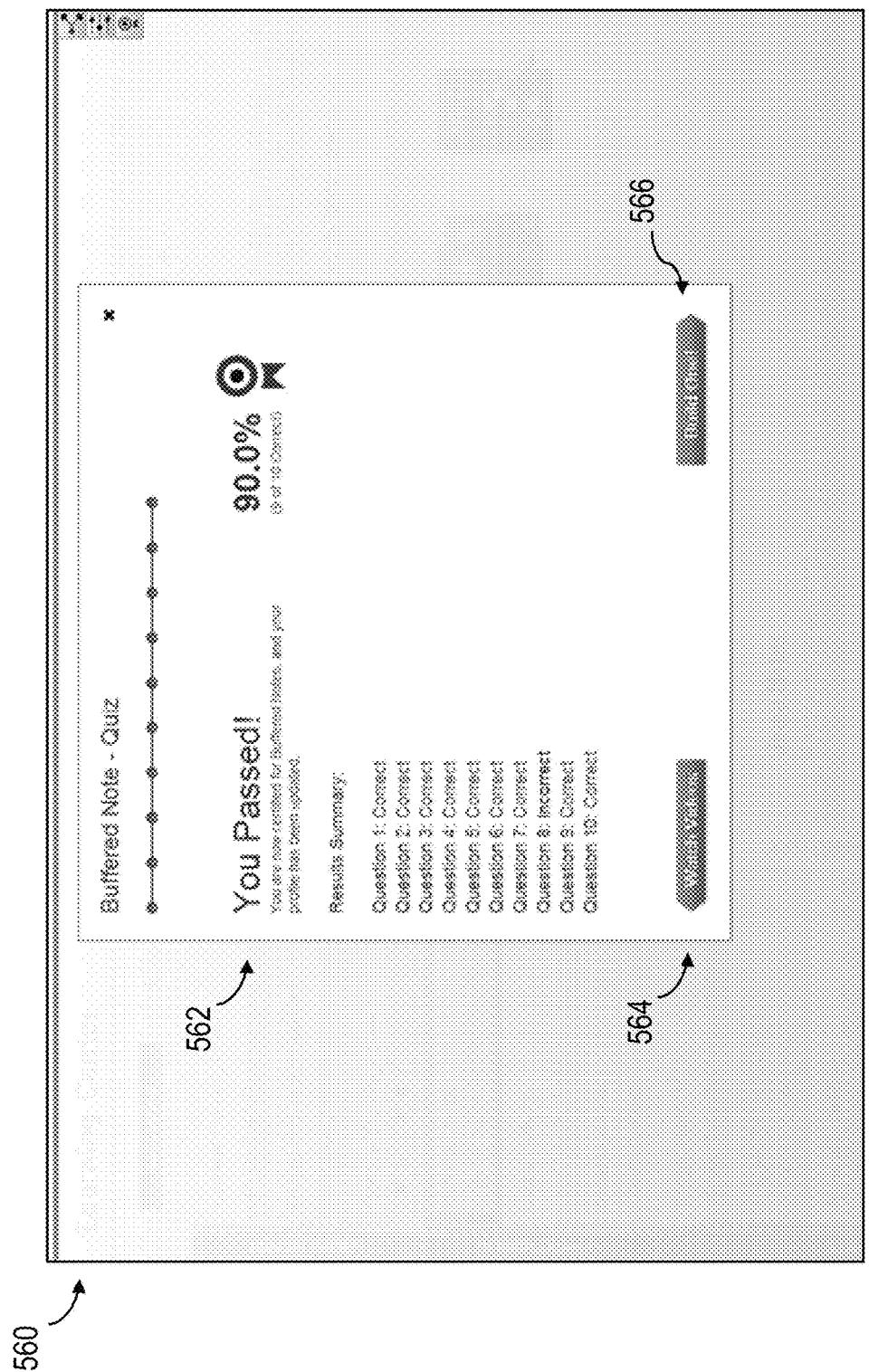

FIG. 5E depicts a user interface 560 that presents the results of a quiz taken by the user. For example, the user interface 560 displays information 562 that indicates whether the user passed the quiz, and is certified for the track, and information 564 detailing the results for each question in the quiz. Once the user completes the certification, the certification status may appear on the user's profile page, and in some embodiments, the user's manager may also receive an update regarding the certification on his or her management dashboard.

The user interface 560 also displays a user-selectable display element 566 associated with building investment products associated with the user's new certification. For example, once the user is certified, the user may select display element 566, which causes the electronic platform 140 to navigate the user to the product generation system 144 (and its various user interfaces) to being building and trading investment products via the electronic platform 140 for which the user is newly credentialed.

Figure 5F:
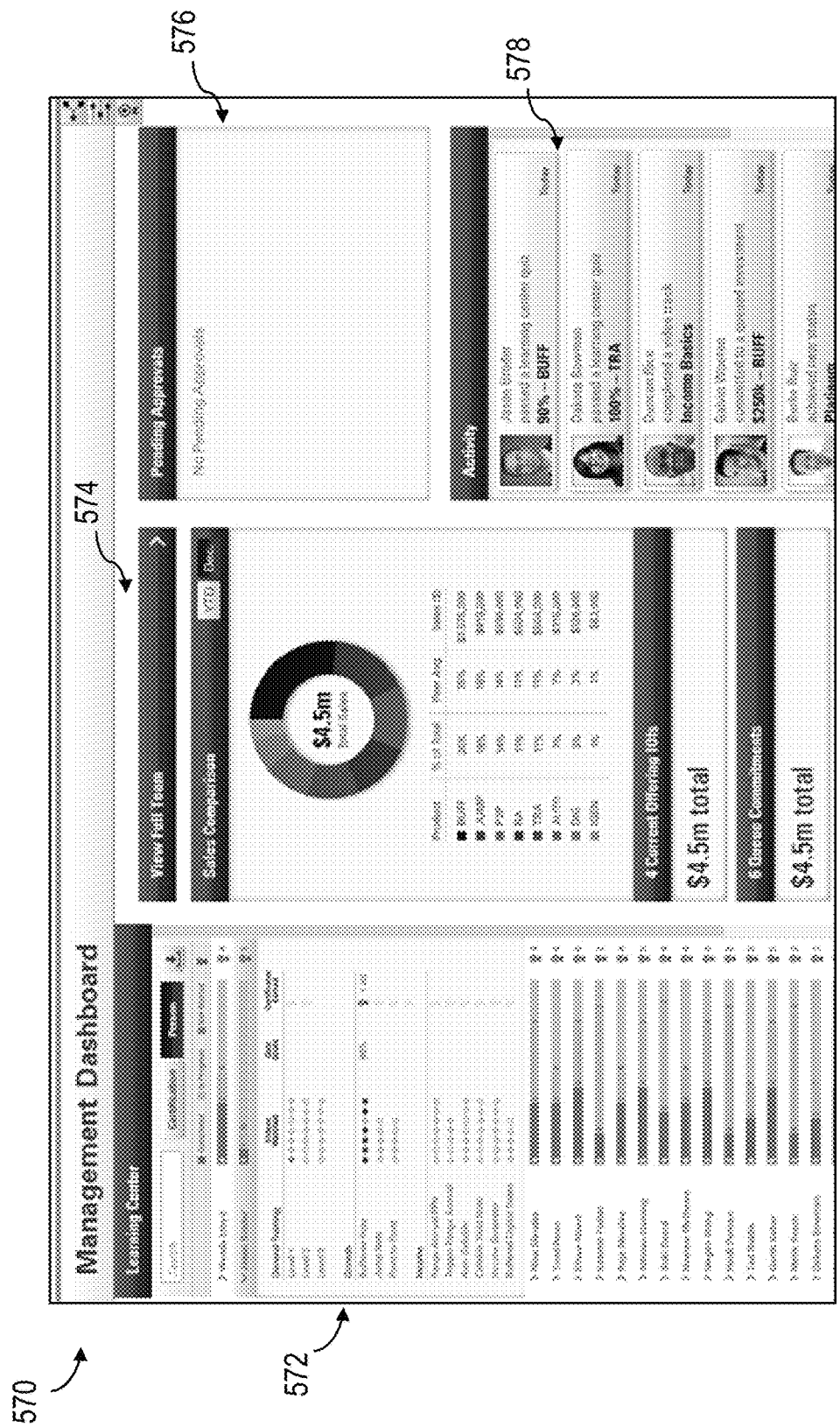

FIG. 5F depicts a management dashboard 570 for a manager or an admin user to view certification progress metrics across all relevant product types for all the users in the manager's group. In some embodiments, from the management dashboard 570, the manager may view certification progress by user in the "Learning Center" area 572 and click on an individual user's name to see which product types that individual has or has not received certifications.

The manager may also select a particular course or product type that an individual user has taken to see a list of all quizzes taken for that course by the user. The manager may then drill down into a particular quiz to see how the user performed on the quiz and which questions were answered correctly/incorrectly by the user. The manager can also view progress by product type to see how many people in the group have not started or completed their certifications for each product type. The management dashboard also contains a "View Full Team" area 574, which allows the manager to see a list of all users in the manager's group or team. The manager may see the users who are currently logged in, users who have and users who have not activated their accounts, and so on. The manager may send a message to invite the users who have not activated their account to do so.

In some embodiments, the management dashboard 570 may include an "Activity" area 578 for displaying an activity feed. The activity feed may provide updates regarding various activities of the users in the manager's team. Such activities may include, for example, certification-related or training activities (e.g., watching a training video, taking a quiz), trading activities, and so on.

In some embodiments, the management dashboard 570 also includes a "Pending Approvals" area 706 for displaying pending approvals or other unresolved action requests (e.g., Indication of Interest (IOI), requested trades) so the manager may approve or decline the requests. The manager may select any of the displayed action requests to view details of the request and approve or decline the request, such as a trade on a product type submitted by a user in the manager's team. The manager may view the user's certification metrics to determine whether the user is certified and thus qualified to trade on the product type. For example, if the user is certified for the product type, the manager may approve the trade. Similarly, if the user is not yet certified for the product type, the manager may decline the trade, and the electronic platform 140 may send a request to the user to get certified in order to submit the trade.

Thus, in some embodiments, the product education system 142 may receive a request from a user to trade an investment product, identify a training module associated with a certification program provided by the electronic platform and associated with trading the investment product via the electronic platform, present the training module to the user, determine whether the user has completed the training module, when the determining indicates that the user has completed the training module, identify a test corresponding to the training module, present the test to the user, determine whether the user has passed the test, and certify the user to trade the investment product when the user has passed the test.

Examples of the Product Generation System

As described herein, in some embodiments, the electronic platform 140 includes the product generation system 144, which discovers, selects, builds, creates, modifies, and/or generates investment products based on various decision-tree analysis methods. For example, the product generation system 144 may utilize a decision tree and pricing data to classify investment products against a set of predefined questions, based on answers to those questions. The product generation system 144 presents a series of questions to a user to assess the user's investment objectives, risks, and/or other considerations, and identifies one or more investment products that meet those investment objectives, risks, and/or other considerations. Often, a list of investment products for classification and subsequent discovery or generation is not fixed, but rather changes dynamically based on current pricing data, such as data received from the exchange market server 130. In some embodiments, the product generation system 144 may determine pricing information for investment products using one or more pricing models and current pricing conditions.

In some embodiments, the product generation system 144 may incorporate user input. For example, each question in the series of questions may be selected based on the user's answer to the previous question, and each answer reduces a potential list of applicable investment products. Also, the product generation system 144 may utilize current pricing data, which enables the product generation system 144 to filter out potential investment products that cannot be priced given the investment objectives, risks and/or other considerations. Thus, by using the product generation system 144 provided by the electronic platform, a user may discover or generate one or more financial products that not only match the investment objectives, risks and/or other considerations specified by the user, but are also priced based on current market conditions. In some embodiments, the product generation system 144 may discover off-the-shelf investment products, may customize products for users, and/or may create combinations of off-the-shelf investment products and customized investment products.

Figure 6:
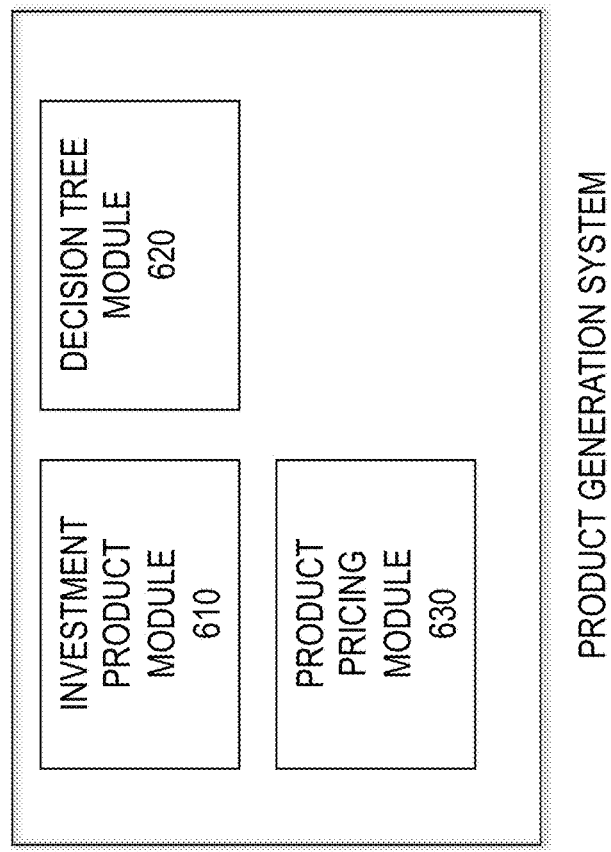
FIG. 6 is a block diagram illustrating components of a product generation system.

FIG. 6 is a block diagram illustrating components of the product generation system 144. The product generation system 144 may include one or more modules and/or components to perform one or more operations of the product generation system 144. The modules may be hardware, software, or a combination of hardware and software, and may be executed by one or more processors. For example, the product generation system 144 may include an investment product module 610, a decision tree module 620, and a product pricing module 630.

In some embodiments, the investment product module 610 is configured and/or programmed to maintain a list of investment product classifications, each associated with one or more investment product categories or classes, an updated list of investment products, and an updated list of assignments of investment products to investment product categories. In some embodiments, each classification is associated with multiple investment product classes. For example, a classification may be the investment objective, and one associated class may be growing assets and another associated class may be earning income on assets. As another example, a classification may be the level of risk tolerance, and one associated class may be small, another associated class may be medium, and yet another class may be large.

In some embodiments, the decision tree module 620 is configured and/or programmed to guide a user in traversing a decision tree built on investment product classifications to discover and identify investment products of interest to the user. For example, the decision tree module 204 manages user selections of investment product categories, and interacts with the investment product module 610

In some embodiments, the product pricing module 630 is configured and/or programmed to generate updated pricing data associated with investment products using one or more pricing models, and/or access other pricing model systems for updated pricing information. For example, the decision tree module 620 may utilize updated or current pricing information when discovering and identifying investment products of interest to the user.

Figure 7:
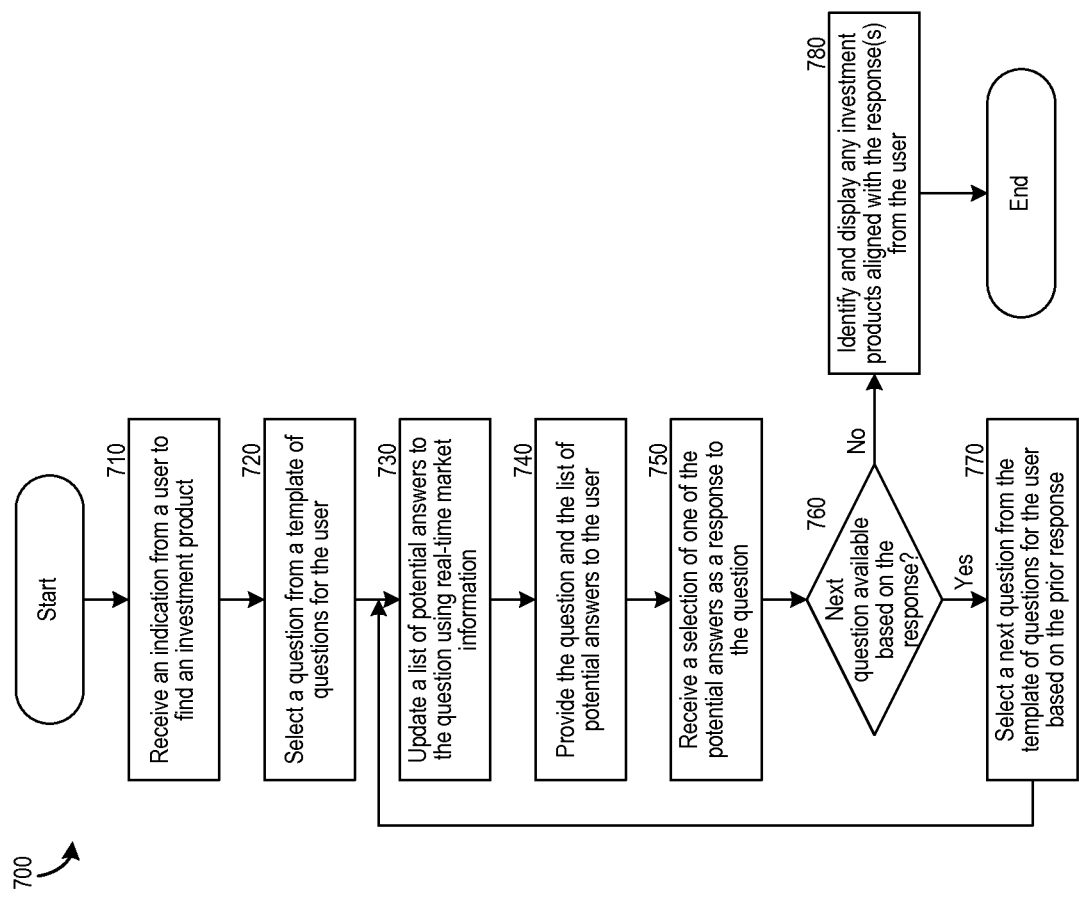
FIG. 7 is a flow diagram illustrating a method for selecting an investment product based on information provided by a user of the electronic platform.

As described herein, the product generation system 144 may perform various operations, processes, and methods when selecting and/or generating user investment products for users via the electronic platform 140. FIG. 7 is a flow diagram illustrating a method 700 for selecting an investment product based on information provided by a user of the electronic platform 140. The method 700 may be performed by the product generation system 144 and, accordingly, is described herein merely by way of reference thereto. It will be appreciated that the method 700 may be performed on any suitable hardware.

In operation 710, the product generation system 144 receives an indication from a user to find a suitable investment product. In operation 720, the product generation system 144 selects a question to present to the user. In operation 730, the product generation system 144 updates a list of potential answers to the question based on real-time market condition information, such as information received from the exchange market server 130.

In operation 740, the product generation system 144 provides the question and the updated list of answers to the user, and, in operation 750, receives a selection of one of the answers from the user. In operation 760, the product generation system 144 determines whether more questions are to be presented to the user. When more questions are to be presented, the product generation system 144, in operation 770, selects a next question to present to the user, and proceeds to operation 730 for the next selected question. When no more questions are to be presented, the product generation system 144, in operation 780, identifies and displays any investment products that include parameters that satisfy responses received from the user.

Thus, in some embodiments, the product generation system 144 selects a structured investment product for a user of the electronic platform 140 by receiving, via a graphical user interface provided by the electronic platform 140, information from a user, the information including: information associated with a user's investment criteria, information associated with a user's risk tolerance, information associated with a user's investment horizon, information associated with a user's desired investment market, and/or information associated with a user's level of investment protection, determines real-time or near real-time conditions of the investment market, and selects one or more structured investment products based on the information received from the user and based on the real-time or near real-time conditions of the investment market.

Figure 8:
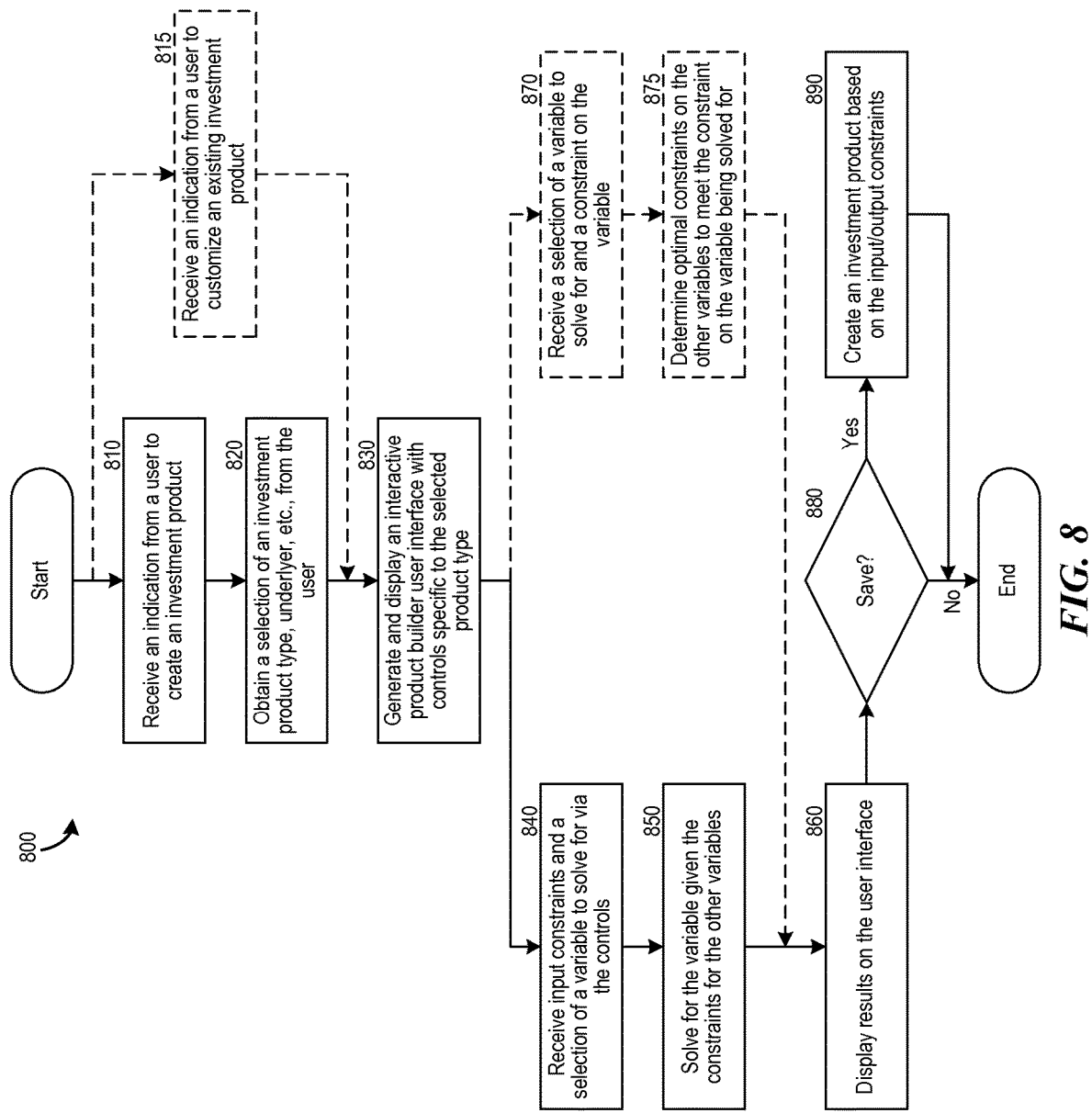
FIG. 8 is a flow diagram illustrating a method for building an investment product based on information provided by a user of the electronic platform.

FIG. 8 is a flow diagram illustrating a method 800 for building an investment product based on information provided by a user of the electronic platform. The method 800 may be performed by the product generation system 144 and, accordingly, is described herein merely by way of reference thereto. It will be appreciated that the method 800 may be performed on any suitable hardware.

In operation 810, the product generation system 144 receives an indication from a user to create an investment product. Alternatively, the product generation system 144 may, in operation 815, receive an indication from a user to customize an existing investment product.

In operation 820, the product generation system 144 obtains a selection of an investment product type (or underlyer) from the user, and in operation 830, generates a user interface that is configured to generate an investment product of the selected type. In operation 840, the product generation system 144 receives input constraints and a variable to solve for via one or more user-selectable controls of the user interface. In operation 850, the product generation system 144 solves for the variable given the input constraints, and, in operation 860, display results of the solution via the user interface.

Alternatively, in operation 870, the product generation system 144 receives a selection of a variable to solve for, and a constraint on the variable, and in operation 875, determines optimal constraints on the other variables to meet the constraint on the variable to solve for. In operation 880, the product generation system 144 determines whether to save the result, and when the result is to be saved, the product generation system 144, in operation 890, creates an investment product based on the input/output constraints.

Figure 9:
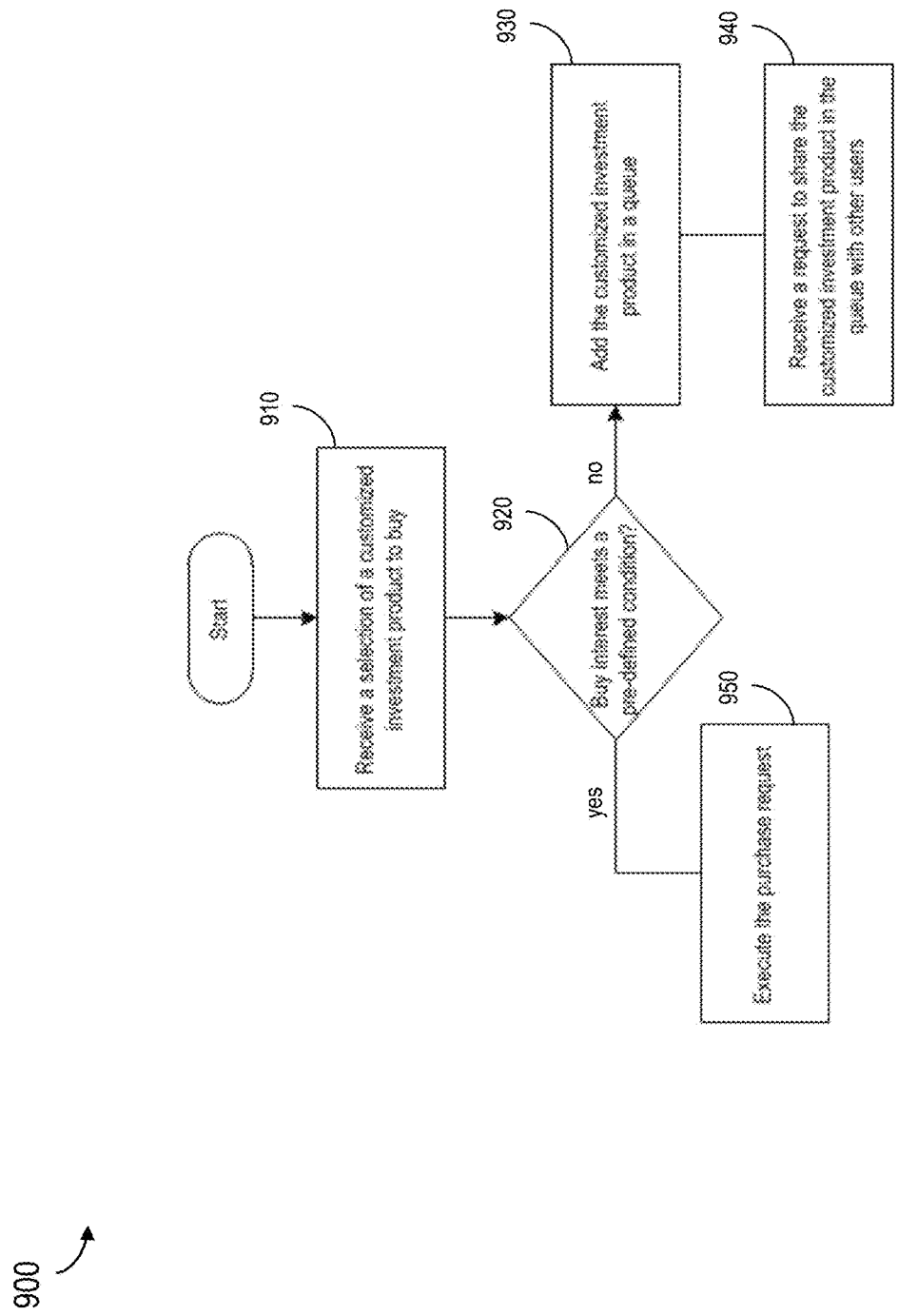
FIG. 9 is a flow diagram illustrating a method for providing a custom investment product to a user of the electronic platform.

In some embodiments (details of which are described herein), the product generation system 144 may utilize information from the product exchange system 146 when customized products for users. FIG. 9 is a flow diagram illustrating a method 900 for providing a custom investment product to a user of the electronic platform. The method 900 may be performed by the product generation system 144 and, accordingly, is described herein merely by way of reference thereto. It will be appreciated that the method 900 may be performed on any suitable hardware.

In operation 910, the product generation system 144 receives a selection of a customized investment product to trade. In operation 920, the product generation system 144 determines whether the buy interest meets a pre-defined trading condition. When the interest meets the condition, the product generation system 144, in operation 950, executes a trade request for the product, else, in operation 930, the product generation system 144 adds the customized investment product into a queue and, in operation 940, receives a request to share the investment product in the queue with other users.

As described herein, the product generation system 142 may provide, present, display, and/or cause to be displayed various different graphical user interfaces to a user of the client device 110 in order to facilitate the reception of input from the user and present information associated with selecting or generating investment products to the user, among other things.

Figure 10A:
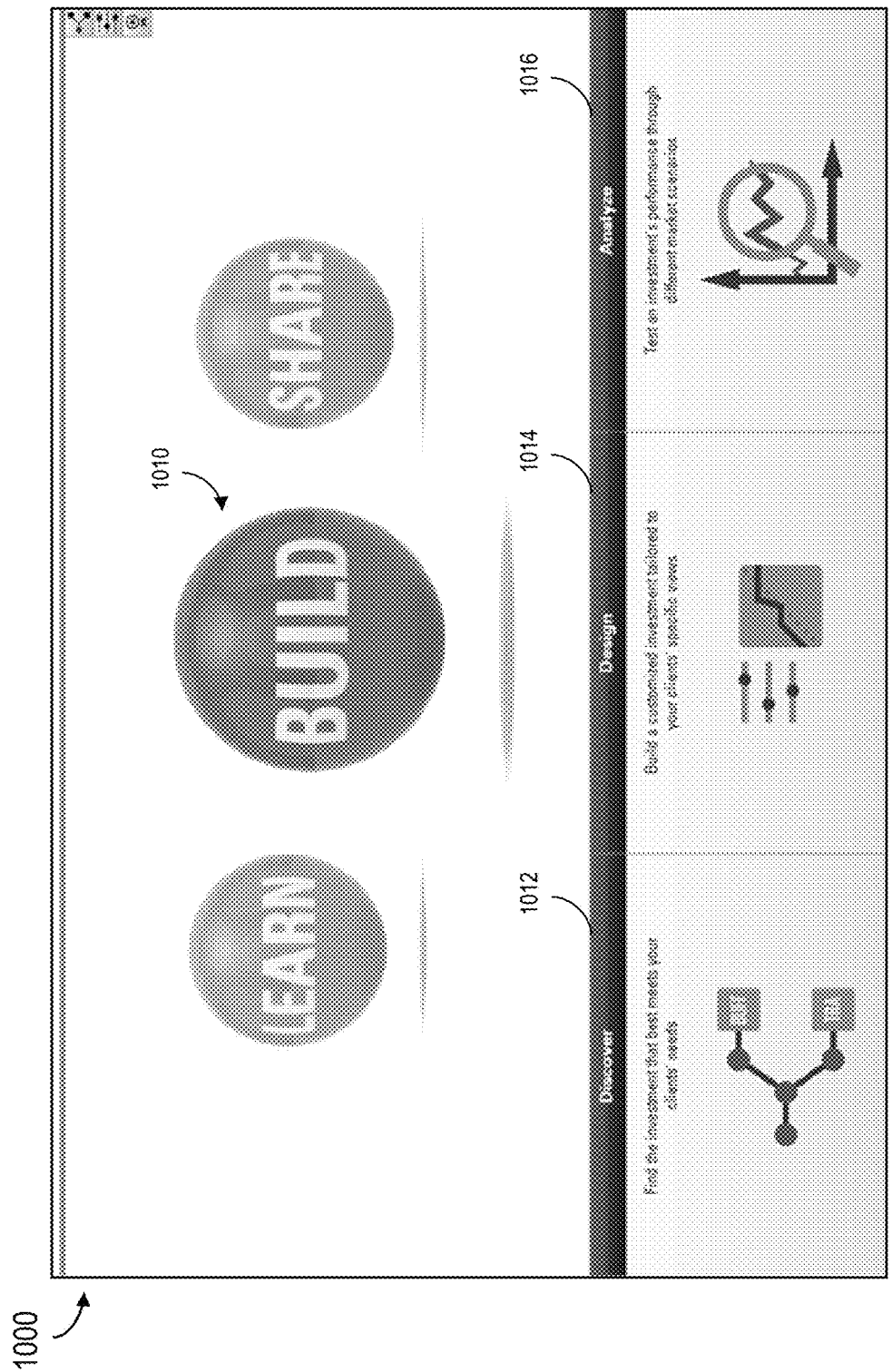
FIGS. 10A-10K are display diagrams illustrating example user interfaces provided by the product generation system.

FIG. 10A depicts a user interface 1000 that displays different functions provided by the electronic platform 140, including a "build" function, represented by display element 1010, that is associated with functionality provided by the product generation system 144. Upon receiving a user selection of display element 1010, the user interface 1000 presents various user-selectable display elements, each associated with different functions provided by the product generation system 144. For example, the user interface 1000 displays a "discover" display element 1012 that is associated with the electronic platform 140 discovering investment products for a user, a "design" display element 1014 that is associated with the electronic platform 140 creating, building, or otherwise generating investment products for a user, and an "analyze" display element 1014 that is associated with the electronic platform 140 performing various analysis functions for a given investment product.

In some embodiments, selection of the "discover" display element 1012 causes the product generation system 144 to traverse a decision tree that traces the investment product categories. The traversal of the decision tree is communicated to the user through an investment finder wizard, or other display of questions, that takes the user through a corresponding series of question-and-answer steps to help the user identify the investment product categories or investment products that best align with his or her interests. Each node of the decision tree generally corresponds to an investment product classification covering a group of investment product categories, with, for example, the higher up the node in the tree, the larger the group.

In general, while investment product categories generally do not change much over time, the investment products that belong to each investment product category may continuously vary as investment products are created and eliminated based on market conditions, which tend to be in a state of flux. As a result, the summary or characterization of each investment product category based on the constituent financial products may change from time to time as well.

In some embodiments, the "discover" function accesses information about investment products and associated pricing data. Therefore, while each question presented by the investment finder wizard, which corresponds to an investment product classification, remains largely unchanged, the final answers, each of which corresponds to an investment product category or an investment product, depend on not only the series of answers given in response to the series of questions that have been asked, but also the real-time data gathered at the time the investment wizard is launched.

In some cases, the "discover" function may gather real-time data every time a question is asked. A final answer may even correspond to a new investment product that is not currently offered to other users, but is created based on the series of answers given by the user, which reflect the user's investment preferences and interests. Furthermore, the "discover" function may pre-order the product classifications to preselect a decision-tree structure (excluding the leaves) and use the same structure each time. Alternatively, the "discover" function may follow a different order of investment product classifications and develop a different decision-tree structure each time. The "discover" function may determine an order arbitrarily, by selecting an investment product classification that separates the current group into multiple categories that are as close in size as possible, and so on.

Figure 10B:
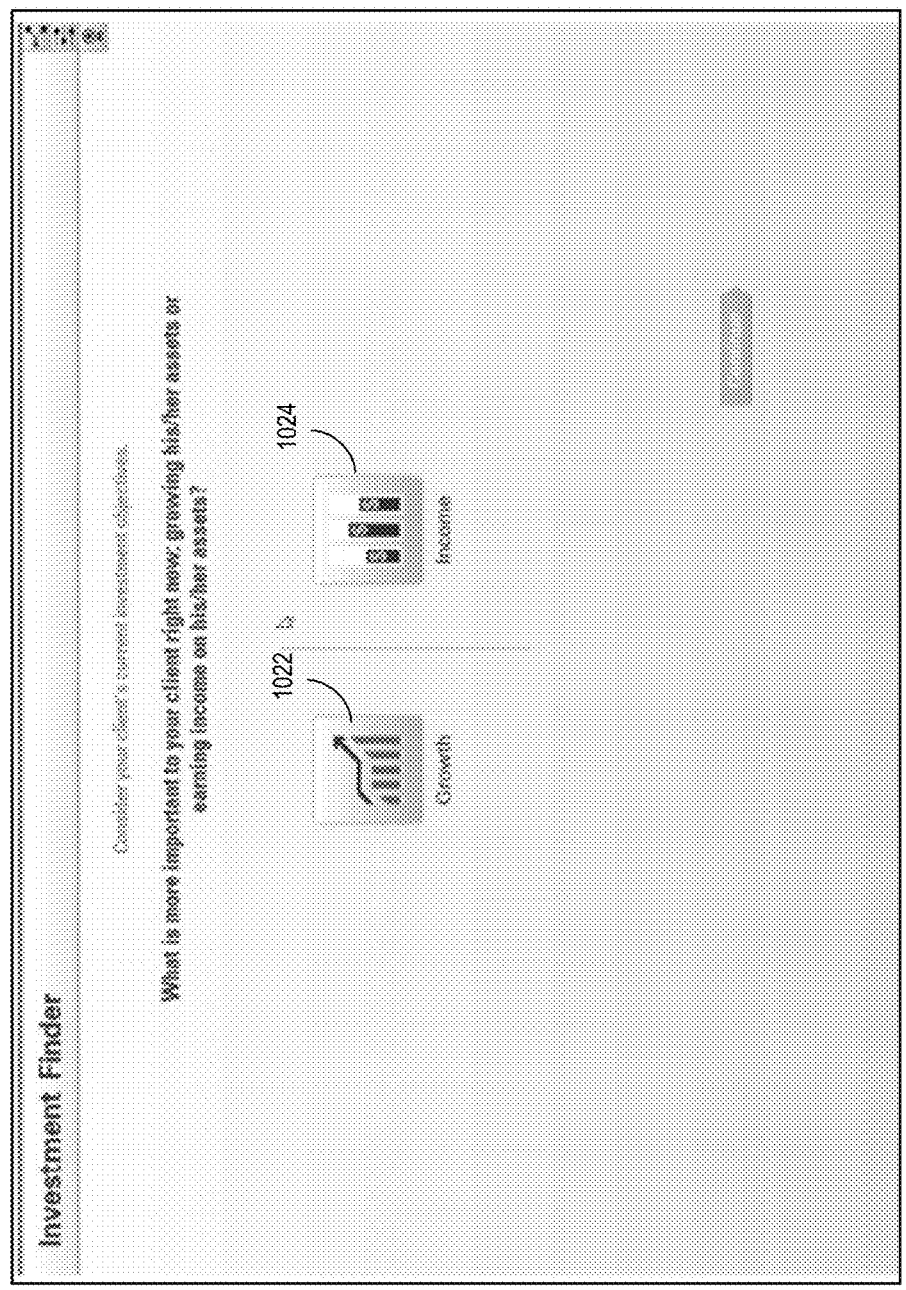

FIG. 10B depicts a user interface 1020 that presents information associated with a question about a user's investment objectives, along with user-selectable answers, such as a user-selectable option 1022 associated with a "growth" objective, an a user-selectable option 1024 associated with an "income" objective.

Figure 10C:
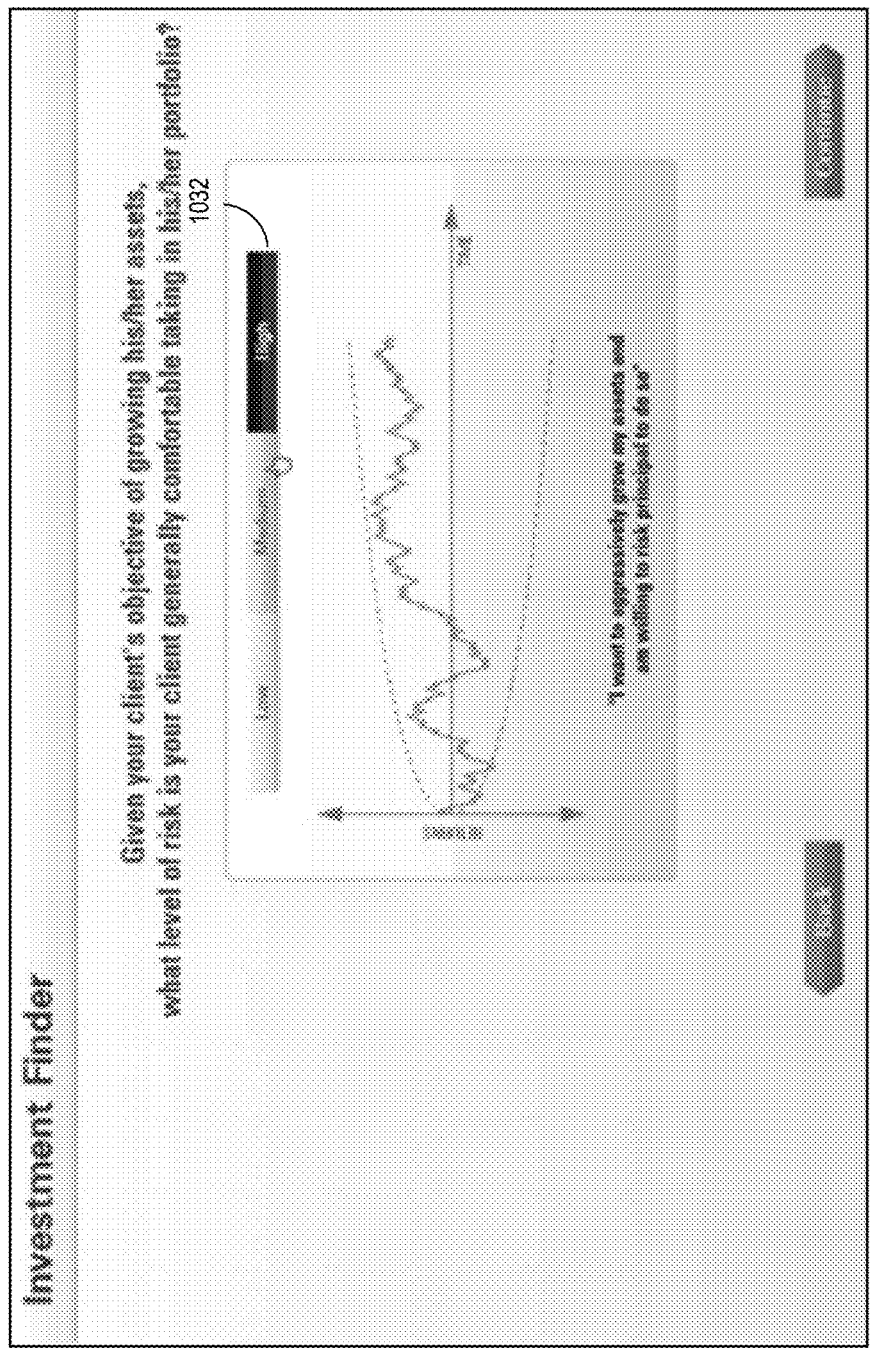
Figure 10D:
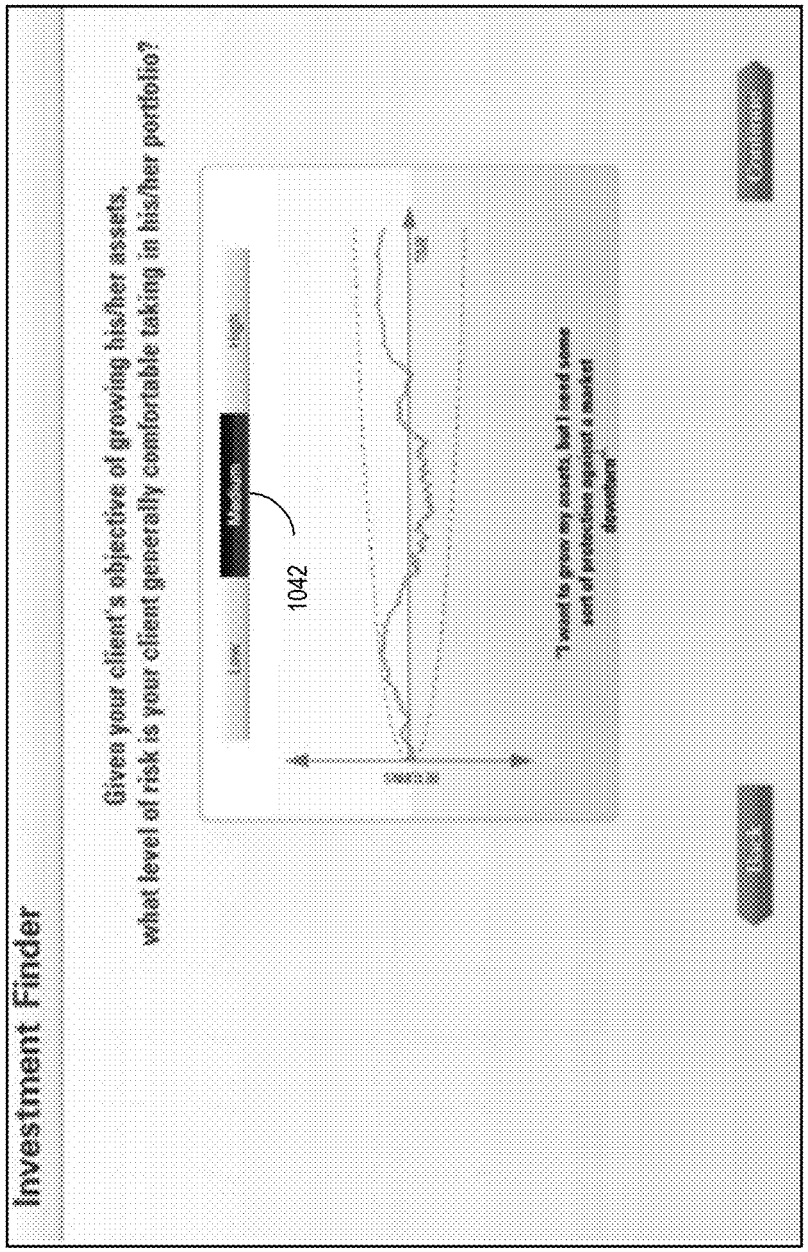

FIG. 10C depicts a user interface 1030 that presents information associated with a question about a user's investment risks, along with a user-selectable answer 1032 related to a user's risk level of high, and FIG. 10D depicts a user interface 1040 that presents information associated with a question about a user's investment risks, along with a user-selectable answer 1042 related to a user's risk level of medium.

Figure 10E:
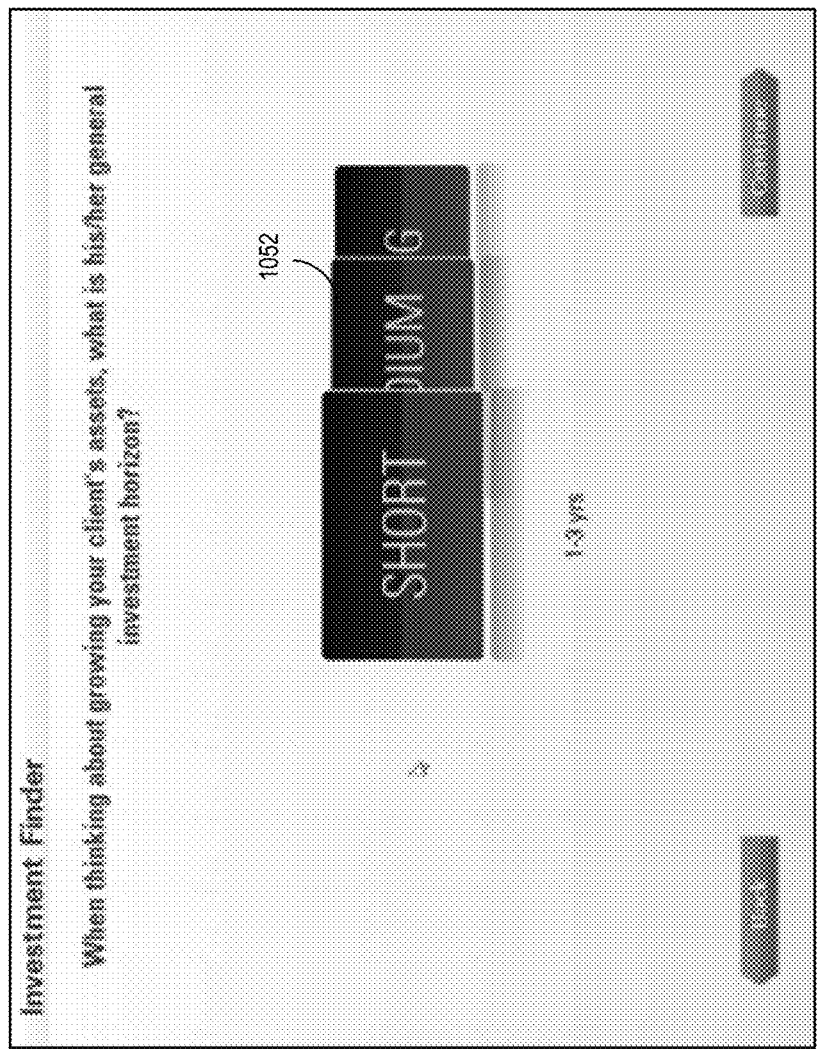

FIG. 10E depicts a user interface 1050 that presents information associated with a question about a user's investment horizon, along with user-selectable answers, such as a user-selectable option 1052 associated with a "medium" investment horizon.

Figure 10F:
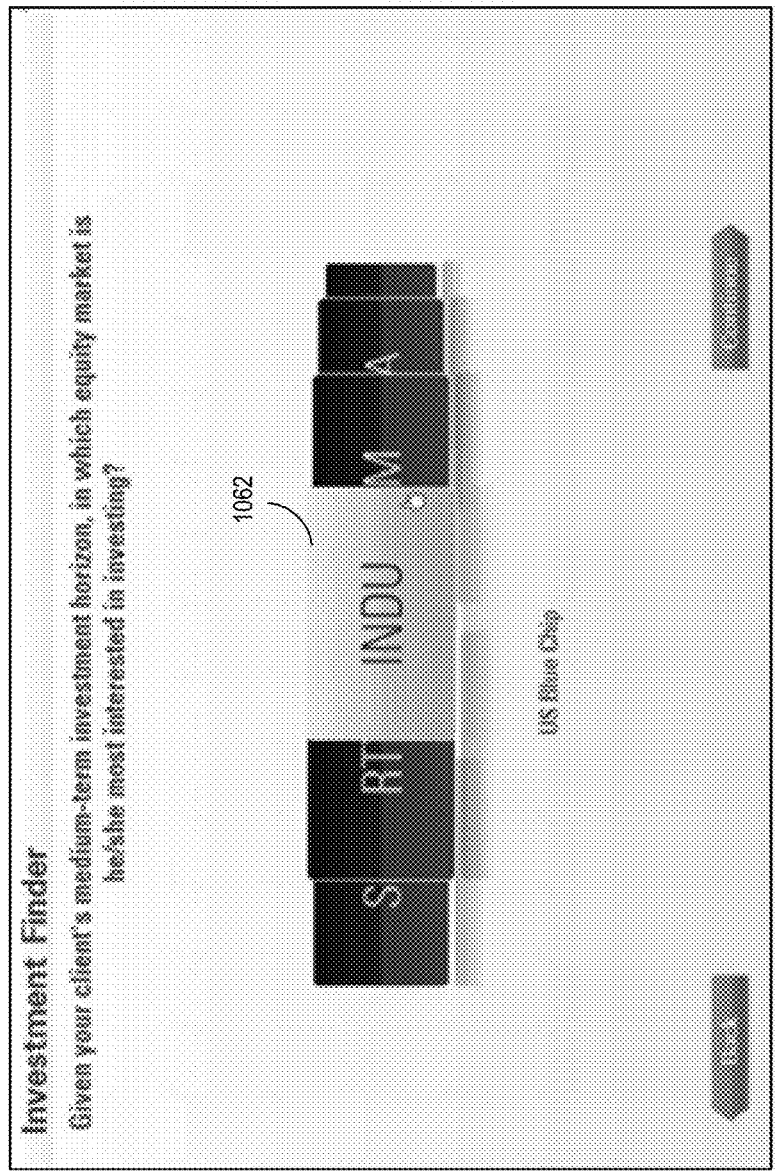

FIG. 10F depicts a user interface 1060 that presents information associated with a question about a user's markets of interest, along with user-selectable answers, such as a user-selectable option 1062 associated with the "blue chip" market.

Figure 10G:
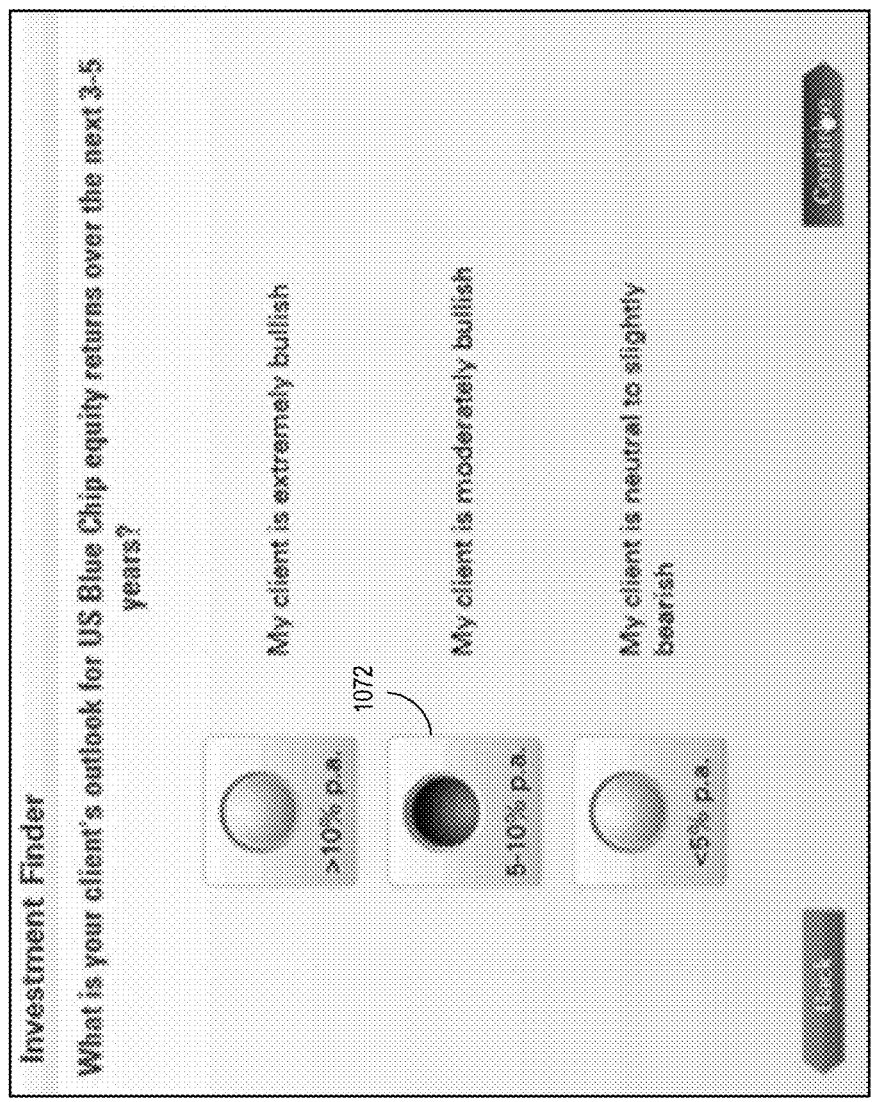

FIG. 10G depicts a user interface 1070 that presents information associated with a question about a user's market outlook, along with user-selectable answers, such as a user-selectable option 1072 associated with a "moderately bullish outlook" for the client.

Figure 10H:
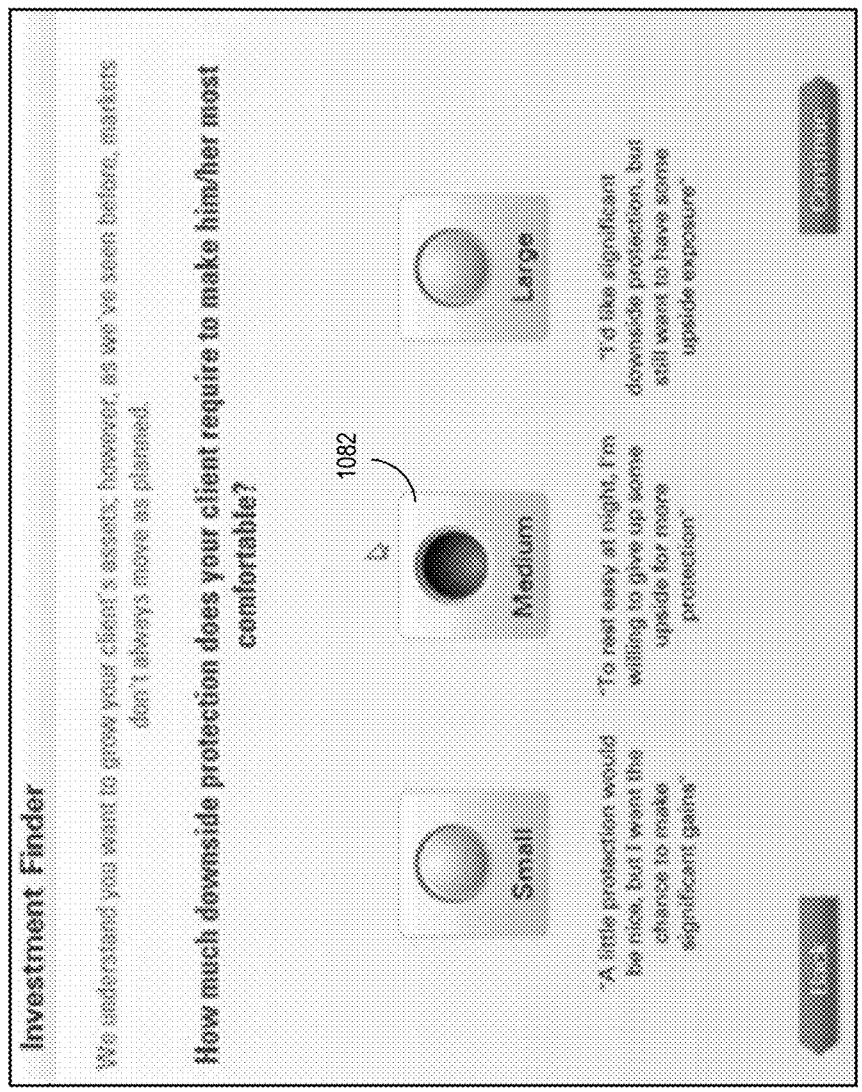

FIG. 10H depicts a user interface 1080 that presents information associated with a question about a user's downside protection, along with user-selectable answers, such as a user-selectable option 1082 associated with a "medium" level of downside protection.

Figure 10I:
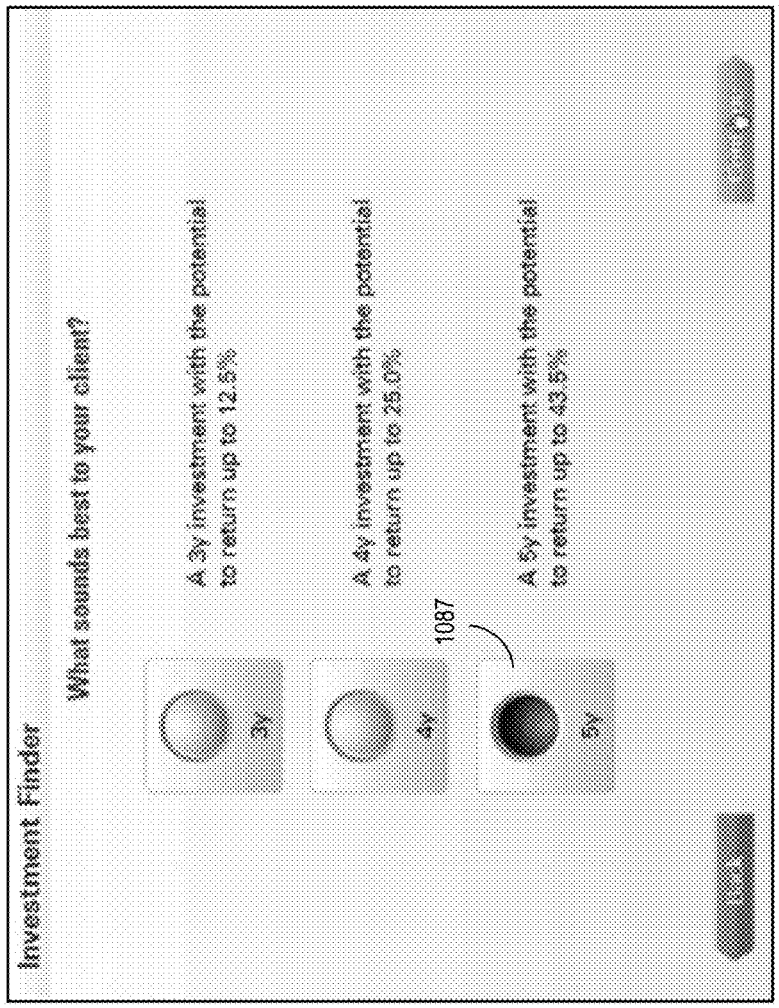

FIG. 10I depicts a user interface 1085 that presents information associated with a question about a user's preferred investment scenario, along with user-selectable answers, such as a user-selectable option 1087 associated with a preferred scenario.

Figure 10J:
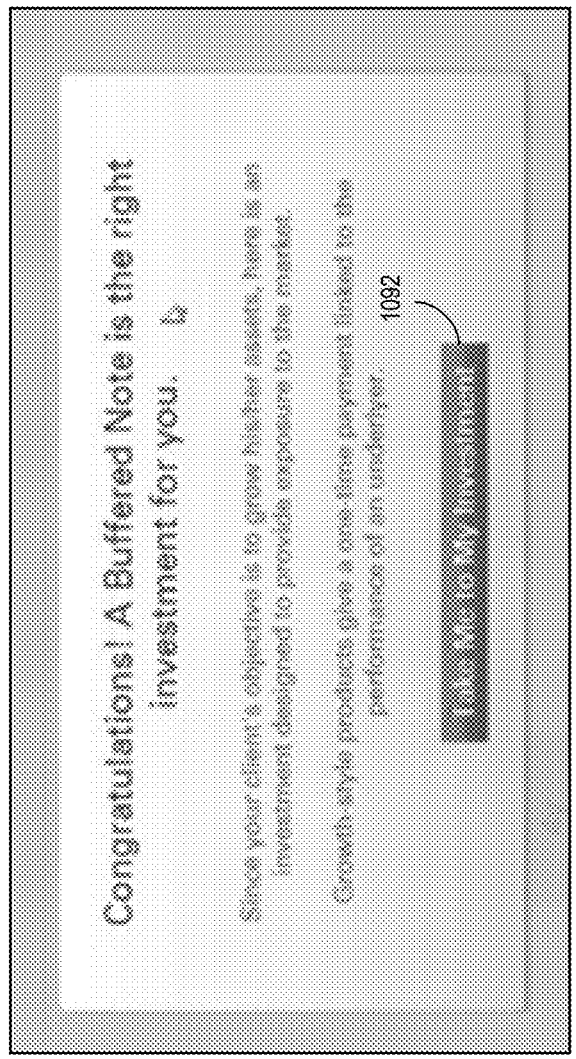

FIG. 10J depicts a user interface 1090 that presents information associated with an investment product selected for a user based on answers to a variety of posed questions (see FIGS. 10A-10I), as well as a user-selectable element 1092 which, when selected by a user, causes the electronic platform 140 to navigate the user to various areas provided by the product exchange system 146.

Figure 10K:
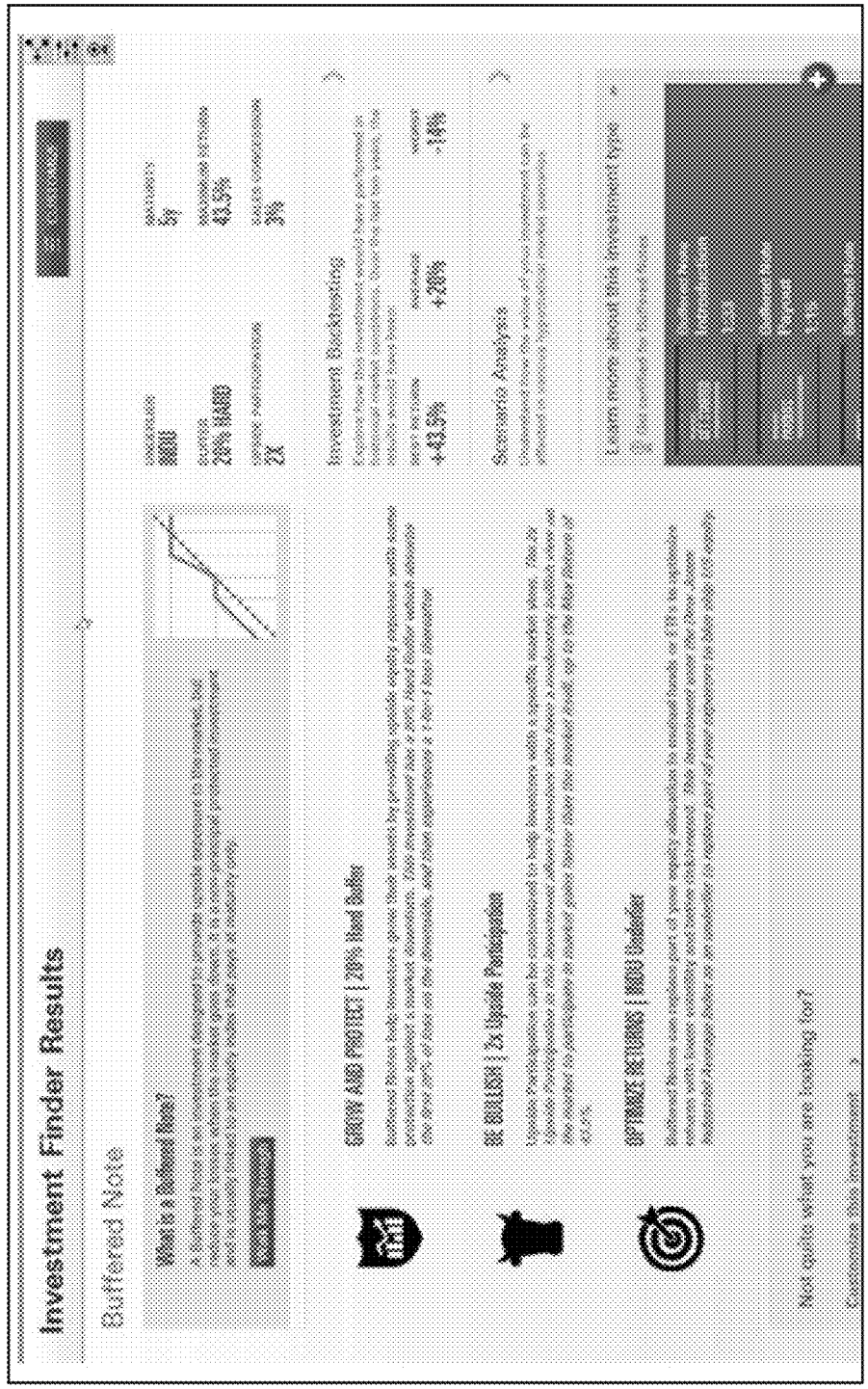

FIG. 10K depicts a user interface 1096 that presents information associated the results of the "discover" function, as depicted in FIGS. 10A-10J. In some embodiments, once the user completes all the steps, the investment finder wizard may display to the user a summary of his or her answers to the user. The investment finder wizard may also generate and display a list of suggested investment products or product categories based on the answers provided by the user. The illustrated detailed result of the "discover" function may show different types of data regarding a suggested investment product or investment product category, such as a definition, general characteristics, backtesting information, scenario analysis, related investment information, and/or education and certification programs (e.g., data provided by the product exchange system 146).

For example, backtesting allows the user to see how the suggested investment product would have performed in any past market scenario during a predetermined time span, such as the last ten years. On the other hand, scenario analysis allows the user to see how the suggested investment product may perform in a proposed market scenario (e.g., the underlier goes up by 20%), during a predetermined time span (e.g., the next ten years). The user may also save the list of suggested investment products or investment product categories for future reference. The user may then start building a customized investment product.

In some embodiments, the investment finder wizard includes questions allowing multiple answers and periodic checkpoints. The investment finder wizard may display a choice-and-consequence analysis at one or more of the periodic checkpoints before guiding the user through further steps. An administrative user may input questions and potential answers into the investment finder tool via an application programming interface (e.g., REST API).

As described herein, investments generally offer tradeoffs among their possible terms. For example, a basic bond will have coupon and maturity as two primary deal terms. Typically, the coupon will be higher as the maturity gets longer, so the investor must decide on a tradeoff between short maturity and higher yield. As part of the process of creating investments, potential investors typically want to see a range of possible deal terms. This is helpful to the investor when evaluating the tradeoffs among the various features, and deciding what deal terms are the best fit to their objectives.

However, for a dealer who sells the investments, it may be burdensome (or, impossible) to put together tables of viable deal terms for the investor, and it can be difficult to anticipate what terms the investor may be interested in. Each set of deal terms being evaluated requires the dealer to price the investment, which, in addition to usage of a pricing model, typically includes various adjustments to take into account expected trading costs and sales concessions. This process can be especially time consuming for investments with complex pricing models that are slow to calculate.

In some embodiments, the product generation system 144 enables investors to interactively, and/or with no perceivable latency, adjust deal terms and see the results. For example, the user may adjust a "slider" in a user interface corresponding to one deal term, and get pricing updated in real-time or near real-time as they drag the slider.

Figure 11:
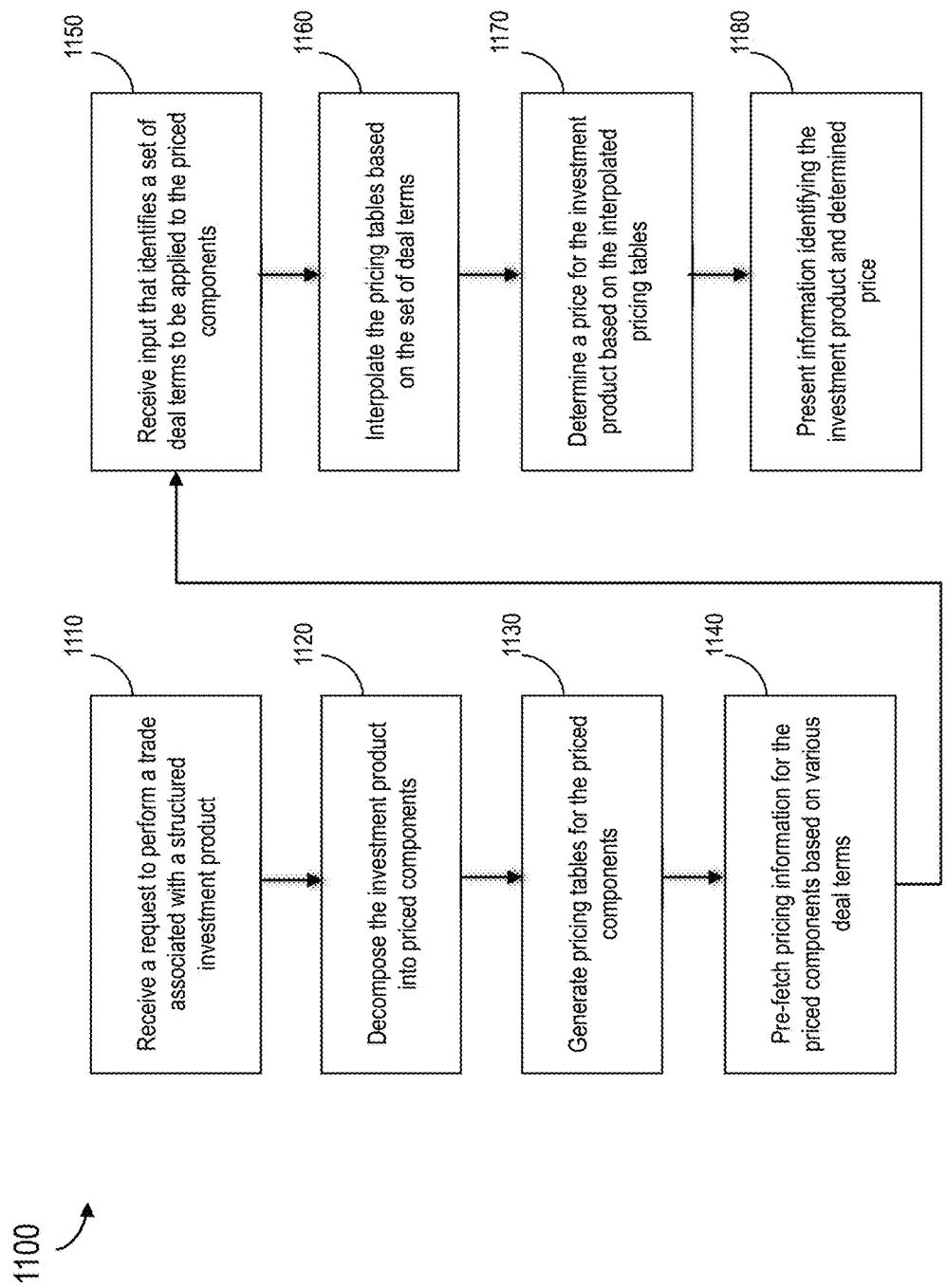
FIG. 11 is a flow diagram illustrating a method for building a customized investment product for a user of the electronic platform.

FIG. 11 is a flow diagram illustrating a method 1100 for building and presenting a customized investment product for a user of the electronic platform 140. The method 1100 may be performed by the product generation system 144 and, accordingly, is described herein merely by way of reference thereto. It will be appreciated that the method 1100 may be performed on any suitable hardware.

In operation 1110, the product generation system 144 receives, via an interface provided by the electronic platform 140, a request from the user of the electronic platform to perform a trade associated with a structured investment product.

In operation 1120, the product generation system 144 decomposes the structured investment product into two or more priced components of the structured investment product. Some investment products may be decomposed into parts, such that the price of the whole is the sum of the parts. Extending this to a weighted sum, the weights may vary depending on the deal terms. This decomposition may prove advantageous if the components' prices are a function of fewer deal terms than the whole investment. For example, a call spread structure is defined as long one call at a lower strike, short one call at a higher strike. This may be decomposed into two call options. The component call options have fewer deal terms than the call spread structure, the former having only 1 strike and the latter 2 strikes.

In operation 1130, the product generation system 144 generates pricing tables for each of the two or more priced components of the structured investment product. The pricing tables may include risk calculations, which are used to compute pricing adjustments, such as hedging cost.

For each deal term, a list of values the span the range being considered is selected. For example, if coupons of 0% to 10% and maturities of 1 to 10 years are to be supported, the list of coupons 0%, 1%, 2%, . . . 10% and maturities 1 year, 2 years, . . . 10 years can be made. For each component of the investment, the product generation system 144 prices and calculates any desired risks (e.g., vega, skew sensitivity, correlation sensitivity) on the Cartesian product of valid deal term values. In some cases, the Cartesian product will be smaller in size when the component uses fewer deal terms than the whole investment. Therefore, the size of the pricing tables may be reduced.

In operation 1140, the product generation system 144 pre-fetches, from pricing servers (e.g., the exchange market server) located on an information exchange network that includes the electronic platform 140, pricing information for the two or more priced components based on a variety of different deal terms.

In some cases, when the provider of pricing information is across a network (e.g., exchange market server 130 on network 125) from the client device, there typically is some network latency associated with providing real-time information. However, in cases such as a user dragging a slider, network latency may be large enough to cause perceivable latency between the user's action and pricing updates. The product generation system 144 may employ a pre-fetching strategy to minimize the effect of network latency, by anticipating the user's possible actions and requesting pricing for all possibilities in advance.

In other words, without pre-fetching certain pricing information, every time the user changes a deal term, a request would need to be sent to the electronic platform 140 for pricing. With pre-fetching, there is little or no perceivable latency when the user changes a single deal term, and there may only be slight perceivable network latency when two or more deal terms are changed.

In some embodiments, the prefetching technique is used to request pricing for every investment that differs from the user's current selection by at most 1 deal term. When the user changes 1 deal term (including repeatedly changing the same deal term), the pricing may be quickly or instantly updated, because the data has already been pre-fetched. Whenever the user modifies a deal term, another request is made to the electronic platform 140, and the pre-fetching stays up-to-date (in a sense, the user interface stays one step ahead of the user).

In operation 1150, the product generation system 144 receives, via the interface provided by the electronic platform 140, input from the user of the electronic platform 140 that identifies a set of deal terms to be applied to the two or more priced components when performing the trade of the structured investment product.

In operation 1160, the product generation system 144 interpolates the pricing tables based on the set of deal terms associated with the two or more priced components and provided by the user of the electronic platform. Given a set of deal terms, for each component, the product generation system 144 interpolates on the pricing/risk tables. The product generation system 144 may utilize standard techniques, such as multilinear interpolation or any other suitable techniques.

In operation 1170, the product generation system 144 determines a price for the structured investment product that is based on the interpolated pricing tables for the two or more priced components. The product generation system 144 may recombine the components and apply pricing adjustments to arrive at a price for the entire investment product, and/or may "solve for" one deal term, given other deal terms, and a target price.

In some cases, the product generation system 144 may sum the interpolated prices/risks for each component together (using the fact that the price of the whole investment product is the sum of its components). Pricing adjustment rules may then be applied. Some examples of pricing adjustments include hedging costs, a function of the risks, and sales concessions, a function of the maturity of the product.

The product generation system 144 may calculate an array of prices simultaneously, and select the deal terms for which the resulting price is closest to a given target price. This technique can be used to "solve for" one deal term given values for all other deal terms and a target price. For example, the product generation system 144 solves for a coupon, such that a bond prices to par, given the bond has 5 year maturity. To do so, the product generation system 144 calculates prices for an array of coupons (e.g. 0.1%, 0.2%, . . . 9.9%, 10.0%), assuming in each case that the maturity is 5 years. The product generation system 144 then searches the list of prices for the closest value to the par value of the bond (or in some embodiments, a criterion other than "closest"), and selects the corresponding coupon as the "solution".

In operation 1180, the product generation system 144 presents, via the interface of the electronic platform 140, information identifying the structured investment product and information identifying the determined price for the structured investment product.

Figure 12A:
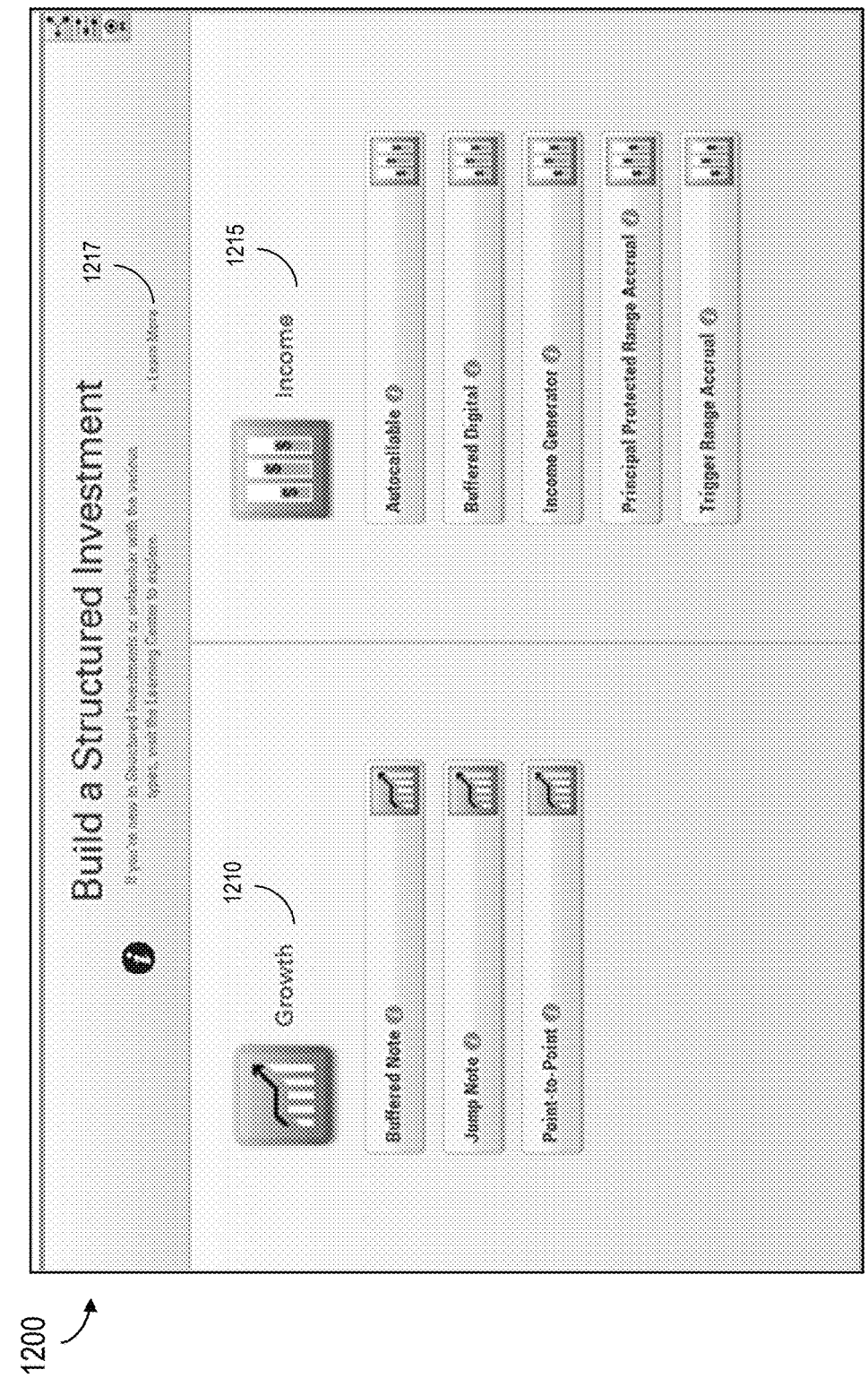
FIGS. 12A-12E are display diagrams illustrating example user interfaces provided by the product generation system when building customized investment products for users of the electronic platform.

In some embodiments, the product generation system 144 presents various user interfaces when building investment products for users. FIG. 12A depicts a user interface 1200 that presents information associated with building a structured investment product for a user. For example, the user interface 1200 presents user-selectable display elements, that, when selected by a user, cause the product generation system 144 to build investment products, such as a user-selectable element 1210 associated with building "growth" products, a user-selectable element 1215 associated with building "income" products. In addition, the user interface 1200 may present a user-selectable display element 1217 that, when selected by the user, causes the electronic platform 140 to present user interfaces rendered by the product learning system 142.

Figure 12B:
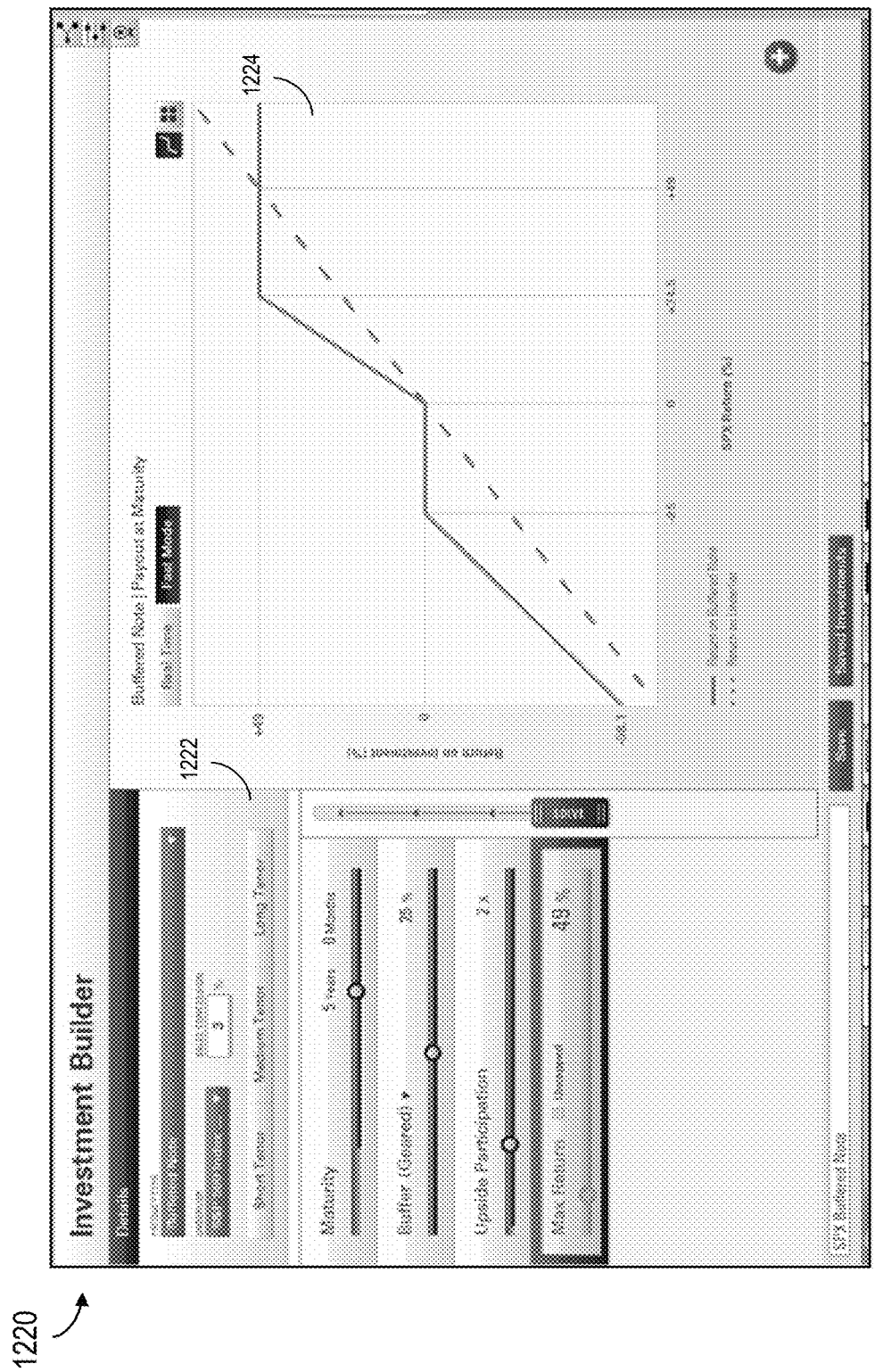

FIG. 12B depicts a user interface 1220 that presents detailed information associated with building a structured investment product for a user. As depicted by the user interface 1220, the user may see a dropdown list 1222 that may be used to select a product. The product selector dropdown 1222 may be divided into two example sections: Income and Growth. Each product belongs to one of either Growth or Income. In some embodiments, when the user selects a product type, for example, a Buffered Levered Note (BLN), the user may be presented with a popup asking to select a pre-defined solution set by selecting an Investment Horizon. The popup may include a checkbox with a label saying "Make this my default choice." If checked, after making a selection, the next time the user selects the same product type (e.g., BLN), the user is not presented with a popup. Instead, the user may see their default choice pre-selected. Until the user makes a selection of a pre-defined solution set for Investment Horizon, the user may not be able to interact with the investment builder. When a pre-defined solution set is selected and the user changes one of the parameter values, the button representing the pre-defined solution set is no longer selected.

Once the user selects a product type, the user may use the investment builder user interface to select any underlyer from a drop down menu and define various parameters for the product type (e.g., maturity, buffer, upside participation, maximum return). The user may set a sales concession (e.g., within certain bounds). The user may also select a variable to solve for. The results are then displayed on a payoff chart 1224. The user may zoom in or zoom out on the payoff chart 1224 after the user changes one of the parameter values (e.g., by dragging a slider). The payoff chart 1224 may re-size once the user lets go of a slider. The payoff chart 1224 may resize when the data being presented does not leave enough margin, or if it leaves too much margin, in the chart 1224. The payoff chart 1224 may be available in at least two modes, a fast mode and a real-time mode.

As depicted, the user has selected a buffered note on an S&P 500 Index, five-year maturity, 25% geared buffer, 2× upside for gestation and the max return as the variable to solve for. If the user changes any of the input (e.g., maturity), the variable being solved for changes and the payoff chart 1224 is updated in real-time. The user may hover over the graph to get more information about what is actually going on. The user may solve for any of the parameters by sliding the solve bar.

Figure 12C:
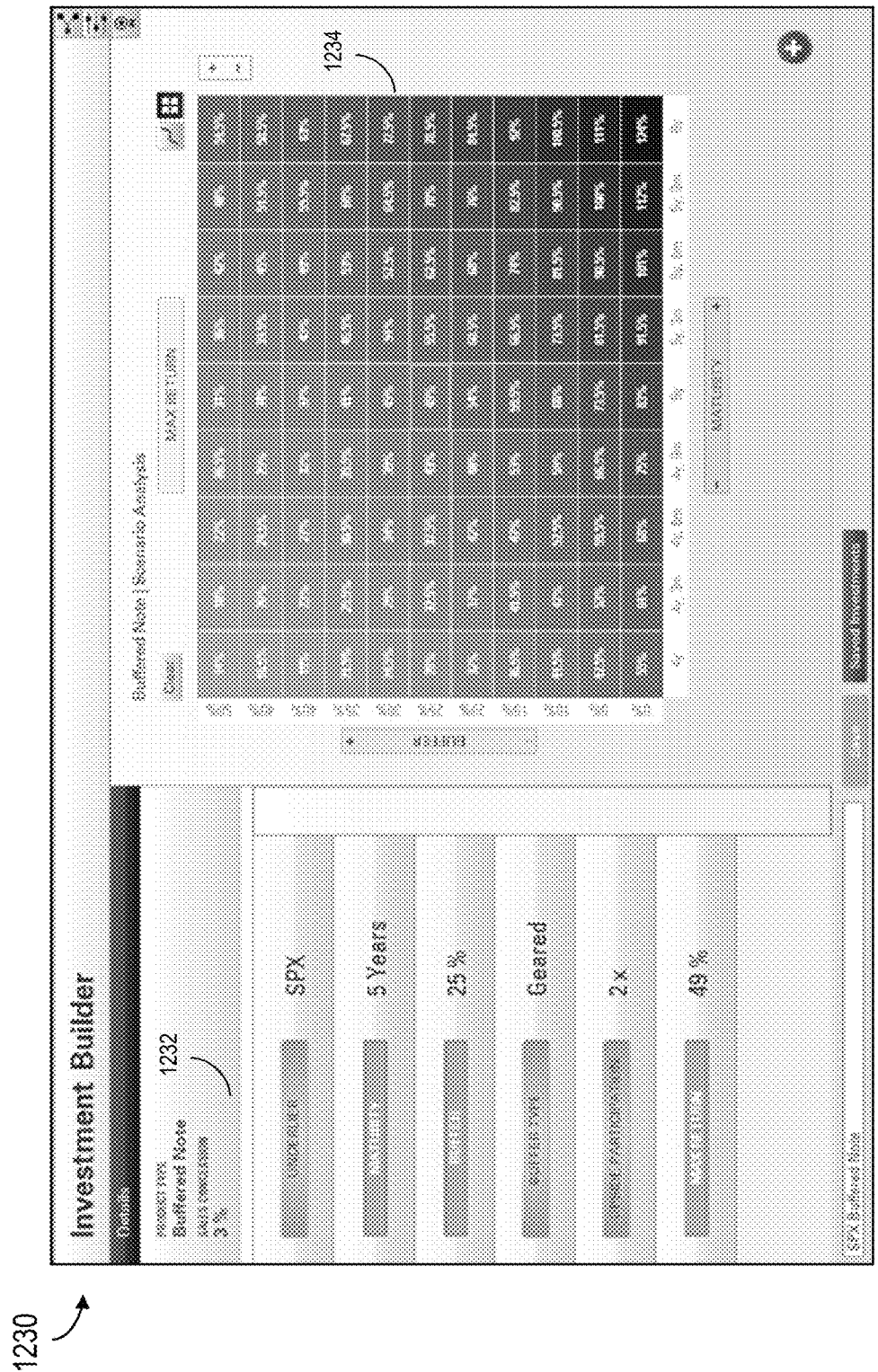

FIG. 12C depicts a user interface 1230 that presents detailed heat map associated with building a structured investment product for a user. The user may select a heat map view 1234 as shown in the user interface 1230. The heat map 1234 allows a user to select at least two variables 1232 (e.g., maturity and buffer) to see how a third variable (e.g., max return) changes. In response, the product generation system 144 may instantly price various permutations for the selected buffer note.

For example, the product generation system 144 may consider all the different maturities (e.g., one year to seven year) and buffers the user may pick and show on the heat map 1234 how the max return would change. The user may zoom into particular areas to get a granular view and pan around the heat map 1234. For example, the user may use a control next to each axis on the heat-map to zoom. Double clicking on the heat-map cell may zoom in on the heat-map, with the clicked cell being the center of the zoomed region. If the heat-map is already completely zoomed, there will be no zoom in. Using the scroll wheel on a mouse, the user may zoom in or zoom out on the heat-map. If the heat-map is completely zoomed there will be no zoom in, and if it is completely zoomed out there will be no zoom out. When zoomed in, the user may click and drag the map portion of the heat-map to pan the heat-map, sliding the range of one or both of the heat-map axes to new values. Single-clicking a cell of the heat-map may populate the parameters corresponding to the heat-map's X, Y, and Z axes with the values corresponding to that cell of the heat-map.

For example, as depicted, the max return for four years to six years is shown. The user may also pull in other variables to see how those variables would change. For example, if the user wants to look at a different underlyer, the user can select a different underlyer and the product generation system 144 may update the heat map 1234 to display in real-time all the various permutations of the investment product. The user may select any one to trade from amongst a million different iterations, all instantaneously. In the depicted example, a buffered note with a max return of 49%, buffer of 25% and 5 year maturity is selected.

Figure 12D:
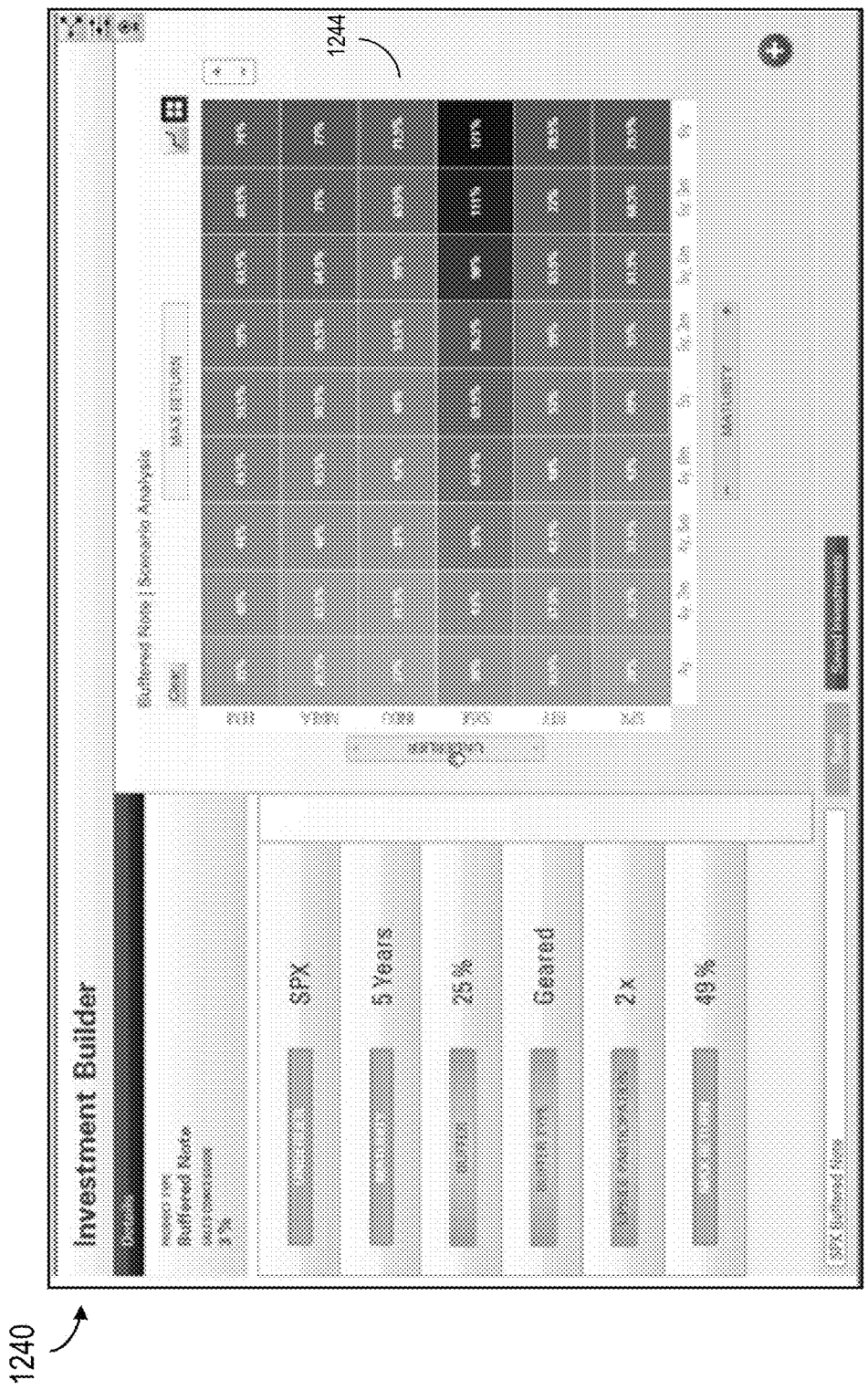

FIG. 12D depicts a user interface 1240 that presents a zoomed heat map 1244 associated with building a structured investment product for a user. For example, the user interface 1240 includes a heat map 1244 that is zoomed in to get more granular prices. The user may select any cell on the heat map 1244 to trade on the custom product corresponding to the cell.

As described herein, the product generation system 144 may employ a fast mode and/or a real-time mode for pricing. The modes may dictate how the product pricing calculations are performed. The product generation system 144 may utilize the pricing data calculated from a selected mode to generate the payoff chart and the heat map. In some embodiments, a fast mode pricing engine calculates the price for every single possible permutation of a product type (e.g., buffered levered note) on every underlyer, and stores the data for later access. The calculation may be performed ahead of time (e.g., overnight, every few hours). When the user is sliding the controls to change the input variables, the fast mode pricing engine selects from, or interpolates from, all of the different prices that have been pre-calculated to price each custom product built by the user, allowing the user to search through a very large number of combinations in a smooth, fast and a very transparent manner. The prices that are calculated may be tradable prices. Instead of pricing each and every possible product, the fast mode pricing engine prices as few instruments as possible, and recovers the prices for any combination that the user constructs at one time. In the real-time pricing mode, a real-time pricing engine calculates the prices in real-time. Each time the user changes the inputs, the real-time pricing engine calculates the prices to display to the user.

Figure 12E:
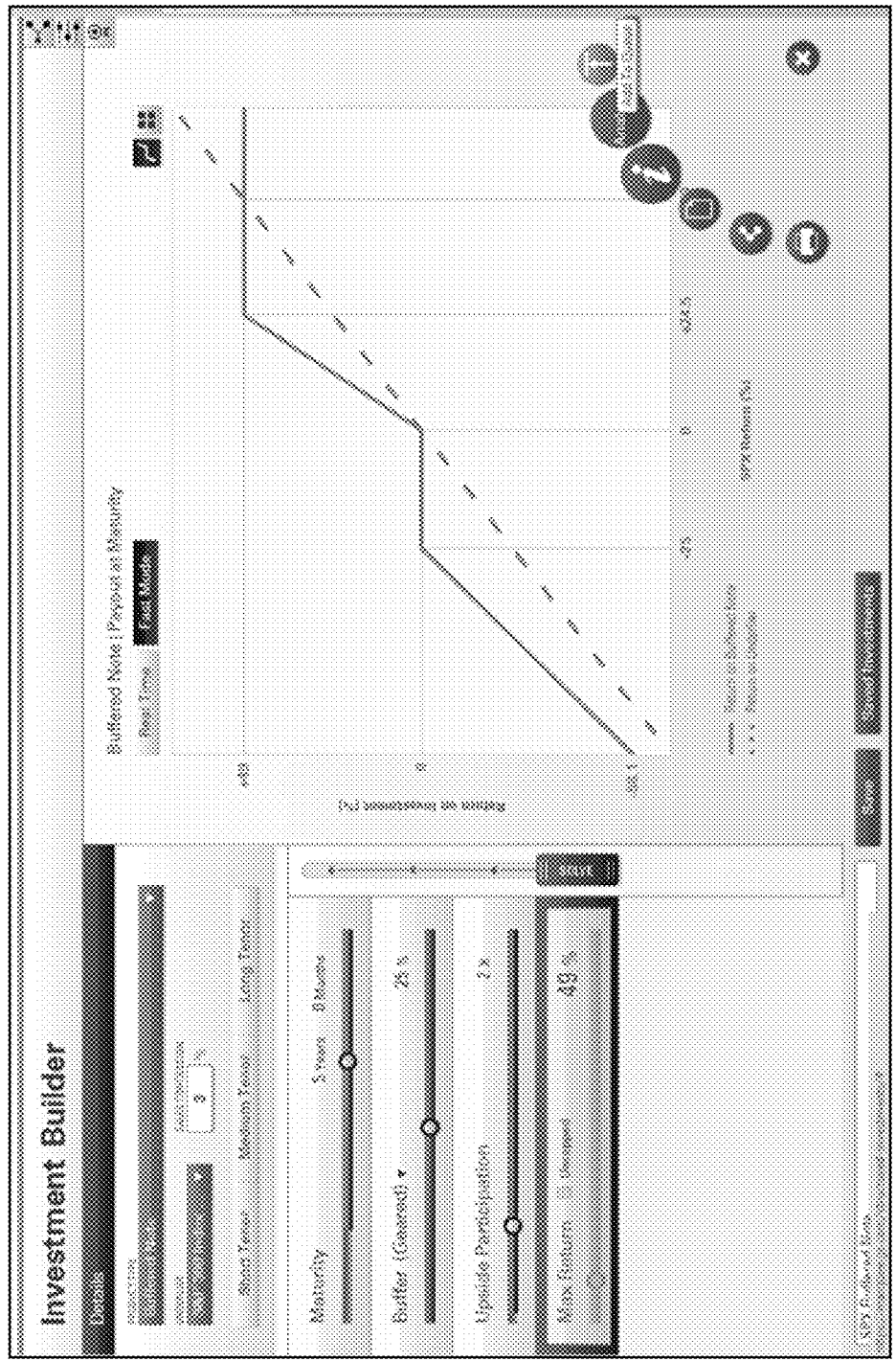

FIG. 12E depicts a user interface 1250 that presents detailed information about an investment product built for a user. Via the user interface, the user may print the page, share the product, save the product, get additional information on the product, analyze the product, add the product to a queue, and so on.

Examples of the Product Exchange System

As described herein, the electronic platform 140 may include the product exchange system 146, which performs various actions associated with investment products selected and/or generated for users of the electronic platform.

Figure 13:
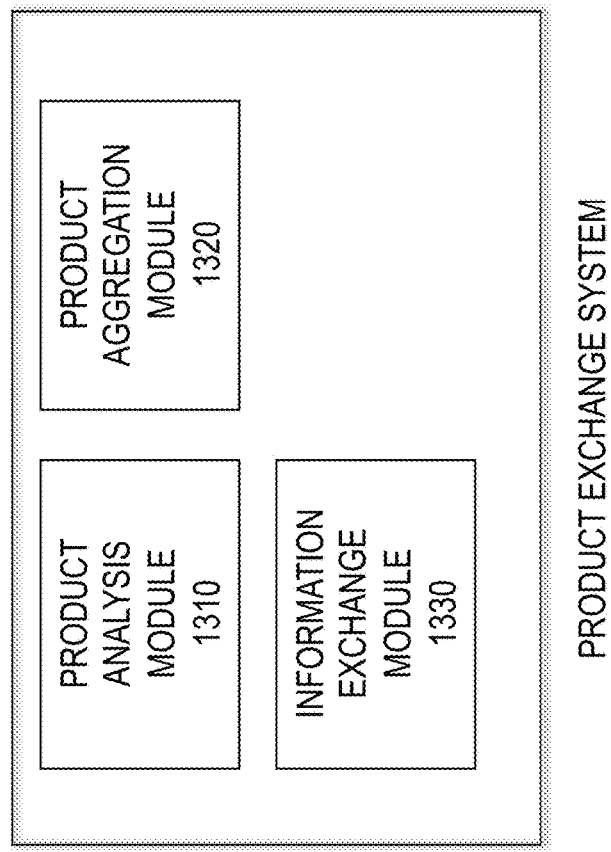
FIG. 13 is a block diagram illustrating components of a product exchange system.

FIG. 13 is a block diagram illustrating components of the product exchange system 146. The product exchange system 146 may include one or more modules and/or components to perform one or more operations of the product exchange system 146. The modules may be hardware, software, or a combination of hardware and software, and may be executed by one or more processors. For example, the product exchange system 146 may include a product analysis module 1310, a product aggregation module 1320, and an information exchange module 1330.

In some embodiments, the product analysis module 1310 is configured and/or programmed to perform various analysis functions on investment products selected and/or generated by the product generation system 144. The product analysis module 1310 may provide tools for analyzing an investment product, whether the investment is created by the user or selected from an offering. For example, the user can select investment backtesting, scenario analysis, and so on.

In some embodiments, the product aggregation module 1320 is configured and/or programmed to aggregate information for investment products provided by multiple issuers, such as information that may be displayed when investment products are selected for trading and/or placed in investment queues.

In some embodiments, the information exchange module 1330 is configured and/or programmed to facilitate the exchange of information associated with investment products between users of the electronic platform 140. For example, the information exchange module 1330 may facilitate the sharing of information, the establishment of marketplaces, the crowdsourcing of information associated with the investment products, the creation of investment queues, and so on.

Figure 14:
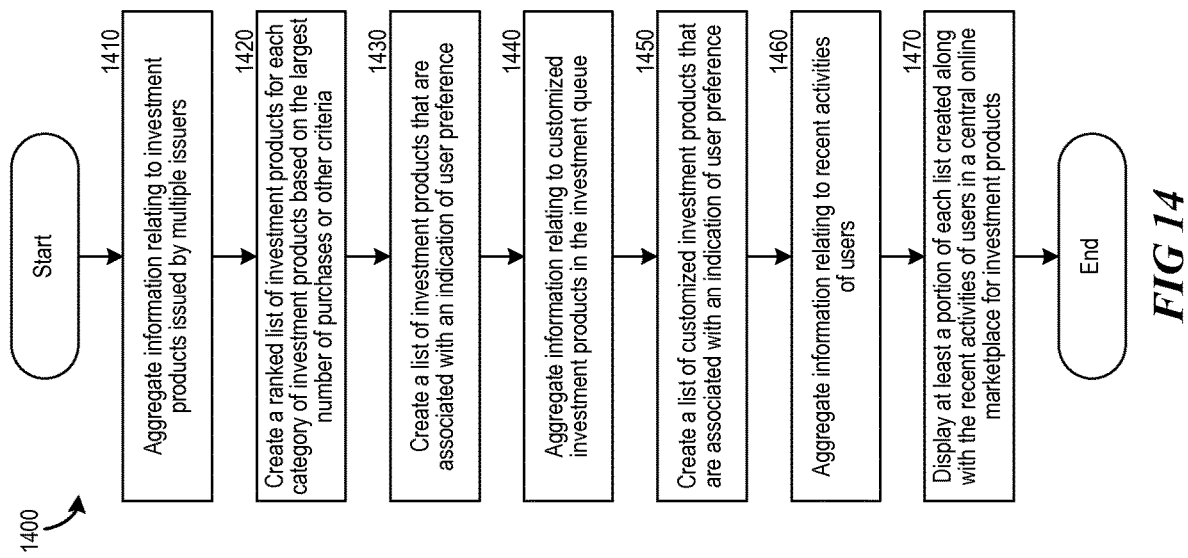
FIG. 14 is a flow diagram illustrating a method for presenting, via the electronic platform, a trading marketplace for investment products.

As described herein, the product exchange system 146 may perform various operations, processes, and methods when performing actions associated with investment products for users via the electronic platform 140. FIG. 14 is a flow diagram illustrating a method 1400 for presenting, via the electronic platform, a trading marketplace for investment products. The method 1400 may be performed by the product exchange system 146 and, accordingly, is described herein merely by way of reference thereto. It will be appreciated that the method 1400 may be performed on any suitable hardware.

In operation 1410, the product exchange system 146 aggregates information relating to investment products issued by multiple issuers. In operation 1420, the product exchange system 146 creates a ranked list of investment products. In operation 1430, the product exchange system 146 creates a list of investment products associated with a user preference.

In operation 1440, the product exchange system 146 aggregates information relating to customized investment products in an investment queue. In operation 1450, the product exchange system 146 creates a list of customized investment products associated with the user preference. In operation 1460, the product exchange system 146 aggregates information relating to recent activities of users, and, in operation 1470, the product exchange system 146 displays a portion of each list along with the activities of the users in a marketplace provided by the electronic platform 140.

Figure 15:
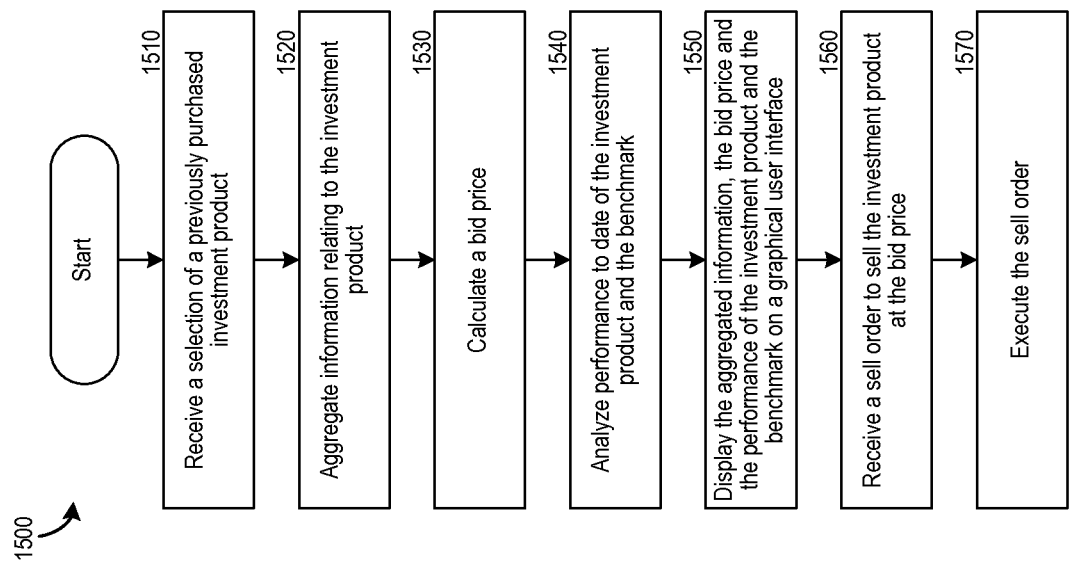
FIG. 15 is a flow diagram illustrating a method for analyzing a generated investment product via the electronic platform.

FIG. 15 is a flow diagram illustrating a method 1500 for analyzing a generated investment product via the electronic platform. The method 1500 may be performed by the product exchange system 146 and, accordingly, is described herein merely by way of reference thereto. It will be appreciated that the method 1500 may be performed on any suitable hardware.

In operation 1510, the product exchange system 146 receives a selection of a previously purchased investment product. In operation 1520, the product exchange system 146 aggregates information relating to the investment product, and, in operation 1530, calculates a bid price.

In operation 1540, the product exchange system 146 analyzes the performance to date of the investment product and a benchmark. In operation 1550, the product exchange system 146 displays the aggregated information, the bid price, and the performance via a user interface (such as those described herein). In operation 1560, the product exchange system 146 receives a sell order to sell the investment product at the bid price, and in operation, 1570, executes the sell order.

Figure 16A:
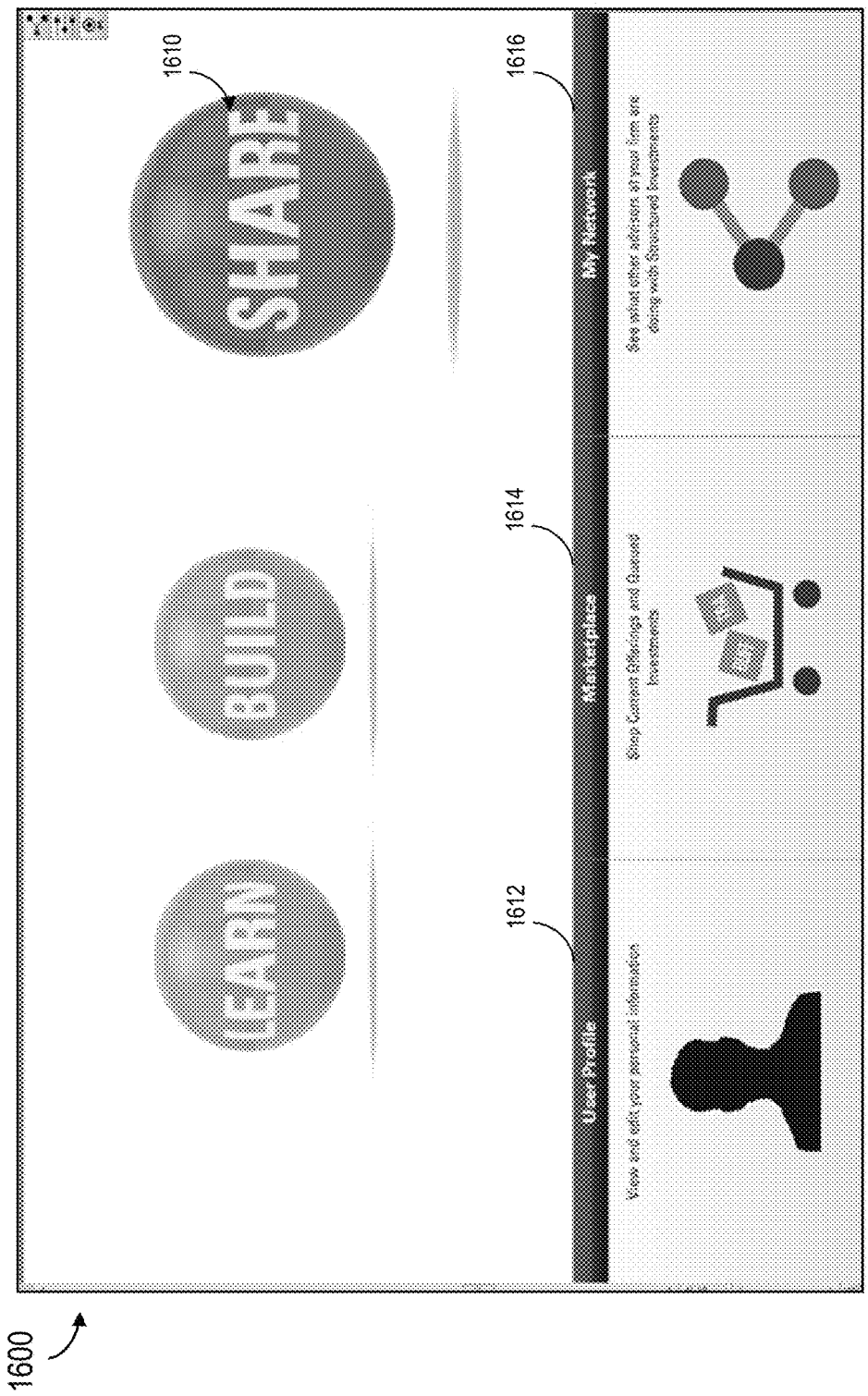
FIGS. 16A-16D are display diagrams illustrating example user interfaces provided by the product exchange system when sharing information associated with investment products.

FIG. 16A depicts a user interface 1600 that displays different functions provided by the electronic platform 140, including a "share" function, represented by display element 1610, that is associated with functionality provided by the product exchange system 144. Upon receiving a user selection of display element 1610, the user interface 1600 presents various user-selectable display elements, each associated with different functions provided by the product generation system 144. For example, the user interface 1600 displays a "user profile" display element 1612 that is associated with the electronic platform 140 facilitating the viewing and editing of user information, a "marketplace" display element 1614 that is associated with the electronic platform 140 providing a marketplace and/or investment queues for users, and a "network" display element 1616 that is associated with the electronic platform 140 performing various social network functions for a user.

Figure 16B:
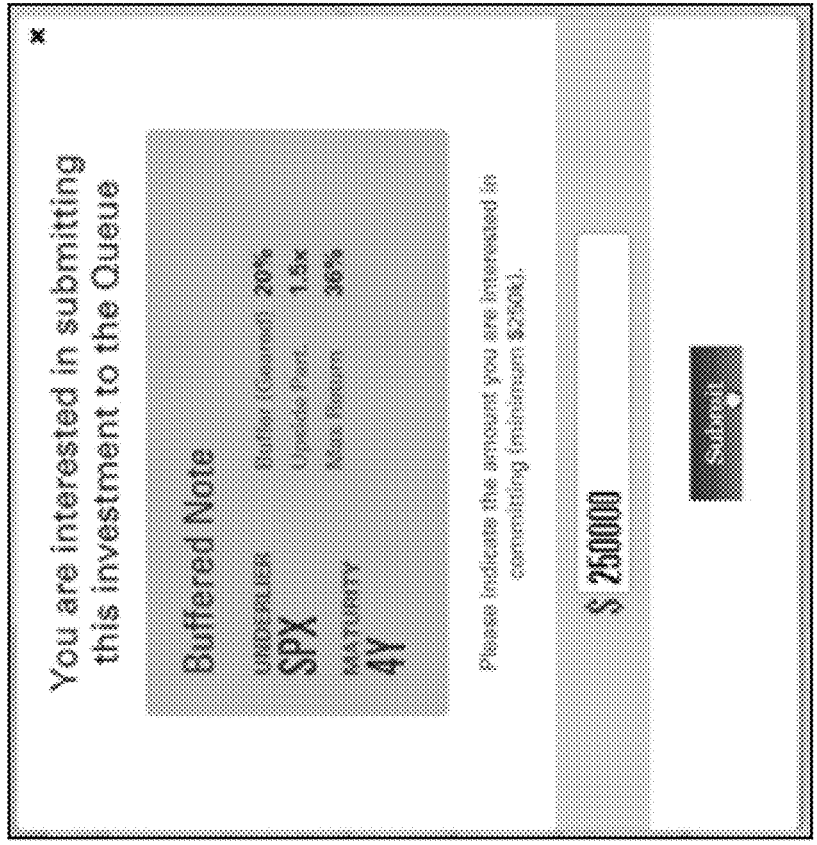
Figure 16C:
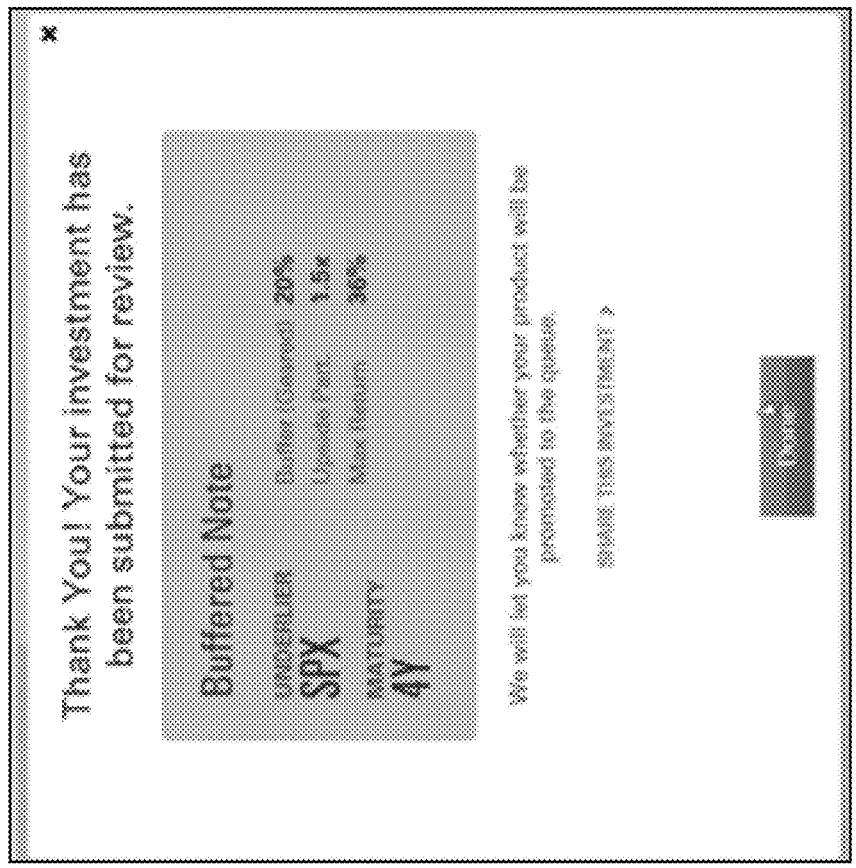

FIG. 16B depicts a user interface 1620 that presents information and display elements that facilitate user submission of generated investment products to an investment queue. For example, when the user wants to buy a product that he/she has built for a client, but does not have enough notional to meet the minimum requirements, he/she may launch that product to the "queue" to begin the creation of an "e-syndicate." When the user selects to add the product to a queue option, a queue submission form shown in user interface 1620 may be displayed. As depicted, the form may include information on the custom product and include a prompt for a commitment amount. The user may enter the commitment amount to submit the custom product to the queue, as shown by user interface 1630 depicted in FIG. 16C.

Figure 16D:
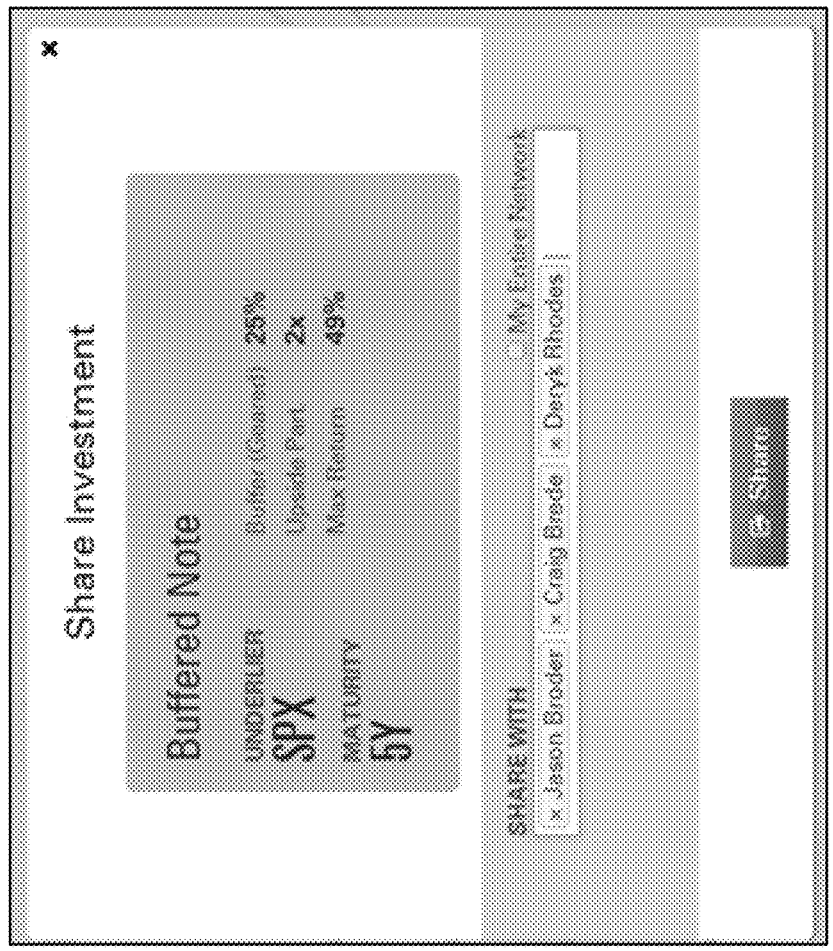

After launching a product to the "queue," the user has the opportunity to "share" the product with other people in his/her network so that other users in the user's network can see or discover the user created product and commit notional to that product (e.g., if it makes sense for their clients) in an effort to build a book via the "e-syndicate" and get it to critical mass. FIG. 16D depicts a user interface 1640 that presents information and display elements that facilitate user sharing of investment products that have been added to an investment queue.

In some embodiments, the network may include employees within the same broker-dealer. When the user selects the share option, a sharing form, as depicted by the user interface 1640, may be presented. The sharing form may include controls that allow the user to choose whether he or she wants to share the product with the entire group, or specific users in the group. Once the user shares the product with another user, a notification is sent to that user.

Figure 17A:
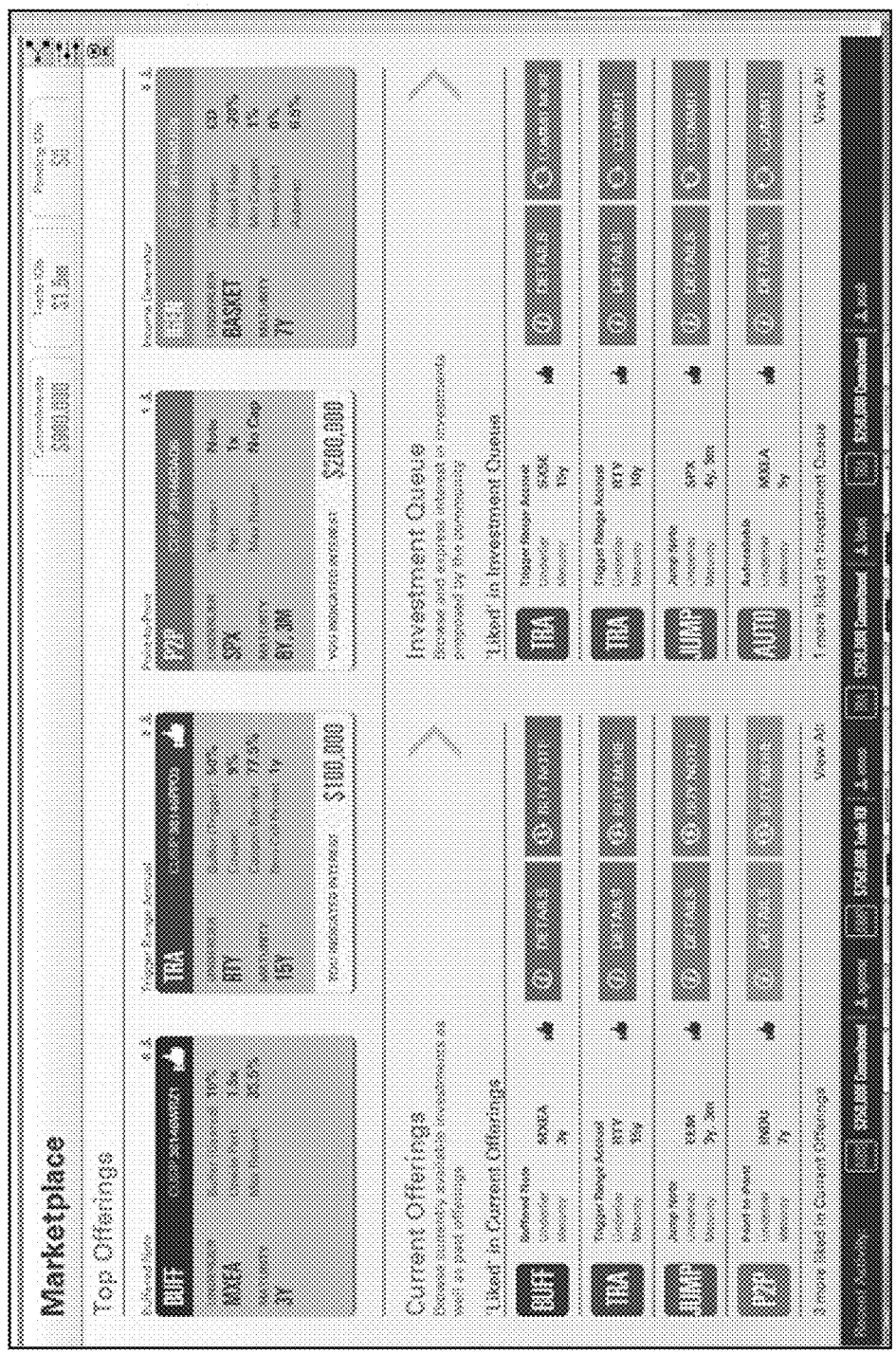
FIGS. 17A-17D are display diagrams illustrating example user interfaces provided by the product exchange system when facilitating a marketplace of investment products.

FIG. 17A depicts a user interface 1700 that presents information displaying investment products within a marketplace established by the electronic platform 140. The user interface 1700 displays various types of information, such as products that are trending under "Top Offerings," the products a user has liked or otherwise selected in the "Current Offerings," and the "Queue."

The marketplace may also show recent activity for the site, within a selected area and/or on a moving carousel. For example, the user interface 1700 may display top offerings that can include current offerings that have been hand picked by an administrator (e.g., displayed in a curated order defined by the administrator) and/or selected based on indications of interest or preference from users. The marketplace may also display lists of queued products and current offerings. The user may filter the list of current offerings by product type, maturity, underlyer, indication of interest (e.g., likes, stars), and so on. The user may "view details" for a given product in the Marketplace in Product Viewer to see specifics of the product. In some embodiments, the user may submit an IOI for an available offering, submit a commitment to anyone's queued product, and so on, from the marketplace.

Figure 17B:
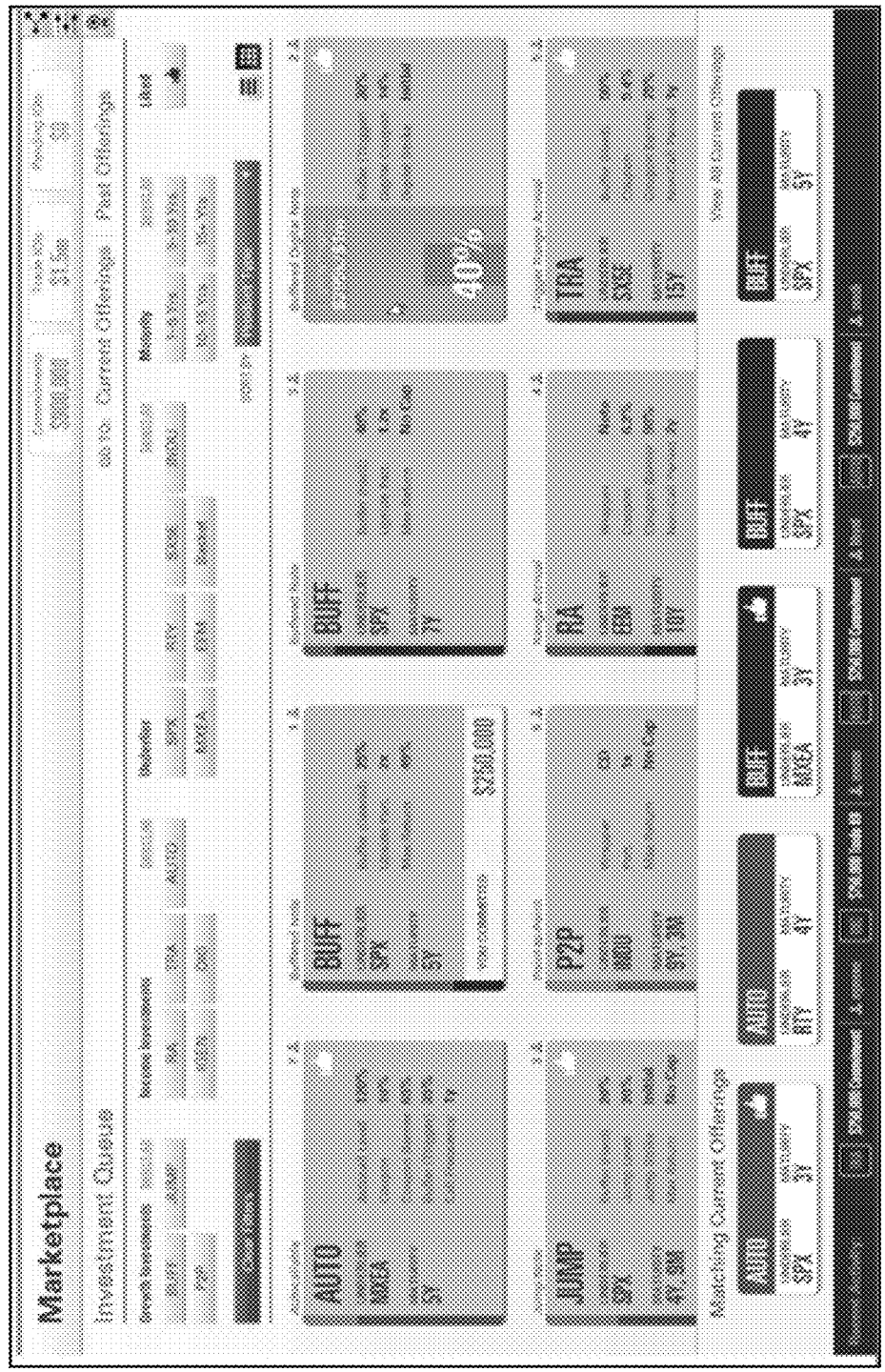

When the user clicks on the "Investment Queue" from the "Marketplace" landing page, he/she may see the products that have been added to the queue, as depicted by the user interface 1710 of FIG. 17B. For example, the "Buffered Note" (BUFF) with SPX underlyer and 5& maturity includes an indication that it was recently added to the queue from Investment Builder and the user committed $250,000. In addition to the product metadata, the tile for the queued product may also show the Eligibility Progress (e.g., 25% if the product issuer set the minimum notional to $1 mm).

From here, the user may add commitments to buy the product. For example, when viewing a product in the Queue, the user may click on "Add Commitment" for that product. The user may be prompted to submit a commitment amount via a modal popup, and a confirmation message is displayed once the commitment is successfully submitted. Furthermore, other users of the electronic platform 140 may learn about the trade from the user interface 1710, and may commit to the notional, when appropriate.

Figure 17C:
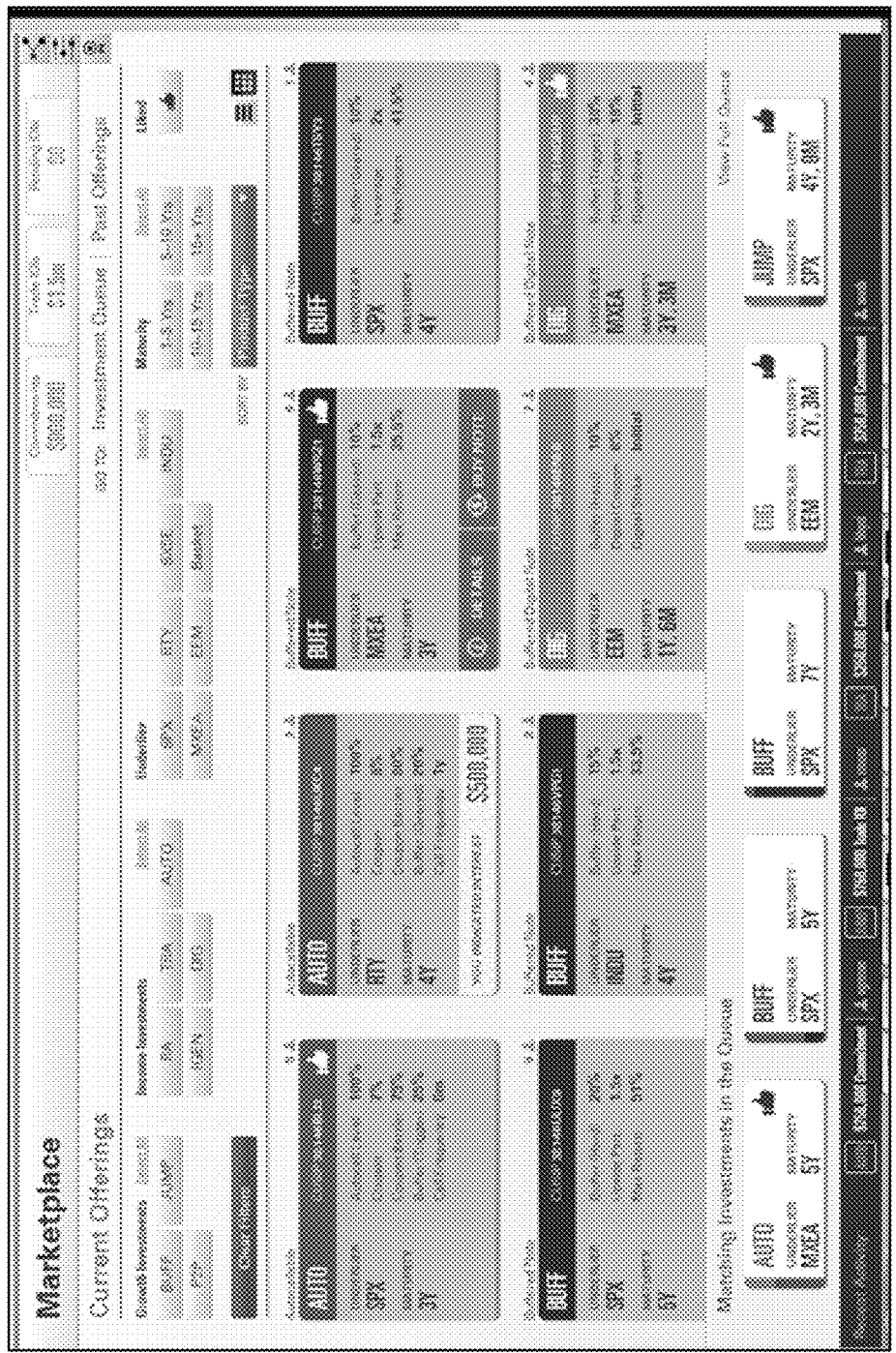

From the marketplace as depicted in FIG. 17A, the user may navigate to the "Current Offerings" interface, as depicted by the user interface 1720 of FIG. 17C. Fro, the "Current Offerings" page, the user may see the products one or more issuers have placed out in the market (e.g., for that month). The page may include filters to sort products by different criteria, and the user may click on the "Details" section of any product title to view details of the product, learn more about the specific structure, download the prospectus, access additional links back to the Learning Center, and so on.

Figure 17D:
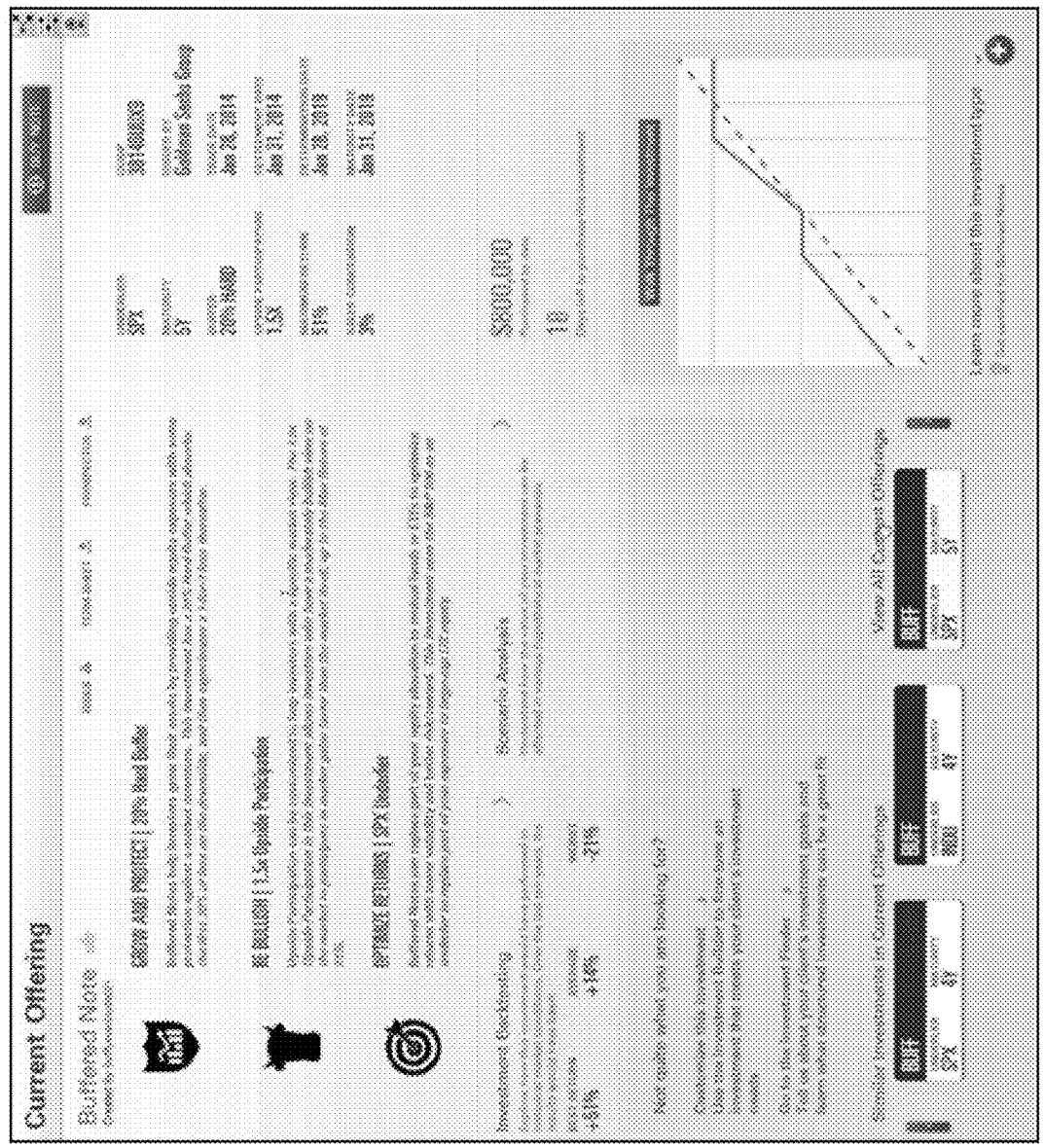

FIG. 17D depicts a user interface 1740 displaying a selected offering, such as a "buffered note," information about the offering, including analysis information, and user-selectable elements that facilitate a purchase or trade of the offering.

As described herein, the electronic platform 140 may provide various different navigation paths, across the different systems and/or user interfaces, to users. Many of the paths direct users to different analysis functions and algorithms.

Figure 18A:
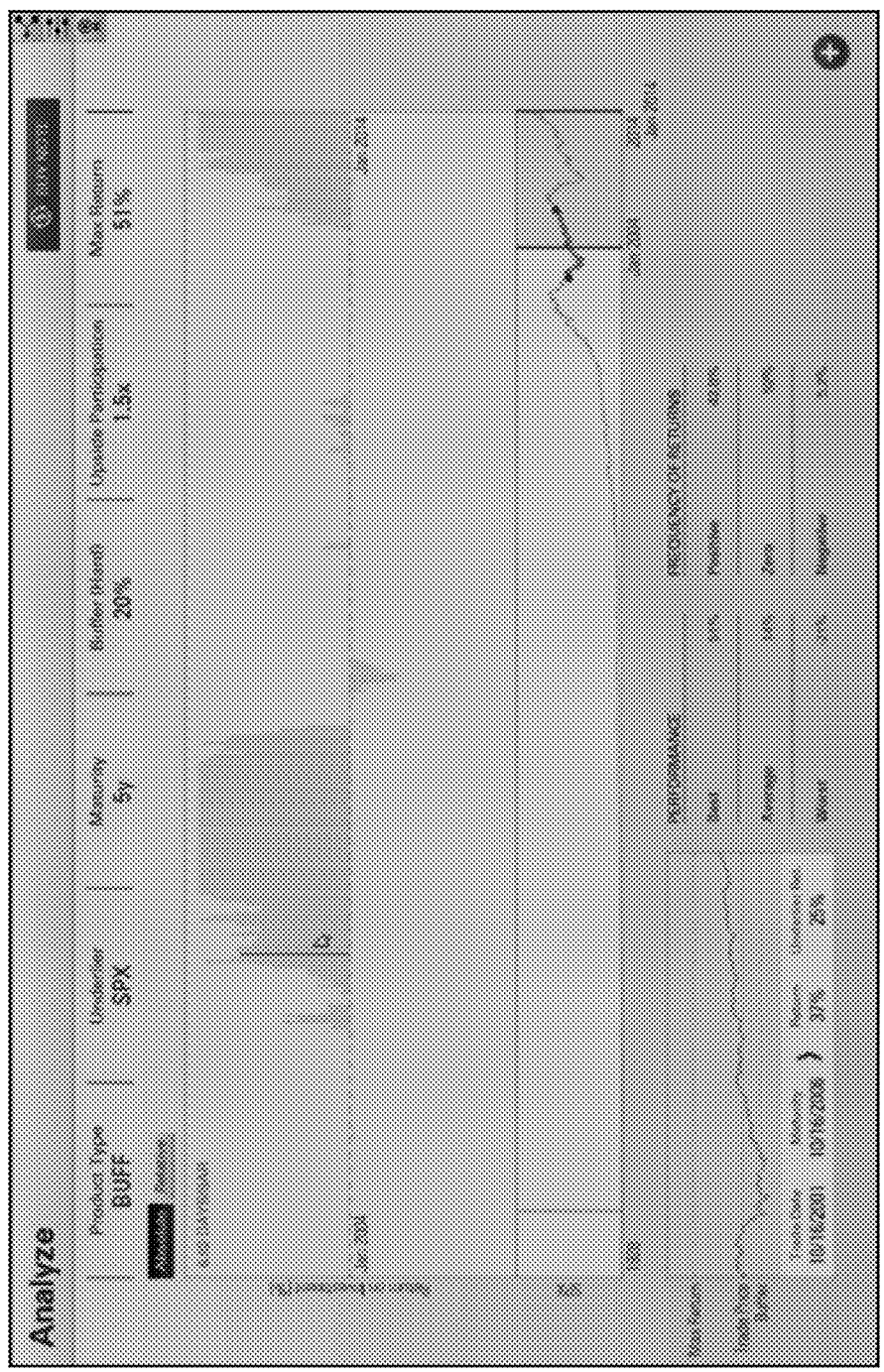
FIGS. 18A-18B are display diagrams illustrating example user interfaces provided by the product exchange system when analyzing generated investment products.
Figure 18B:

FIGS. 18A-18B depict results, shown by user interfaces 1810 and 1820, of various analysis functions that may be performed by the electronic platform 140. For example, the electronic platform 140 may present information associated with a structured investment product that is available for trading via the electronic platform 140 by receiving, via an interface provided by the electronic platform 140, a selection of a structured investment product generated by the electronic platform, performing a backtesting analysis for the selected structured investment product, the analysis include a comparison of a theoretical performance of the selected structured investment product to theoretical performances of other structured investment products generated by the electronic platform, and presenting, via the interface provided by the electronic platform, a result of the performed analysis.

The investment backtesting tool allows the user to take any investment from the current offering or a product the user or anybody else on the site built and backtest it to see how it would have performed in any market scenario. For example, as depicted in FIG. 18A, the x-axis shows a 10-year span and the bars in the y-axis on the upper graph show how the trade would have performed if the user had put the trade on any given day in the 10-year span versus how the market would have performed on that same day. The graph below shows, for the same 10-year span, how a straight investment in the underlying index would have performed. The graph down in the lower left shows how the market is performing. Also displayed on the same page is a summary of the statistics such as the performance for the best, the average, and the worst. The user may do the backtesting for any period in all of history that he or she wants.

The user may zoom in on a particular date while in the midst of a multi-point analysis so that the user can view theoretical return metrics that are specific to that discrete point in time. The user can adjust the timeframe over which a product's back-tested return on investment (ROI) is visible. For example, the user may assess what a Buffered Levered Note product's absolute performance would have been over time (best/worst/average, % of time positive vs. negative) and what its relative performance would have been over time (best/worst/average, % of time outperforming versus underperforming). Thus, the investment backtesting tool allows the user to do a historical analysis on the fly for any product, offered by the issuer or constructed by a user, that the user chooses at any time, without latency.

In some embodiments, when back-testing a product, the user may select a theoretical trade date in the past for the product to see what the product's returns would have been at maturity based upon that theoretical trade date. Similarly, when the user selects a range of theoretical trade dates in the past for a product, the user may see what the product's maximum and minimum returns at maturity would have been and the corresponding trade dates. When back-testing a product via multi-point analysis, the user clicks on a point in the chart, the user may see what the theoretical return would have been at maturity at the selected point in time for a theoretical trade date. The user may modify the scale of the timeframe being analyzed to see a larger or smaller timespan in the performance graph, as appropriate.

In some embodiments, when the user chooses "absolute performance" mode when backtesting a product, the theoretical returns by day quoted as an absolute percentage gain or loss is provided to the user. When the "relative performance" mode is selected, the theoretical returns by day quoted as a relative percentage gain or less in relation to the underlyer's gain or loss is provided to the user. When viewing performance-to-date for a product if the "relative performance" mode is selected, the user is provided what the actual returns would be by day quoted as a relative percentage gain or less in relation to the underlyer's gain or loss. In some cases, when the "absolute performance" mode is selected, the user is provided what the actual returns would be by day quoted as an absolute percentage gain or loss. When viewing performance-to-date for a product if a point in time in the chart is selected, the user is provided what the underlyer's performance on that date was and what the bid as of previous night's close was for that date. When viewing performance-to-date for a product, the user may view the key terms of the product deal, such as when the product was traded, what the strike price was, current CUSIP, and the current bid. When viewing performance-to-date for a product, the user may request a real-time bid price and receive the real-time bid price obtained from the issuer on demand.

In some embodiments, the scenario analysis tool allows the user to shock the environment. For example, the user may create a scenario where the user buys a note and then the underlyer goes up 20%. The user may use the scenario analysis tool to determine, for example, the bid on the note in the example scenario. The scenario analysis tool can perform these calculations for various permutations and combinations of products in an automated way in real time without latency.

In some embodiments, the Investment Analyzer or the "Analyze" landing page provides post-trade services. For example, as depicted in FIG. 18B, the Analyze page displays investment terms and shows how an investment the user bought (e.g., over a year ago) (e.g., Buffered Note) has performed each day versus the performance of the actual underlyer (e.g., SPX). From the Analyze page, the user may see a current bid of the product. The user may ultimately click-to-sell the product from the Analyze landing page, without having to navigate elsewhere.

Figure 19A:
FIGS. 19A-19B are display diagrams illustrating example user interfaces provided by the electronic platform.
Figure 19B:
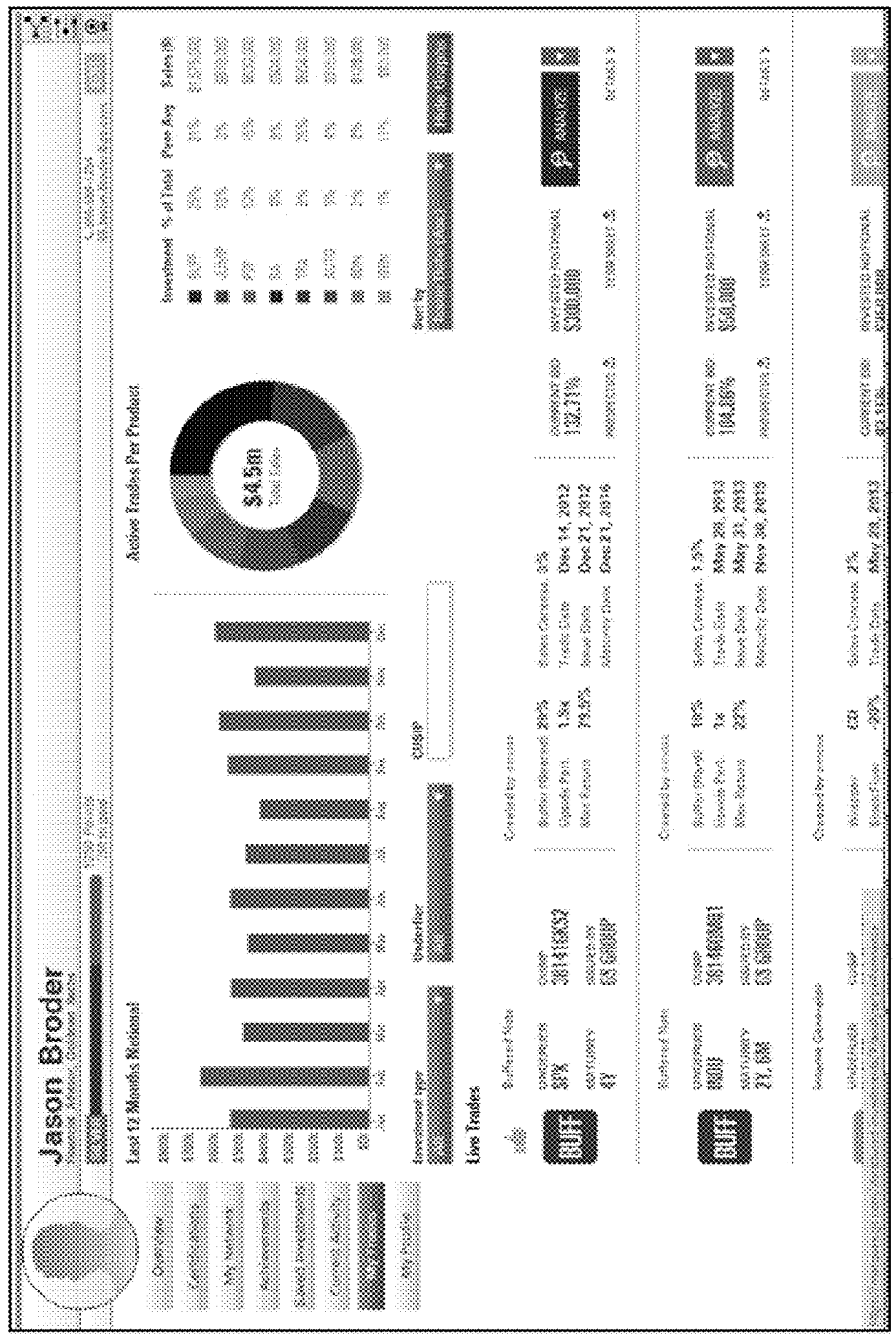

FIGS. 19A-19B depict example profile pages for users of the electronic platform 140. For example, the user interface 1900 of FIG. 19A displays general user information, such as username, email, current status level, and so on. The user interface 1900 may also display saved products and saved state in the Investment Finder tool, the certifications completed, and so on. Users may modify their details, and profile information is saved via an electronic platform profile services manager. From the dashboard, the user may access the queued investments (e.g., via a queue application widget) and other products, any notifications of products shared by other users, news or activity feeds, certifications, live trades, recently viewed products, and so on. The user may switch the dashboard into configuration mode to edit which application widgets appear on the dashboard and may customize the placement of application widgets in the dashboard.

As another example, the user interface 1910 of FIG. 19B shows the dashboard for trades where the user can track the investments bought by the user over time via the electronic platform 140. The top of the dashboard shows the user's monthly notionals broken down by product, and the bottom shows the user the trades that are still live and how well they're performing. If the user clicks on "Analyze," he/she may dig into more details of a specific trade.

In some embodiments, the electronic platform 140 includes an investment viewer that provides the details of an investment recommended to a user by the Investment Finder so that the user can make an informed decision as to whether he or she want to invest in it. The user may also view the details of a saved or built investment and/or a current offering in the investment viewer so that user can make an informed decision before investing. Similarly, the user can also view a queued product in investment viewer so that the user may make an informed decision as to whether the user wants to commit to the queued product. The investment viewer can also display details of a previous offering, a summary of each key term of a given investment, investment type-specific terms for a given investment, investment terms populated with actual backend data from the issuer so that the user may work with real investment in the production environment, and so on. The user nay create a new product by cloning or customizing an existing queued product, current offering, or existing trade being viewed in investment viewer, such that the user can save time building his/her ideal product.

In some embodiments, when viewing a product in product viewer, or viewing a product in Investment Analyzer, or working with a product in Investment Builder, when the user clicks the link/button to "Share My Product", the user is prompted for a list of groups/users with which to share the product. The user may also share a Learning Center video with others in his/her network, among other things.

Thus, in some embodiments, the electronic platform 140 enables users to learn, build, and share information about complex investment products.

Suitable Computing System

Figure 20:
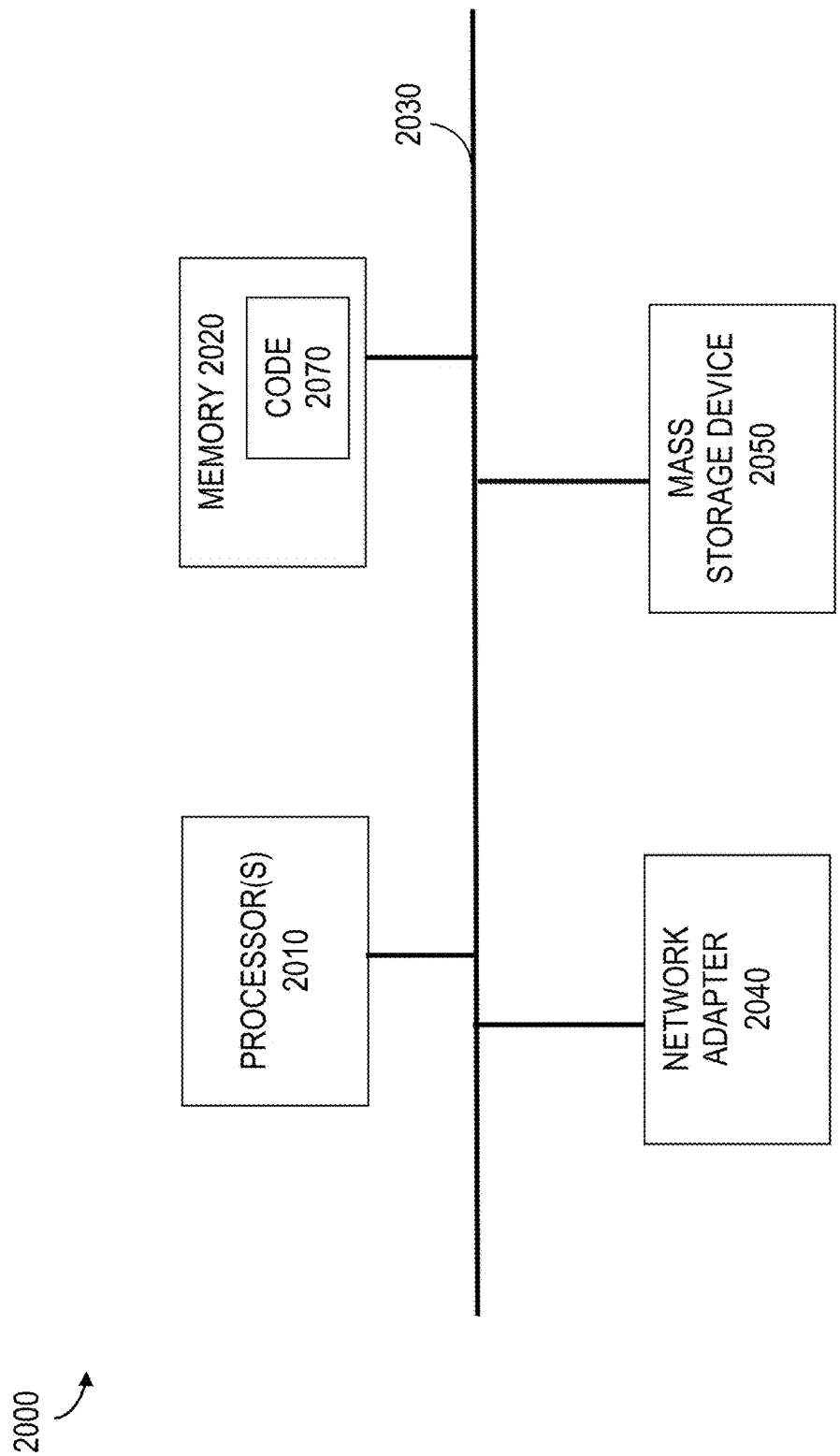
FIG. 20 is a block diagram illustrating a suitable computing architecture, which may represent any electronic device, any server, or any node of the computing environment described herein.

FIG. 20 shows a diagrammatic representation of a computer system 2000 on which any system or device disclosed in the embodiments can be implemented. The computer system 2000 generally includes a processor 2005, main memory 2010, non-volatile memory 2015, and a network interface device 2020. Various common components (e.g., cache memory) are omitted for illustrative simplicity. The computer system 2000 is intended to illustrate a hardware device on which any of the components and methods described above can be implemented. The computer system 2000 can be of any applicable known or convenient type. The components of the computer system 2000 can be coupled together via a bus 2025 or through some other known or convenient device.

The processor 2005 may be, for example, a conventional microprocessor such as an Intel Pentium microprocessor or Motorola power PC microprocessor. One of skill in the relevant art will recognize that the terms "computer system-readable (storage) medium" or "computer-readable (storage) medium" include any type of device that is accessible by the processor.

The memory 2010 is coupled to the processor 2005 by, for example, a bus 2025 such as a PCI bus, SCSI bus, or the like. The memory 2010 can include, by way of example but not limitation, random access memory (RAM), such as dynamic RAM (DRAM) and static RAM (SRAM). The memory 2010 can be local, remote, or distributed.

The bus 2025 also couples the processor 2005 to the non-volatile memory 2015 and drive unit 2045. The non-volatile memory 2015 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 2000. The non-volatile memory 2015 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 2015 and/or the drive unit 2045. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 2010 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium". A processor is considered to be "configured to execute a program" when at least one value associated with the program is stored in a register readable by the processor.

The bus 2025 also couples the processor to the network interface device 2020. The interface can include one or more of a modem or network interface. It will be appreciated that a modem or network interface can be considered to be part of the computer system 2000. The interface can include an analog modem, isdn modem, cable modem, token ring interface, satellite transmission interface (e.g., "direct PC"), or other interfaces for coupling a computer system to other computer systems. The interface can include one or more input and/or output devices 2035. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 2030 can include, by way of example but not limitation, a cathode ray tube (CRT), liquid crystal display (LCD), LED display, a projected display (such as a heads-up display device), a touchscreen or some other applicable known or convenient display device. The display device 5330 can be used to display text and graphics. For simplicity, it is assumed that controllers of any component not depicted in the example of FIG. 2 reside in the interface.

In operation, the computer system 2000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 2015 and/or drive unit 2045 and causes the processor to execute the various acts required by the operating system to input and output data and to store data in the memory, including storing files on the non-volatile memory 2015 and/or drive unit 2045.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the computer system operates as a standalone device or may be connected (e.g., networked) to other computer systems. In a networked deployment, the computer system may operate in the capacity of a server or a client computer system in a client-server network environment, or as a peer computer system in a peer-to-peer (or distributed) network environment.

The computer system may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any computer system capable of executing a set of instructions (sequential or otherwise) that specify actions to be taken by that computer system.

While the computer system-readable medium or computer system-readable storage medium 2050 is shown in an exemplary embodiment to be a single medium, the term "computer system-readable medium" and "computer system-readable storage medium" should be taken to include a single medium or multiple media (e.g., a centralized or distributed database, and/or associated caches and servers) that store the one or more sets of instructions. The term "computer system-readable medium" and "computer system-readable storage medium" shall also be taken to include any medium that is capable of storing, encoding or carrying a set of instructions for execution by the computer system and that cause the computer system to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of computer system or computer-readable media used to actually effect the distribution.

Further examples of computer system-readable storage media, computer system-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise", "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein", "above", "below", and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. An electronic platform residing at one or more servers that communicate with client devices associated with one or more users of the electronic platform, the electronic platform comprising:
    at least one processor; and
    at least one memory communicatively connected to the processor and storing executable instructions that, when executed by the at least one processor, causes the at least one processor to perform operations comprising:
    executing a product generation system;
    generating, via the product generation system, tradable investment products in response to product request information received from a user of the electronic platform;
    decomposing, via the product generation system, each tradable investment product into two or more priced components, each of the priced components having a different maturity;
    generating, via the product generation system, pricing tables for each of the two or more priced components, the generated pricing tables comprising one or more risk calculations for computing price adjustments;
    pre-fetching, via the product generation system, from a third party market server before a user input by the user of the electronic platform, pricing information for the two or more priced components based on a variety of deal terms;
    receiving, via the product generation system, the user input, the user input identifying a set of the deal terms to be applied to the two or more priced components;
    interpolating, via the product generation system, the pricing tables based on the set of the deal terms;
    determining, via the product generation system, a price for each tradable investment product by (i) summing interpolated prices for each of the two or price components based on the interpolated pricing tables, and (ii) applying the pricing adjustments using the risk calculations;
    determining that the user of the electronic platform is not certified to trade investment products generated by the product generation system, and based on the determining, executing a product education system, the product education system comprising a management dashboard configured to receive manager approval or selection of online courses associated with the tradable investment products, wherein the online courses are provided to the user of the electronic platform;
    certifying, via the product education system, the user to trade the tradable investment products and displaying a control for user navigation to the product generation system;
    detecting the control being actuated and navigating the user from the product education system to the product generation system;
    executing a product exchange system;
    establishing, via the product exchange system, an information exchange environment between the user of the electronic platform and other users of the electronic platform;
    receiving, via the product exchange system, a selection of a first tradable investment product from the user of the electronic platform;
    performing, via the product exchange system, investment backtesting and scenario analysis on the first tradable investment product; and
    displaying, via the product exchange system, results of the investment backtesting to the user, the results showing how the first tradable investment product would have performed in a theoretical market scenario.

2. The electronic platform of claim 1,
    wherein the executable instructions further cause the at least one processor to perform:
    generating, via the product generation system, the tradable investment products for the user after the user of the electronic platform has completed at least one online course associated with the tradable investment products provided by the product education system.

3. The electronic platform of claim 1,
    wherein the executable instructions further cause the at least one processor to perform:
    generating, via the product generation system, the tradable investment products using a decision tree analysis of information provided by the user the of the electronic platform, the information including:
    information associated with a user's investment criteria,
    information associated with a user's risk tolerance,
    information associated with a user's investment horizon,
    information associated with a user's desired investment market,
    information associated with a user's level of investment protection, and
    information associated with real-time or near real-time conditions of the investment market.

4. The electronic platform of claim 1,
    wherein the executable instructions further cause the at least one processor to perform;
    providing, via the product education system, at least one online course to the user of the electronic platform that includes:
    a first course section configured to present information to the user based on investment products of interest to the user and capable of being generated by the product generation system;
    and a second course section configured to present a quiz to the user that is based on the information presented to the user.

5. The electronic platform of claim 1,
    wherein the product exchange system is configured to establish a product trading marketplace between the user of the electronic platform and other users of the electronic platform.

6. A method performed by an electronic platform of generating a tradable investment product, the method comprising:

receiving input from a user via a product generation interface of the electronic platform, the input including a selection of one or more investment product categories of interest to the user;

before generating an investment product for the user that is based on the selected one or more investment product categories of interest to the user, launching an online seminar via an education interface of the electronic platform for the user, wherein the education interface comprises a management dashboard for receiving manager approval or selection of the online seminar for the investment product;

receiving an indication that the user has successfully completed the online seminar via the education interface of the electronic platform;

displaying a control for user navigation to the product generation interface of the electronic platform;

determining user actuation of the control and navigating the user from the education interface of the electronic platform to the product generation interface of the electronic platform;

generating the investment product within the selected one or more investment product categories via the product generation interface of the electronic platform, wherein generating the investment product comprises:

decomposing the investment product into two or more priced components, each of the priced components having a different maturity, generating pricing tables for each of the two or more priced components, the generated pricing tables comprising one or more risk calculations for computing price adjustments, pre-fetching, from a third party market server before a user input by the user of the electronic platform, pricing information for the two or more priced components based on a variety of deal terms, receiving the user input, the user input identifying a set of the deal terms to be applied to the two or more priced components, interpolating the pricing tables based on the set of the deal terms, and determining a price for the investment product by (i) summing interpolated prices for each of the two or price components based on the interpolated pricing tables, and (ii) applying the pricing adjustments using the risk calculations;

establishing an information exchange interface between the user and other users of the electronic platform;

receiving a selection of the investment product from the user;

performing investment backtesting and scenario analysis on the investment product; and displaying results of the investment backtesting to the user, the results showing how the investment product would have performed in a theoretical market scenario.

7. The method of claim 6, further comprising, after generating one or more second investment products within the selected one or more investment product categories via the product generation interface of the electronic platform, establishing, via the information exchange interface, a product trading marketplace between the user of the electronic platform and other users of the electronic platform.

8. A non-transitory computer-readable medium storing instructions that, when executed by a processor of an electronic platform, cause the processor to perform operations comprising:

receiving input from a user via a product generation interface of the electronic platform, the input including a selection of one or more investment product categories of interest to the user;

before generating an investment product for the user that is based on the selected one or more investment product categories of interest to the user, launching an online seminar via an education interface of the electronic platform for the user, wherein the education interface comprises a management dashboard for receiving manager approval or selection of the online seminar for the investment product;

receiving an indication that the user has successfully completed the online seminar via the education interface of the electronic platform;

displaying a control for user navigation to the product generation interface of the electronic platform;

determining user actuation of the control and navigating the user from the education interface of the electronic platform to the product generation interface of the electronic platform;

generating the investment product within the selected one or more investment product categories via the product generation interface of the electronic platform, wherein generating the investment product comprises:

decomposing the investment product into two or more priced components, each of the priced components having a different maturity, generating pricing tables for each of the two or more priced components, the generated pricing tables comprising one or more risk calculations for computing price adjustments, pre-fetching, from a third party market server before a user input by the user of the electronic platform, pricing information for the two or more priced components based on a variety of deal terms, receiving the user input, the user input identifying a set of the deal terms to be applied to the two or more priced components, interpolating the pricing tables based on the set of the deal terms, and determining a price for the investment product by (i) summing interpolated prices for each of the two or price components based on the interpolated pricing tables, and (ii) applying the pricing adjustments using the risk calculations;

establishing an information exchange interface between the user and other users of the electronic platform;

receiving a selection of the investment product from the user;

performing investment backtesting and scenario analysis on the investment product; and displaying results of the investment backtesting to the user, the results showing how the investment product would have performed in a theoretical market scenario.

9. The electronic platform of claim 1, wherein: the user input further comprises a user modification to at least one deal term in the set of the deal terms; and the product generation system is further configured to pre-fetch, from the third party market server, additional pricing information for the two or more priced components in response to the user modification to the at least one deal term.

* * * * *

UNITED STATES PATENT AND TRADEMARK OFFICE
CERTIFICATE OF CORRECTION

| | | |
|---|---|---|
| PATENT NO. | : 12,443,989 B2 | Page 1 of 1 |
| APPLICATION NO. | : 14/726075 | |
| DATED | : October 14, 2025 | |
| INVENTOR(S) | : Broder | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1636 days.

Signed and Sealed this
Twenty-fifth Day of November, 2025

John A. Squires
*Director of the United States Patent and Trademark Office*